United States Patent
Shibagami et al.

(10) Patent No.: US 11,683,464 B2
(45) Date of Patent: Jun. 20, 2023

(54) ELECTRONIC DEVICE, CONTROL METHOD, AND NON-TRANSITORYCOMPUTER READABLE MEDIUM

(71) Applicant: CANON KABUSHIKI KAISHA, Tokyo (JP)

(72) Inventors: Genjiro Shibagami, Tokyo (JP); Kiyoto Ueda, Kawasaki (JP); Takashi Yoshimi, Yokohama (JP); Shin Murakami, Kawasaki (JP); Seiji Ogawa, Tokyo (JP); Kotaro Oguma, Ageo (JP); Koki Kitaya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 699 days.

(21) Appl. No.: 16/725,990

(22) Filed: Dec. 23, 2019

(65) Prior Publication Data

US 2020/0213575 A1 Jul. 2, 2020

(30) Foreign Application Priority Data

Dec. 28, 2018 (JP) .............................. JP2018-247842
Dec. 28, 2018 (JP) .............................. JP2018-247843
(Continued)

(51) Int. Cl.
*G06T 19/00* (2011.01)
*H04N 13/20* (2018.01)
(Continued)

(52) U.S. Cl.
CPC .......... *H04N 13/239* (2018.05); *G06T 19/00* (2013.01); *G06T 19/006* (2013.01);
(Continued)

(58) Field of Classification Search
None
See application file for complete search history.

(56) References Cited

U.S. PATENT DOCUMENTS 9,942,294 B1 * 4/2018 Jose Chiriyankandath ................
H04N 21/2365
2006/0082643 A1 4/2006 Richards
(Continued)

FOREIGN PATENT DOCUMENTS

| CN | 105393530 A | 3/2016 |
| CN | 106774862 A | 5/2017 |

(Continued)

OTHER PUBLICATIONS

Research for Product VR Interaction Design Base on Mobile, Industrial Design, Aug. 20, 2018, pp. 147-149.
(Continued)

*Primary Examiner* — Tapas Mazumder
(74) *Attorney, Agent, or Firm* — Cowart, Liebowitz & Latman, P.C.

(57) ABSTRACT

In an electronic device according to the present invention, on a first screen, a range of a part of a VR content having a first video range is displayed as a display range and the display range is changed in accordance with an orientation change of the electronic device or a display range change operation, and on a second screen, a first image with a second video range that is narrower than the first video range and a second image with a range outside of the second video range in the first video range are displayed side by side; an edited VR content including the second video range is generated; and the second video range is changed in accordance with a video range change operation in a state where the first image and the second image are being displayed on the second screen.

20 Claims, 19 Drawing Sheets

(30) Foreign Application Priority Data

| Dec. 28, 2018 | (JP) | JP2018-247844 |
|---|---|---|
| Dec. 28, 2018 | (JP) | JP2018-247845 |
| Dec. 28, 2018 | (JP) | JP2018-248311 |
| Dec. 28, 2018 | (JP) | JP2018-248329 |

(51) Int. Cl.

| *H04N 13/239* | (2018.01) |
|---|---|
| *H04N 13/167* | (2018.01) |
| *H04N 13/332* | (2018.01) |
| *H04N 13/366* | (2018.01) |
| *H04N 13/398* | (2018.01) |
| *H04N 5/262* | (2006.01) |
| *H04N 5/77* | (2006.01) |
| *H04N 5/91* | (2006.01) |
| *H04N 23/63* | (2023.01) |
| *H04N 23/698* | (2023.01) |

(52) U.S. Cl.
CPC ............ *H04N 5/2628* (2013.01); *H04N 5/77* (2013.01); *H04N 5/91* (2013.01); *H04N 13/167* (2018.05); *H04N 13/332* (2018.05); *H04N 13/366* (2018.05); *H04N 13/398* (2018.05); *H04N 23/635* (2023.01); *H04N 23/698* (2023.01); *H04N 23/63* (2023.01)

(56) References Cited

U.S. PATENT DOCUMENTS

| 2012/0154442 | A1 | 6/2012 | Takaoka et al. |
| 2014/0218469 | A1 | 8/2014 | Lee |
| 2014/0285677 | A1* | 9/2014 | Fujita ................. H04N 5/23267 348/208.6 |
| 2015/0249813 | A1 | 9/2015 | Cole et al. |
| 2016/0227092 | A1* | 8/2016 | Ikeda ...................... G03B 7/00 |
| 2018/0013957 | A1 | 1/2018 | Irie et al. |
| 2018/0048885 | A1 | 2/2018 | Lee et al. |
| 2018/0048886 | A1 | 2/2018 | Yoon et al. |
| 2018/0053286 | A1 | 2/2018 | Tsubota et al. |
| 2018/0152636 | A1* | 5/2018 | Yim ................... H04N 5/23216 |
| 2018/0253879 | A1 | 9/2018 | Li et al. |
| 2020/0327909 | A1* | 10/2020 | Zhang ................ H04N 21/4858 |

FOREIGN PATENT DOCUMENTS

| CN | 107621917 A | 1/2018 |
| CN | 108780228 A | 11/2018 |
| JP | 2005-223416 A | 8/2005 |
| JP | 2012-029180 A | 2/2012 |
| JP | 2013-127739 A | 6/2013 |
| JP | 2014-007653 A | 1/2014 |
| JP | 2016-019249 A | 2/2016 |
| JP | 2016-146098 A | 8/2016 |
| JP | 2018-180051 A | 11/2018 |
| KR | 2005-0091278 A | 9/2005 |
| WO | 2018/043135 A1 | 3/2018 |

OTHER PUBLICATIONS

A Jan. 6, 2022 Chinese Office Action, which is enclosed with an English Translation, that issued in Chinese Patent Application No. 201911364896.0.

The May 30, 2022 Indian Office Action, which is enclosed without an English Translation, that issued in Indian Patent Application No. 202147032522.

A May 23, 2022 Chinese Office Action, which is enclosed with an English Translation, that issued in Chinese Patent Application No. 201980086832.0.

The Mar. 10, 2020 International Search Report, which is enclosed without an English Translation, that issued in International Search Report Application No. PCT/JP2019/050758.

A Partial Supplementary European Search Report dated Aug. 19, 2022, which is enclosed, that issued in the corresponding European Patent Application No. 19904849.7.

The Sep. 15, 2022 Korean Office Action, which is enclosed without an English Translation, that issued in Korean Patent Application No. 10-2021-7021538.

A Jan. 18, 2023 Chinese Office Action, which is enclosed with an English Translation, that issued in Chinese Patent Application No. 201911364896.0.

* cited by examiner

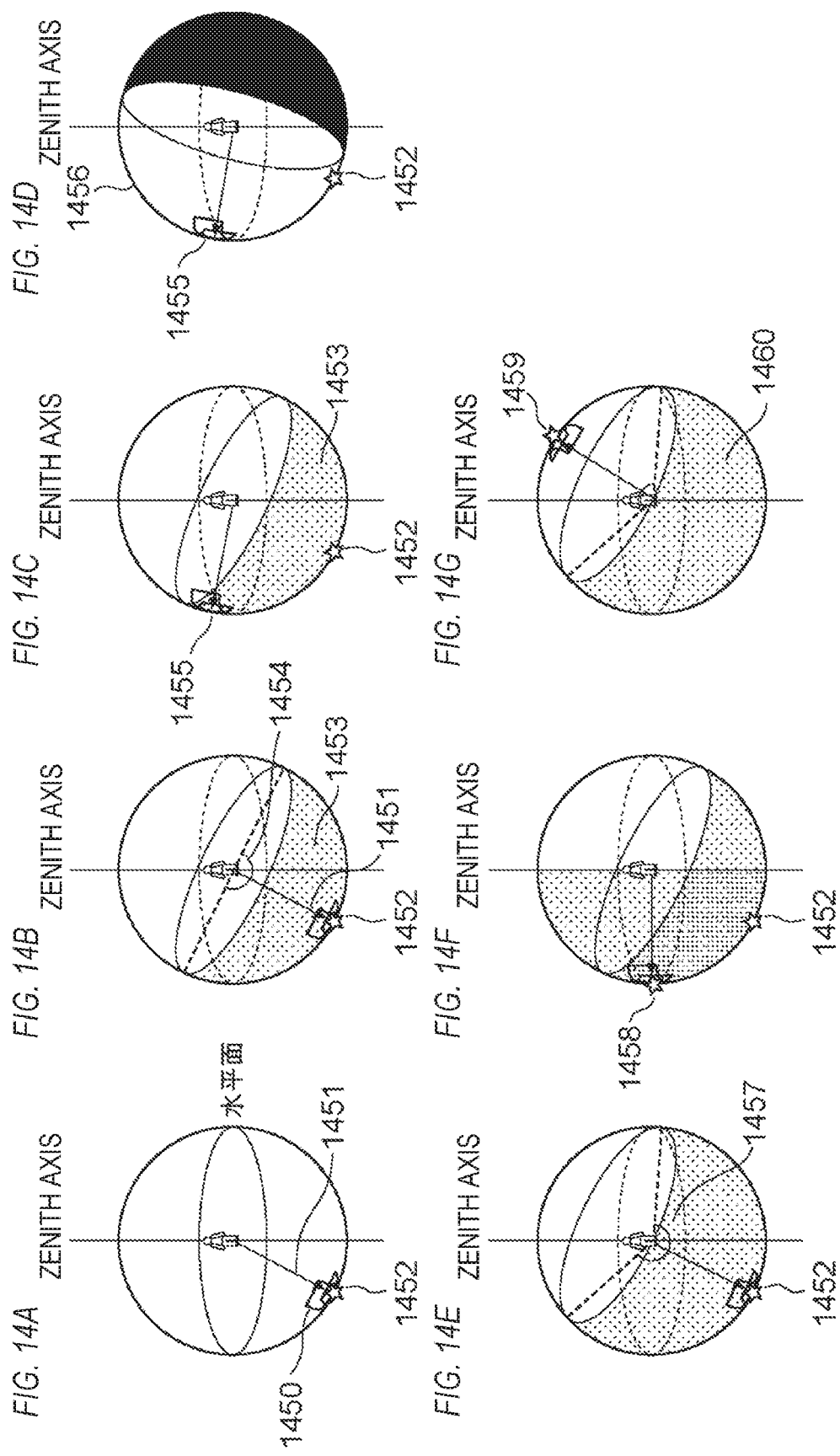

ELECTRONIC DEVICE, CONTROL METHOD, AND NON-TRANSITORYCOMPUTER READABLE MEDIUM

BACKGROUND OF THE INVENTION

Field of the Invention

The present invention relates to an electronic device, a control method of the electronic device, and a non-transitory computer readable medium, and particularly to a control method for displaying an image having a wide-range video.

Description of the Related Art

In recent years, imaging apparatuses capable of photographing an image containing a video with a range that is wider than a human viewing angle such as an omnidirectional image or a fully celestial image are becoming popular. Methods are also known for performing display (a VR view) with a high sense of immersion or a high sense of realism by displaying a part of an image containing such a wide-range video on a display and changing a range (a display range) of the video to be displayed on the display so as to follow a change in an orientation of an electronic device.

In photography of an omnidirectional image, an unnecessary object such as the photographer himself/herself often inadvertently appears in a photographed image. For this reason, providing a function that enables a user to display an image by clipping only a necessary portion or removing an unnecessary portion is useful for an electronic device capable of reproducing an omnidirectional image.

Japanese Patent Application Laid-open No. 2016-19249 discloses a technique for clipping an omnidirectional image so as to remove a portion which includes the photographer or expanding the omnidirectional image with a side faced by the photographer (a direction of the eyes of the photographer) as a center.

Although Japanese Patent Application Laid-open No. 2016-19249 discloses a method of performing clipping so as to remove a portion including the photographer out of an omnidirectional image (a VR content), no consideration is given for generating a VR content with a narrower range from the omnidirectional image (the VR content).

SUMMARY OF THE INVENTION

In consideration thereof, the present invention provides a technique that enables a VR content with a narrower range to be generated with good operability from a VR content.

An electronic device according to the present invention includes at least one memory and at least one processor which function as: a display controlling unit configured to perform control so that, on a first screen, a range of a part of a VR content having a first video range is displayed on a display as a display range and a position of the display range is changed in accordance with an orientation change of the electronic device or a display range change operation by a user, and on a second screen, a first image with a second video range that is narrower than the first video range in the VR content and a second image with a range outside of the second video range in the first video range are displayed side by side; a generating unit configured to generate an edited VR content including the second video range; and a changing unit configured to changes the second video range in accordance with a video range change operation by the user in a state where the first image and the second image are being displayed on the second screen.

Further features of the present invention will become apparent from the following description of exemplary embodiments with reference to the attached drawings.

BRIEF DESCRIPTION OF THE DRAWINGS

FIGS. 14A to 14G are schematic views showing an example of a flow up to setting a selection-disabled range;

DESCRIPTION OF THE EMBODIMENTS

Figure 1A:
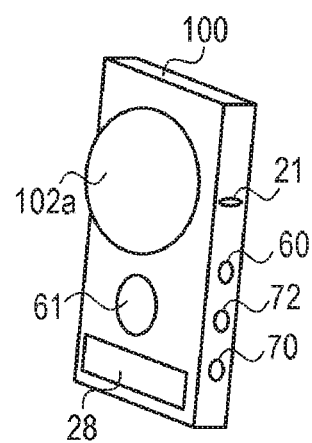
FIGS. 1A and 1B are external views of a digital camera.
Figure 1B:
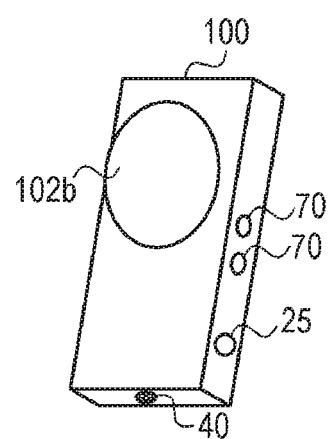

Hereinafter, a preferred embodiment of the present invention will be described with reference to the drawings. FIG. 1A is a front perspective view (an external view) of a digital camera 100 (an imaging apparatus). FIG. 1B is a rear perspective view (an external view) of the digital camera 100. The digital camera 100 is an omnidirectional camera (a fully celestial camera).

A barrier 102a is a protective window for a front camera portion having the front of the digital camera 100 as a photography range. The front camera portion is a wide-angle camera portion having, for example, a wide range of at least 180 vertical and horizontal angles on a front side of the digital camera 100 as a photography range. A barrier 102b is a protective window for a rear camera portion having the rear of the digital camera 100 as a photography range. The rear camera portion is a wide-angle camera portion having, for example, a wide range of at least 180 vertical and horizontal angles on a rear side of the digital camera 100 as a photography range.

A display unit 28 displays various types of information. A shutter button 61 is an operating unit (an operating member) for issuing a photography instruction. A mode changeover switch 60 is an operating unit for switching among various modes. A connecting I/F 25 is a connector for connecting a connecting cable to the digital camera 100 and, using the connecting cable, external devices such as a smartphone, a personal computer, a television set, and the like are connected to the digital camera 100. An operating unit 70 refers to various switches, buttons, dials, touch sensors, or the like for receiving various types of operations from a user. A power supply switch 72 is a push button for switching a power supply on and off.

A light-emitting unit 21 is a light-emitting member such as a light-emitting diode (LED) and notifies the user of various states of the digital camera 100 through light emission patterns, light emission colors, or the like. A fixing unit 40 is, for example, a tripod screw hole that is used to fix and install the digital camera 100 with a fixing tool such as a tripod.

Figure 1C:
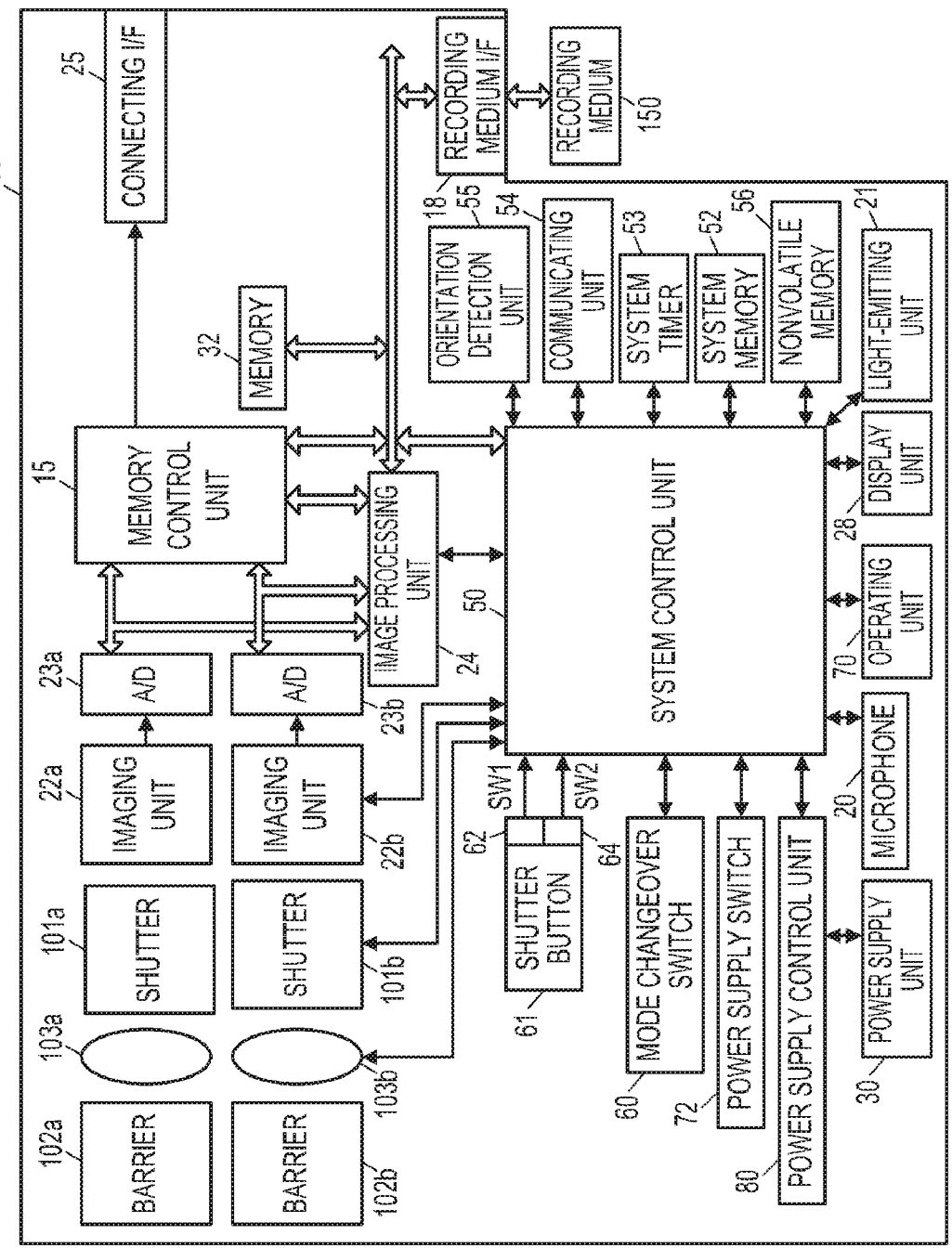
FIG. 1C is a block diagram of the digital camera.

FIG. 1C is a block diagram showing a configuration example of the digital camera 100.

The barrier 102a covers an imaging system (a photographic lens 103a, a shutter 101a, an imaging unit 22a, and the like) of the front camera portion to prevent the imaging system from being stained or damaged. The photographic lens 103a refers to a lens group including a zoom lens and a focusing lens and is a wide-angle lens. The shutter 101a is a shutter having a diaphragm function for adjusting an amount of incidence of object light into the imaging unit 22a. The imaging unit 22a is an imaging element (an image sensor) constituted by a device such as a CCD or a CMOS which converts an optical image into an electrical signal. An A/D converter 23a converts an analog signal output from the imaging unit 22a into a digital signal. Alternatively, an outside surface of the photographic lens 103a may be exposed and other parts of the imaging system (the shutter 101a and the imaging unit 22a) may be prevented from being stained or damaged by the photographic lens 103a without providing the barrier 102a.

The barrier 102b covers an imaging system (a photographic lens 103b, a shutter 101b, an imaging unit 22b, and the like) of the rear camera portion to prevent the imaging system from being stained or damaged. The photographic lens 103b refers to a lens group including a zoom lens and a focusing lens and is a wide-angle lens. The shutter 101b is a shutter having a diaphragm function for adjusting an amount of incidence of object light into the imaging unit 22b. The imaging unit 22b is an imaging element constituted by a device such as a CCD or a CMOS which converts an optical image into an electrical signal. An A/D converter 23b converts an analog signal output from the imaging unit 22b into a digital signal. Alternatively, an outside surface of the photographic lens 103b may be exposed and other parts of the imaging system (the shutter 101b and the imaging unit 22b) may be prevented from being stained or damaged by the photographic lens 103b without providing the barrier 102b.

A VR (Virtual Reality) image is picked up by the imaging unit 22a and the imaging unit 22b. A VR image is assumed to be an image of which VR display (display in a "VR view" display mode) can be performed. VR images are assumed to include an omnidirectional image (a fully celestial image) picked up by an omnidirectional camera (a fully celestial camera) and a panoramic image having a wider video range (a wider valid video range) than a display range that can be displayed at one time on the display unit. VR images include moving images and live view images (images acquired approximately in real time from a camera) in addition to still images. A VR image has a maximum video range (a maximum valid video range) corresponding to a visual field of 360 degrees in a vertical direction (a vertical angle, an angle from a zenith, an elevation, a depression angle, an elevation angle, or a pitch angle) and 360 degrees in a horizontal direction (a horizontal angle, an azimuth, or a yaw angle).

In addition, it is assumed that VR images include images with a wider angle of view (a wider visual field range) than an angle of view that can be photographed by an ordinary camera or images with a wider video range (a wider valid video range) than a display range that can be displayed at one time on the display unit even when the visual field of the images is less than 360 degrees in the vertical direction and less than 360 degrees in the horizontal direction. For example, an image photographed by a fully celestial camera capable of photographing an object corresponding to a visual field (an angle of view) of 360 degrees in the horizontal direction (a horizontal angle or an azimuth) and 210 degrees in the vertical direction centered on a zenith is a type of a VR image. In addition, for example, an image photographed by a camera capable of photographing an object corresponding to a visual field (an angle of view) of at least 180 degrees in the horizontal direction (a horizontal angle or an azimuth) and at least 180 degrees in the vertical direction centered on the horizontal direction is a type of a VR image. In other words, an image having a video range corresponding to a field of view of at least 160 degrees (±80 degrees) in both the vertical direction and the horizontal direction and having a video range that is wider than a range that can be visually recognized at one time by a human being is a type of a VR image.

By performing VR display (display in the "VR view" display mode) of the VR image, changing an orientation of a display apparatus (a display apparatus for displaying the VR image) in a horizontal rotation direction enables an omnidirectional video without any seams in the horizontal direction (the horizontal rotation direction) to be viewed. In the vertical direction (a vertical rotation direction), although an omnidirectional video without any seams can be viewed in a range of ±105 degrees with respect to directly above (the zenith), a range exceeding 105 degrees from directly above becomes a blank region in which a video is not present. A VR image can be described as "an image of which a video range is at least a part of a virtual space (a VR space)".

VR display (a VR view) refers to a display method (a display mode) of displaying a video of a visual field range in accordance with an orientation of the display apparatus in a VR image and in which a display range can be changed. When wearing and viewing a head mounted display (HMD) that is a display apparatus, a video of a visual field range in accordance with an orientation of the head of the user is to be displayed. For example, let us assume that a video with a viewing angle (an angle of view) centered on 0 degrees in the horizontal direction (a specific orientation such as north) and 90 degrees in the vertical direction (90 degrees from the zenith or, in other words, horizontal) at a certain point in time in a VR image is being displayed. When front and back of the orientation of the display apparatus is reversed from this state (for example, when a direction that is faced by a display surface is changed from south to north), the display range is changed to a video with a viewing angle centered on 180 degrees in the horizontal direction (an opposite orientation such as south) and 90 degrees in the vertical direction (horizontal) in the same VR image. This means that, in a case where the user is viewing the HMD, when the user turns his or her head from north to south (in other words, when the user turns around), the video displayed on the HMD also changes from a video of the north to a video of the south. Such a VR display enables the user to be provided with a sensation (a sense of immersion) as though the user is visually present inside the VR image (inside the VR space). A smartphone mounted to VR goggles (a head mount adapter) can be considered a type of HMD.

It should be noted that a display method of a VR image is not limited to the method described above. A configuration may be adopted in which a display range is moved (scrolled) in accordance with a user operation with respect to a touch panel, a directional button, or the like instead of an orientation change. A configuration may be adopted in which, during VR display (in the "VR view" display mode), a display range can be changed in accordance with a touch-move with respect to the touch panel, a drag operation with respect to a mouse or the like, a depression of a directional button, or the like in addition to changing the display range in accordance with an orientation change.

An image processing unit 24 performs prescribed resizing processing or prescribed color conversion processing such as pixel interpolation or reduction with respect to data from the A/D converter 23a or the A/D converter 23b or data from a memory control unit 15. In addition, the image processing unit 24 performs prescribed computing processing using image data of a picked-up image. A system control unit 50 performs exposure control and ranging control on the basis of a computation result obtained by the image processing unit 24. Accordingly, AF (automatic focusing) processing, AE (automatic exposure) processing, EF (preliminary light emission before flash) processing, and the like in a TTL (through-the-lens) system are performed. The image processing unit 24 further performs prescribed computing processing using image data of a picked-up image and performs AWB (automatic white balance) processing in the TTL system on the basis of an obtained computation result. In addition, the image processing unit 24 performs basic image processing on two images (two fisheye images, two wide-angle images) obtained from the A/D converter 23a and the A/D converter 23b, and performs image connecting processing of synthesizing the two images having been performed to the basic image processing to generate a single VR image. Furthermore, the image processing unit 24 performs image clipping processing, expanding processing, distortion correction, or the like for realizing VR display of the VR image during VR display in a live view or during reproduction, and performs rendering in which a processing result is rendered on a VRAM of a memory 32.

In the image connecting processing, the image processing unit 24 uses one of the two images as a reference image and the other as a comparison image, calculates an amount of deviation between the reference image and the comparison image for each area by pattern matching processing, and detects a connection position where the two images are to be connected on the basis of the amount of deviation for each area. The image processing unit 24 corrects distortion of each image by geometric conversion in consideration of the detected connection position and lens characteristics of each optical system, and converts each image into an image in a fully celestial format (a fully celestial image format). In addition, by synthesizing (blending) the two images in the fully celestial format, the image processing unit 24 generates a single fully celestial image (a single VR image). The generated fully celestial image is an image using, for example, equidistant cylindrical projection, and a position of each pixel in the fully celestial image can be associated with coordinates on a surface of a sphere (a VR space).

Output data from the A/D converters 23a and 23b is written into the memory 32 via the image processing unit 24 and the memory control unit 15 or via the memory control unit 15 without involving the image processing unit 24. The memory 32 stores image data obtained by the imaging units 22a and 22b and converted into digital data by the A/D converters 23a and 23b and image data to be output to an external display from the connecting I/F 25. The memory 32 has sufficient storage capacity for storing a prescribed number of still images and a prescribed time's worth of moving images and audio.

In addition, the memory 32 also doubles as a memory (a video memory) for image display. Data for image display stored in the memory 32 can be output to an external display from the connecting I/F 25. By sequentially transferring VR images picked up by the imaging units 22a and 22b, generated by the image processing unit 24, and accumulated in the memory 32 to the external display and displaying the VR images on the external display, a function as an electronic view finder can be realized and live view display (LV display) can be performed. Hereinafter, an image displayed in live view display will be referred to as a live view image (LV image). In addition, live view display (remote LV display) can also be performed by transferring VR images accumulated in the memory 32 to an external device (a smartphone or the like) wirelessly connected via a communicating unit 54 and having the external device display the VR images.

A nonvolatile memory 56 is a memory as an electrically erasable and recordable recording medium and is, for example, an EEPROM. Constants, a program, and the like necessary for operations of the system control unit 50 are recorded in the nonvolatile memory 56. In this case, the program refers to a computer program for executing various processing.

The system control unit 50 is a control unit constituted by at least one processor or one circuit and controls the entire digital camera 100. The system control unit 50 realizes the respective processing by executing the program recorded in the nonvolatile memory 56 described earlier. A system memory 52 is, for example, a RAM, and constants and variables for operations of the system control unit 50, the program read from the nonvolatile memory 56, and the like are deployed onto the system memory 52. In addition, the system control unit 50 also performs display control by controlling the memory 32, the image processing unit 24, the memory control unit 15, and the like. A system timer 53 is a time-measuring unit for measuring time used in various controls and for measuring time according to an internal clock.

The mode changeover switch 60, the shutter button 61, the operating unit 70, and the power supply switch 72 are used in order to input various operation instructions to the system control unit 50.

The mode changeover switch 60 switches an operating mode of the system control unit 50 to any of a still image recording mode, a moving image photography mode, a reproduction mode, a communication connection mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes.

Using the mode changeover switch 60, the user can directly switch to any of these modes. Alternatively, after temporarily switching to a photography mode list screen using the mode changeover switch 60, another operating member may be used to selectively switch to any of a plurality of modes being displayed on the display unit 28. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation involving AF (automatic focusing) processing, AE (automatic exposure) processing, AWB (automatic white balance) processing, EF (preliminary light emission before flash) processing, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the imaging units 22a and 22b to writing image data into a recording medium 90.

It should be noted that the shutter button 61 is not limited to an operation member capable of operations in the two stages of a full depression and a half depression and may be an operation member only capable of a one-stage depression. In this case, a photography preparation operation and photography processing are successively performed by a one-stage depression. This is a same operation as a case where a shutter button that can be fully depressed and half-depressed is fully depressed (a case where the first shutter switch signal SW1 and the second shutter switch signal SW2 are generated approximately simultaneously).

By selecting and operating various function icons and options displayed on the display unit 28, the operating unit 70 is appropriately assigned a function for each scene and acts as various function buttons. Examples of the function buttons include an end button, a return button, an image feed button, a jump button, a narrow-down button, and an attribute change button. For example, when a menu button is pushed, a menu screen enabling various settings to be performed is displayed on the display unit 28. The user can intuitively perform various settings by operating the operating unit 70 while looking at the menu screen displayed on the display unit 28.

The power supply switch 72 is a push button for switching a power supply on and off. A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 90 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 90 that is a memory card, a hard disk, or the like. The recording medium 90 is a recording medium such as a memory card for recording photographed images and is constituted by a semiconductor memory, an optical disk, a magnetic disk, or the like. The recording medium 90 may be a replaceable recording medium that is mountable to and dismountable from the digital camera 100 or a recording medium that is built into the digital camera 100.

The communicating unit 54 transmits and receives video signals and audio signals to and from an external device connected wirelessly or by a wired cable. The communicating unit 54 is also capable of connecting to a wireless LAN (Local Area Network) and the Internet. The communicating unit 54 is capable of transmitting images (including LV images) picked up by the imaging units 22a and 22b and images recorded on the recording medium 90 as well as receiving images and various other types of information from the external device.

An orientation detecting unit 55 detects an orientation of the digital camera 100 relative to a direction of gravitational force. On the basis of the orientation detected by the orientation detecting unit 55, a determination can be made as to whether an image photographed by the imaging units 22a and 22b is an image photographed while holding the digital camera 100 horizontally or an image photographed while holding the digital camera 100 vertically. In addition, a determination can be made as to how much the digital camera 100 had been tilted in the three axial directions (rotation directions) of a yaw direction, a pitch direction, and a roll direction during photography of an image by the imaging units 22a and 22b. The system control unit 50 can add orientation information in accordance with the orientation detected by the orientation detecting unit 55 to an image file of a VR image picked up by the imaging units 22a and 22b and record the VR image after rotating the image (after adjusting an orientation of the VR image so as to perform tilt correction (zenith correction)). One of an acceleration sensor, a gyro sensor, a geomagnetic sensor, an orientation sensor, an altitude sensor, and the like or a combination of a plurality of these sensors can be used as the orientation detecting unit 55. A motion (panning, tilting, uplifting, whether stationary or not, or the like) of the digital camera 100 can also be detected using the acceleration sensor, the gyro sensor, the orientation sensor, or the like that constitutes the orientation detecting unit 55.

A microphone 20 is a microphone for collecting sound around the digital camera 100 to be recorded as audio of a VR image (a VR moving image) that is a moving image. The connecting I/F 25 is a connecting plug to which is connected an HDMI (registered trademark) cable, a USB cable, or the like to be connected to an external device in order to transmit and receive video.

Figure 2A:
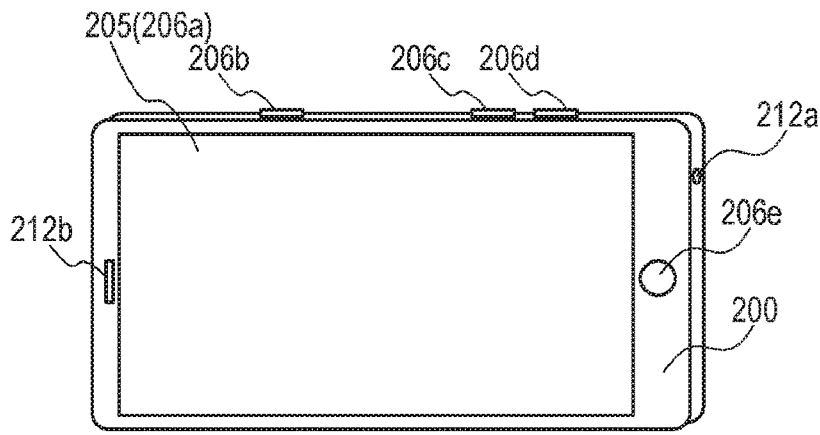
FIG. 2A is an external view of an electronic device.

FIG. 2A is an external view of an electronic device 200 which is a type of a display control apparatus. The electronic device 200 is a display apparatus such as a smartphone. A display 205 is a display unit which displays images and various types of information. The display 205 is integrally constructed with a touch panel 206a and is configured to be capable of detecting a touch operation with respect to a display surface of the display 205. The electronic device 200 is capable of performing VR display of a VR image (a VR content) on the display 205. An operating unit 206b is a power supply button for accepting an operation to switch between turning on and off a power supply of the electronic device 200. An operating unit 206c and an operating unit 206d are volume buttons for increasing and reducing a volume of audio output from a speaker 212b or from an earphone, an external speaker, or the like connected to an audio output terminal 212a. An operating unit 206e is a home button for causing a home screen to be displayed on the display 205. An audio output terminal 212a is an earphone jack that is a terminal for outputting an audio signal to an earphone, an external speaker, or the like. A speaker 212b is a speaker built into a main body for outputting audio.

Figure 2B:
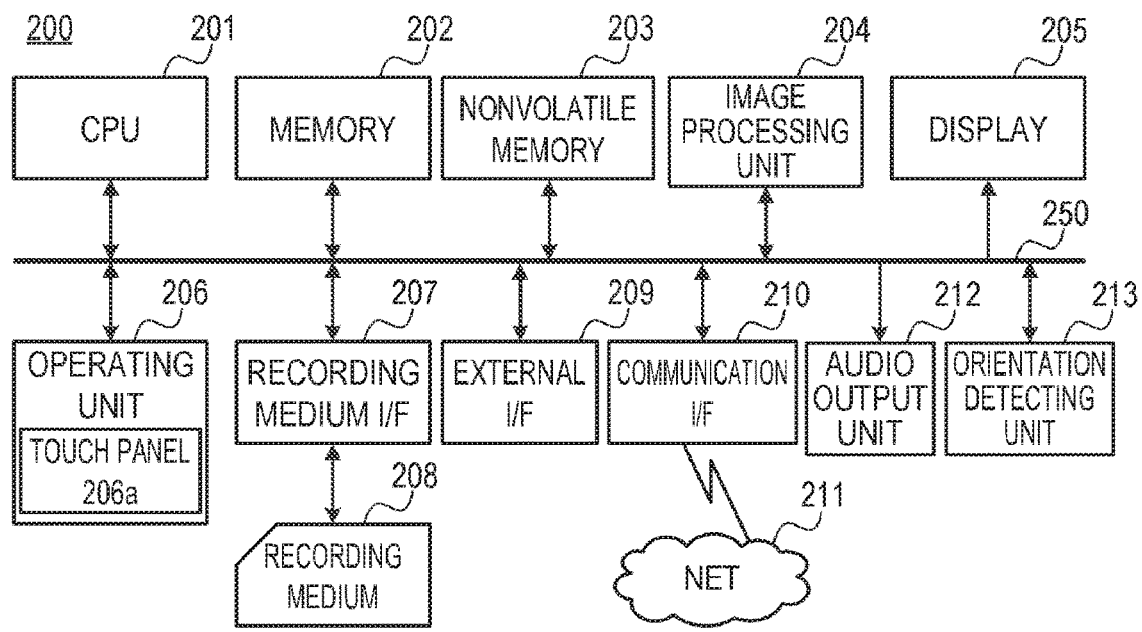
FIG. 2B is a block diagram of the electronic device.

FIG. 2B is a block diagram showing a configuration example of the electronic device 200. A CPU 201, a memory 202, a nonvolatile memory 203, an image processing unit 204, the display 205, an operating unit 206, a recording medium I/F 207, an external I/F 209, and a communication I/F 210 are connected to an internal bus 250. In addition, an audio output unit 212 and an orientation detecting unit 213 are also connected to the internal bus 250. The respective units connected to the internal bus 250 are configured so as to be capable of exchanging data with one another via the internal bus 250.

The CPU 201 is a control unit which controls the entire electronic device 200 and is constituted by at least one processor or one circuit. The memory 202 is constituted by, for example, a RAM (such as a volatile memory using a semiconductor element). The CPU 201 controls the respective units of the electronic device 200 by, for example, using the memory 202 as a work memory in accordance with a program stored in the nonvolatile memory 203. The nonvolatile memory 203 stores image data and audio data, other data, various programs that enable the CPU 201 to operate, and the like. The nonvolatile memory 203 is constituted by, for example, a flash memory or a ROM.

Under control by the CPU 201, the image processing unit 204 performs various types of image processing on images stored in the nonvolatile memory 203 or a recording medium 208, video signals acquired via the external I/F 209, images acquired via the communication I/F 210, and the like. Image processing performed by the image processing unit 204 includes A/D conversion processing and D/A conversion processing as well as encoding processing, compression processing, decoding processing, enlargement/reduction processing (resizing), noise reduction processing, color conversion processing, and the like of image data. The image processing unit 204 also performs various types of image processing such as panoramic development, mapping processing, and conversion of omnidirectional images or VR images being wide-range images having video of a wide range albeit not omnidirectional. The image processing unit 204 may be constituted by a dedicated circuit block for performing specific image processing. In addition, depending on a type of image processing, the CPU 201 may perform the image processing in accordance with a program without using the image processing unit 204.

The display 205 displays images, a GUI (Graphical User Interface) screen constituting a GUI, and the like under control by the CPU 201. The CPU 201 controls the respective units of the electronic device 200 so as to generate a display control signal in accordance with the program and to generate a video signal to be displayed on the display 205 and output the video signal to the display 205. The display 205 displays a video on the basis of a generated and output video signal. Alternatively, components of the electronic device 200 itself may be limited to up to an interface for outputting a video signal to be displayed by the display 205, and the display 205 may be constituted by an external monitor (such as a television or an HMD).

The operating unit 206 is an input device for accepting a user operation of which examples include a character information input device such as a keyboard, a pointing device such as a mouse or a touch panel, a button, a dial, a joystick, a touch sensor, and a touch pad. In the present embodiment, the operating unit 206 includes the touch panel 206a and the operating units 206b, 206c, 206d, and 206e.

The recording medium 208 that is a memory card, a CD, a DVD, or the like is mountable to and dismountable from the recording medium I/F 207. Under control by the CPU 201, the recording medium I/F 207 reads data from and writes data to the mounted recording medium 208. The recording medium 208 stores data such as images to be displayed on the display 205. The external I/F 209 is an interface to be connected to an external device using a wired cable (such as a USB cable) or in a wireless manner to perform input and output of video signals and audio signals (data communication). The communication 1F 210 is an interface for communicating (by radio communication) with an external device, the Internet 211, and the like to transmit and receive various types of data such as files and commands (data communication).

The audio output unit 212 outputs audio of moving images and music data to be reproduced by the electronic device 200, keyboard clicks, ring tones, various notification sounds, and the like. While it is assumed that the audio output unit 212 includes an audio output terminal 212a to which an earphone or the like is to be connected and a speaker 212b, alternatively, the audio output unit 212 may output audio data to an external speaker by radio communication or the like.

The orientation detecting unit 213 detects an orientation (a tilt) of the electronic device 200 relative to a direction of gravitational force or an orientation of the electronic device 200 with respect to the respective axes in the yaw direction, the pitch direction, and the roll direction, and notifies the CPU 201 of orientation information. On the basis of an orientation detected by the orientation detecting unit 213, a determination can be made as to whether the electronic device 200 is being held horizontally, held vertically, pointed upward, pointed downward, or assuming an oblique orientation. In addition, a determination can be made as to a presence or absence or a magnitude of a tilt of the electronic device 200 in a rotation direction such as the yaw direction, the pitch direction, and the roll direction and whether or not the electronic device 200 has rotated in the rotation direction. One of an acceleration sensor, a gyro sensor, a geomagnetic sensor, an orientation sensor, an altitude sensor, and the like or a combination of a plurality of these sensors can be used as the orientation detecting unit 213.

As described above, the operating unit 206 includes the touch panel 206a. The touch panel 206a is an input device which is planarly configured so as to overlap with the display 205 and to output coordinate information in accordance with a touched position. The CPU 201 is capable of detecting the following operations with respect to the touch panel 206a or the following states of the touch panel 206a A state where a finger or a stylus previously not in touch with the touch panel 206a newly touches the touch panel 206a or, in other words, a start of a touch (hereinafter referred to as a touch-down)

A state where the touch panel 206a is being touched by a finger or a stylus (hereinafter referred to as a touch-on)

A state where a finger or a stylus is moving while in touch with the touch panel 206a (hereinafter referred to as a touch-move)

A state where a finger or a stylus previously in touch with the touch panel 206a separates from the touch panel 206a or, in other words, an end of a touch (hereinafter referred to as a touch-up)

A state where nothing is touching the touch panel 206a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 201 is notified of the operations or the states described above as well as position coordinates where a finger or a stylus is touching the touch panel 206a through an internal bus and, on the basis of the notified information, the CPU 201 determines what kind of operation (touch operation) has been performed on the touch panel 206a. With respect to a touch-move, a movement direction of a finger or a stylus moving on the touch panel 206a can be determined for each of a vertical component and a horizontal component on the touch panel 206a on the basis of a change in the position coordinates. It is assumed that a determination that a slide operation has been performed is made when a touch-move of a prescribed distance or longer is detected. A touch-move is a movement operation performed by the user with respect to the touch panel 206a. Various processing in accordance with a touch-move to be described later can also be performed in accordance with a drag operation of a mouse which is also a movement operation.

An operation involving quickly moving a finger on the touch panel 206a for a certain distance while keeping the finger in touch with the touch panel 206a and then releasing the finger is referred to as a flick. In other words, a flick is an operation in which a finger quickly traces the touch panel 206a as though flicking on the touch panel 206a. A determination that a flick has been performed can be made (a determination that a flick has occurred following a slide operation can be made) when a detection of a touch-move of a prescribed distance or longer at a prescribed speed or higher is followed by a detection of a touch-up.

Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 206a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

Figure 2C:
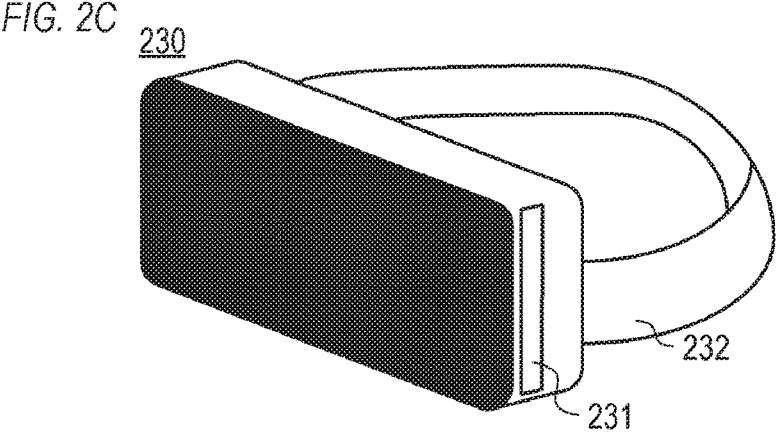
FIG. 2C is an external view of VR goggles.

FIG. 2C is an external view of VR goggles (a head mount adapter) 230 to which the electronic device 200 is mountable. By mounting the electronic device 200 to the VR goggles 230, the electronic device 200 can also be used as a head mounted display. An insertion opening 231 is an insertion opening to which the electronic device 200 is to be inserted. The entire electronic device 200 can be inserted into the VR goggles 230 by orienting the display surface of the display 205 toward a side of a headband 232 for fixing the VR goggles 230 to the head of the user (in other words, toward the user). In a state where the VR goggles 230 to which the electronic device 200 has been mounted are worn on the user's head, the user can view the display 205 of the electronic device 200 without having to manually hold the electronic device 200. In this case, when the user moves his or her head or entire body, an orientation of the electronic device 200 also changes. The orientation detecting unit 213 detects an orientation change of the electronic device 200 at this point, and the CPU 201 performs processing for VR display on the basis of the orientation change. In this case, the detection of the orientation of the electronic device 200 by the orientation detecting unit 213 is equivalent to a detection of an orientation of the head of the user (a direction in which a line of sight of the user is oriented). Alternatively, the electronic device 200 itself may be an HMD that is mountable to the head even without VR goggles.

In the present embodiment, an operation and processing of clipping a VR image with a video range (a valid video range) corresponding to a field of view of 180 degrees in both the vertical direction and the horizontal direction from a VR image with a video range (a valid video range) corresponding to a maximum field of view of 360 degrees in both the vertical direction and the horizontal direction will be described. It should be noted that, in the following description, a VR image with a video range (a valid video range) corresponding to a maximum field of view of 360 degrees in both the vertical direction and the horizontal direction will be referred to as a 360-degree VR image. In addition, a VR image with a video range (a valid video range) corresponding to a field of view of 180 degrees in both the vertical direction and the horizontal direction will be referred to as a 180-degree VR image. Conceptually, the processing of clipping a 180-degree VR image from a 360-degree VR image is processing of clipping a hemisphere from a virtual sphere onto which a video corresponding to 360 degrees has been entirely mapped. Clipping as described in the present embodiment is not processing of clipping an ordinary rectangular image (a planar image) but, rather, processing of clipping an image that can be viewed as a VR image (an image that can be mapped onto a sphere and viewed in a VR view) even after the clipping. Since the image after the clipping has a valid video range corresponding to a field of view of 180 degrees in both the vertical direction and the horizontal direction, when the image after the clipping is mapped onto a sphere, a valid video (such as a photographed image) corresponding to a hemisphere is mapped. The remaining hemisphere becomes an invalid video range to be filled in monochrome or by a prescribed pattern or onto which some kind of complemented video is to be mapped. When viewing such a clipped VR image in a VR view, the user can visually recognize the image in a forward range with a width of 180 degrees (a range of 90 degrees in both the vertical direction and the horizontal direction from center). Reasons for performing such clipping processing include the following.

First, a data amount of an image can be reduced. A clipped 180-degree VR image has a smaller data amount than a 360-degree VR image. Therefore, capacity of a recording medium when saving VR images can be prevented from becoming oppressed. In addition, an amount of communication data during transmission and reception and processing load during display can be reduced and, proportionally, effects including an improvement in processing speed or response speed and a reduction in power consumption can be produced.

Second, unnecessary objects can be deleted. For example, in most cases where a VR image having a valid video range corresponding to a field of view of 360 degrees is picked up, it is unavoidable that the photographer himself/herself is included in the VR image. However, when an object that the photographer wishes to photograph is a landscape or the like and not the photographer himself/herself, the photographer himself/herself is an unnecessary object and constitutes an unintentional presence. The inclusion of an unintentional video prevents a viewer from focusing his or her attention on a video such as a landscape which the photographer considers to be a theme. In addition, information to be concealed such as the face of a passerby and the license plate of a passing vehicle is often included and, in many cases, the inclusion of such information is undesirable from the perspectives of privacy and security. By performing clipping processing to clip only a range intended by the photographer and discard video of other unnecessary ranges, such problems can be avoided.

Third, a physical burden on a user viewing a VR image in a VR view can be reduced. When viewing a 360-degree VR image in a VR view, video is present even behind the user viewing the VR image. While video corresponding to forward 180 degrees can be roughly panoramically viewed by a viewer by simply turning his or her head, in order to look behind, the view must twist his or her torso or change his or her standing direction, thereby placing a relatively high physical burden on the viewer. Such a body movement that is required to look behind is unsuitable for viewing when seated unless the viewer is in a swivel chair. In comparison, since a 180-degree VR image can be roughly panoramically viewed by simply turning one's head, the physical burden placed on the viewer when viewing the VR image is relatively small. If the viewer is made aware of the fact that a VR image is a 180-degree VR image by guide display or display indicating that a range exceeding 180 degrees is an invalid region, the viewer does not even attempt to look behind. Therefore, the viewer can be prevented from being forced to perform a body movement such as looking behind.

Fourth, a 360-degree VR image can be displayed so as to correspond to a recording format for a 180-degree VR image or the like. When a recording format of a 360-degree VR image differs from the recording format for a 180-degree VR image, the 360-degree VR image cannot be viewed by a reproducing apparatus (reproduction application software) which only supports viewing 180-degree VR images. However, generating a 180-degree VR image by clipping the 180-degree VR image from a 360-degree VR image enables the VR image to be viewed by even a reproducing apparatus which only supports viewing 180-degree VR images. In addition, even when both viewing 180-degree VR images and viewing 360-degree VR images are supported, when switching between a mode for viewing 180-degree VR images and a mode for viewing 360-degree VR images must be performed, switching operations may be a hassle. However, generating a 180-degree VR image by clipping the 180-degree VR image from a 360-degree VR image enables a plurality of VR images to be switched and viewed in succession without having to switch to the display mode for 180-degree VR images. Furthermore, a display mode (a binocular VR view) is envisaged which displays two 180-degree VR images including a right-eye 180-degree VR image and a left-eye 180-degree VR image photographed by two camera units installed facing an object in a same direction and separated by a distance corresponding to parallax in such a manner that the two 180-degree VR images can be stereoscopically viewed. By clipping a right-eye 180-degree VR image and a left-eye 180-degree VR image from a 360-degree VR image and recording the 180-degree VR images in advance, the 180-degree VR images can also be viewed in such a binocular VR view.

While an example in which a 180-degree VR image is generated by clipping the 180-degree VR image from a 360-degree VR image will be described in the present embodiment, the present embodiment is also applicable to processing for VR images with other viewing angles as long the processing involves clipping a VR image with a valid video range that is narrower than a valid video range of the VR image prior to the clipping. In other words, the VR image prior to clipping is not limited to a 360-degree VR image and the VR image after the clipping is not limited to a 180-degree VR image.

In each processing described below, an example of advancing the processing by displaying various touch buttons and accepting a touch operation with respect to the various touch buttons as a user operation will be described. Specifically, a touch operation of accepting an instruction with respect to various touch buttons may be a touch-up from a touch response region corresponding to a touch button or a touch-down with respect to a touch response region corresponding to a touch button. In addition, each instruction described as an instruction to be accepted by an operation with respect to a touch button to be described later is not limited thereto and may be accepted by other user operations. For example, a user operation for accepting an instruction may be an operation with respect to each physical button, an operation of selecting a display item using a direction key and depressing an enter key, an operation of selecting a display item using a mouse, a voice command, or the like.

Figure 3:
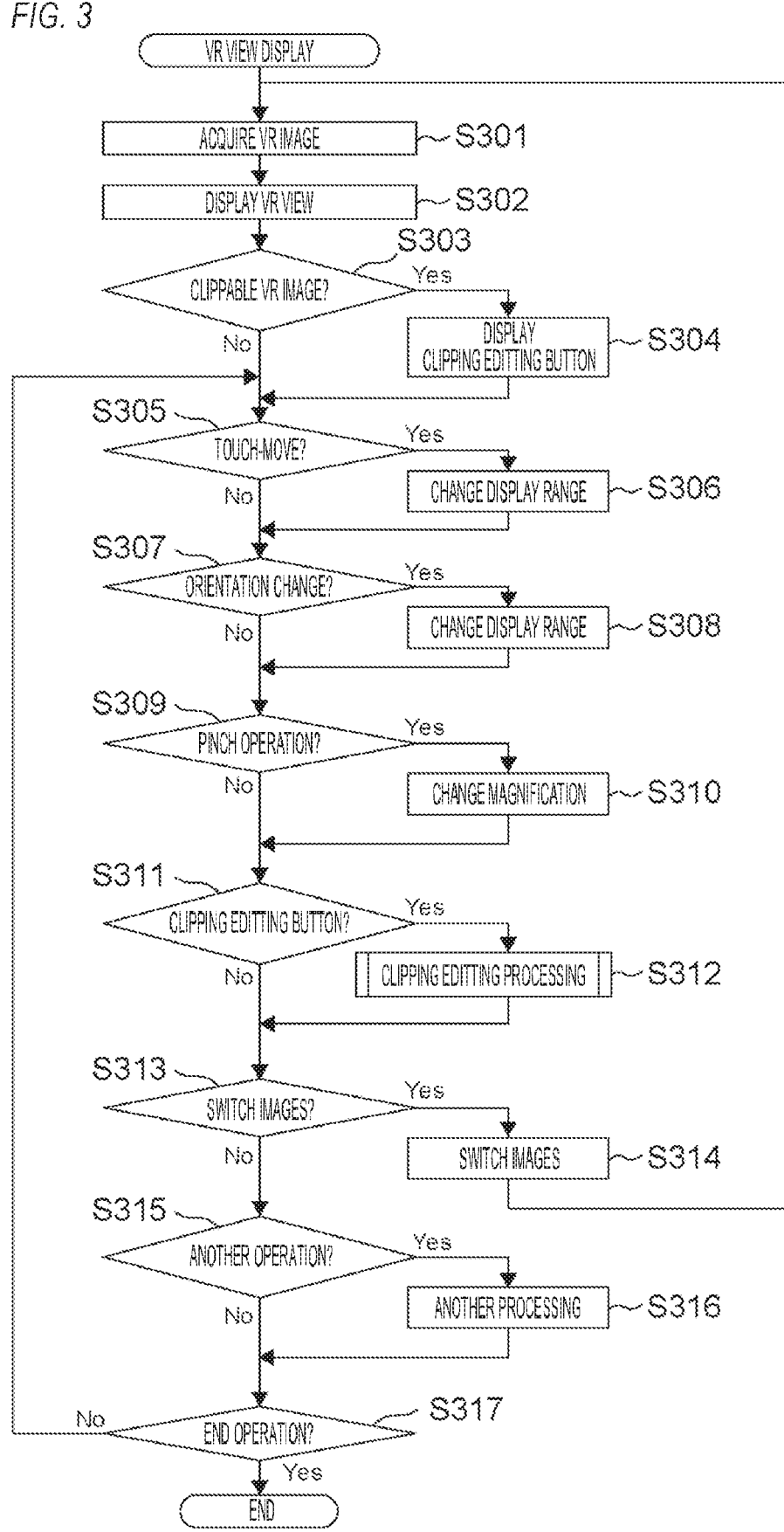
FIG. 3 is a flow chart of VR view display.

FIG. 3 is a flow chart of VR view display (processing) in the electronic device 200. This processing is realized as the CPU 201 deploys a program recorded in the nonvolatile memory 203 on the memory 202 and executes the program. When application software which is capable of displaying a 360-degree VR image in a VR view and which has a function of clipping a 180-degree VR image is activated in a state where the electronic device 200 is turned on, the CPU 201 starts the processing shown in FIG. 3 after initializing a flag, a control variable, and the like.

In S301, the CPU 201 loads (acquires) a VR image to be a display object from the recording medium 208 or a communication destination via the communication I/F 210. In addition, the CPU 201 acquires information indicating a video range (a valid video range) attached as attribute information of the VR image. The information indicating a valid video range refers to information describing angular ranges in the vertical direction and in the horizontal direction of a valid video included in the VR image. The information indicating a valid video range need only be information that enables a valid video range of the VR image to be specified and may be an angle of view, a viewing angle, an azimuth, an elevation, the numbers of horizontal pixels, or information such as coordinates. Alternatively, the information indicating a valid video range may be model information of the camera used to capture the VR image (a photographable range can be specified by specifying a model), information on zoom during photography, and the like. When the CPU 201 acquires the information indicating a valid video range, the CPU 201 also identifies (calculates) an invalid video range (a non-video range) based on differences from 360 degrees in the vertical and horizontal directions. Conversely, information indicating an invalid video range may be acquired from the attribute information of the VR image and a valid video range may be calculated from the information indicating the invalid video range, or both information indicating a valid video range and information indicating an invalid video range may be acquired from the attribute information of the VR image.

In S302, the CPU 201 performs display processing in a VR view of the VR image acquired in S301. Original data (image data) of the VR image is an image which is distorted due to the use of, for example, equidistant cylindrical projection, and which is an image in a format that enables a position of each pixel to be associated with coordinates on a surface of a sphere. The original image of the VR image is mapped onto a sphere, and a part of the sphere is clipped and displayed. In other words, the image displayed in S302 is an image obtained by clipping and enlarging a part of the VR image and is an image in which distortion of the original image has been removed (or reduced).

In S303, on the basis of the information acquired in S301, the CPU 201 determines whether or not the VR image that is a display object in S302 is a VR image from which a 180-degree VR image can be clipped. In the case of any of an image of which the number of recording pixels is lower than a threshold, an image of which a valid video range is narrower (smaller) than a threshold, an image having been performed to clipping processing to be described later, and a 180-degree VR image, the CPU 201 determines that the VR image is not a VR image from which a 180-degree VR image can be clipped and advances to S305. The CPU 201 advances to S304 when the CPU 201 determines that the VR image is an image that can be clipped.

Figure 6A:
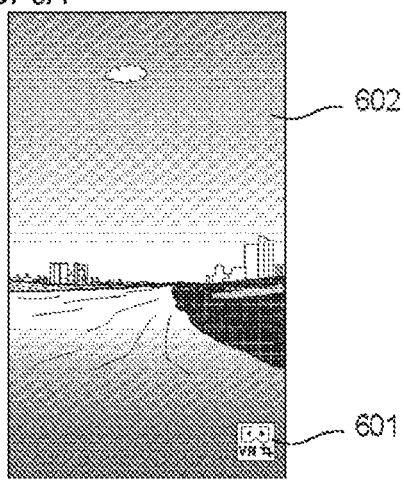
FIG. 6A represents an example of VR view display.

In S304, the CPU 201 displays a clipping editing button. FIG. 6A shows a display example of a VR image and a clipping editing button displayed in S304. A VR image 602 is the VR image displayed in S302. A clipping editing button 601 is a touch icon for issuing an instruction to clip the VR image. While a configuration is adopted in which the clipping editing button 601 is not displayed when the CPU 201 determines in S303 that the VR image cannot be clipped, alternatively, the clipping editing button 601 may be displayed in a display mode such as grayout which enables a selection-disabled state of the clipping editing button 601 to be identified.

In S305, on the basis of information notified from the touch panel 206a, the CPU 201 determines whether or not a touch-move (a display range change operation) has been performed with respect to a region where the VR image 602 is displayed. When a touch-move has been performed, the CPU 201 advances to S306, but otherwise the CPU 201 advances to S307. In S306, the CPU 201 scrolls the displayed VR image 602 in accordance with a direction and an amount of the touch-move and changes the display range of the VR image. Specifically, on the basis of a left-right direction (a horizontal direction) out of movement components of the touch-move, the CPU 201 scrolls the VR image rightward or leftward so that the display range rotates and moves around a vertical axis (a zenith axis, a gravity axis) of a virtual sphere to which the VR image has been mapped. In other words, this is a change of the display range which changes an orientation of a line of sight (a direction of the display range) when viewed from a viewer located at a center of the virtual sphere. In addition, on the basis of an up-down direction (a vertical direction) out of movement components of the touch-move, the CPU 201 scrolls the VR image upward or downward so that the display range rotates and moves around a horizontal axis (an axis perpendicular to the zenith axis, an axis perpendicular to gravity) of the virtual sphere to which the VR image has been mapped. In other words, this is a change of the display range which changes an elevation or a depression angle (hereinafter, referred to as an elevation/depression angle) of a line of sight (a direction of the display range) when viewed from a viewer located at the center of the virtual sphere.

In S307, the CPU 201 determines whether or not a change in orientation that necessitates a change in the display range has been detected by the orientation detecting unit 213. When a change in orientation that necessitates a change in the display range has been detected, the CPU 201 advances to S308, but otherwise the CPU 201 advances to S309. In S308, the CPU 201 changes (moves) the display range of the VR image 602 in accordance with the orientation change detected by the orientation detecting unit 213.

In S309, on the basis of information notified from the touch panel 206a, the CPU 201 determines whether or not a pinch-in or a pinch-out (in other words, a magnification change operation) has been performed with respect to the region where the VR image 602 is displayed. When a pinch-in or a pinch-out has been performed, the CPU 201 advances to S310, but otherwise the CPU 201 advances to S311. In S310, the CPU 201 changes (continuously or in a stepwise manner involving a plurality of (three or more) steps) a display magnification of the VR image in accordance with the pinch operation. In the case of a pinch-in (a reduction operation), the display magnification of the VR image is lowered. Accordingly, the display range of the VR image widens. In other words, although an object becomes smaller, a wider range is displayed. In the case of a pinch-out (an enlargement operation), the display magnification of the VR image is raised. Accordingly, the display range of the VR image narrows. In other words, although an object becomes larger, a narrower range is displayed.

In S311, on the basis of information notified from the touch panel 206a, the CPU 201 determines whether or not a touch operation designating the clipping editing button 601 has been performed. When a touch operation with respect to the clipping editing button 601 has been performed, the CPU 201 advances to S312, but otherwise the CPU 201 advances to S313. In S312, the CPU 201 performs clipping editing processing. The clipping editing processing will be described later with reference to FIG. 4.

In S313, the CPU 201 determines whether or not an image switching operation has been performed. When an image switching operation has been performed, the CPU 201 advances to S314, but otherwise the CPU 201 advances to S315. Examples of an image switching operation include an operation of an image switching button included in the operating unit 206, a touch operation on image switching icons (a next image icon and a previous image icon) displayed on the display 205, and a double drag that involves simultaneously touching two points and dragging the two points in a same direction. In S314, in accordance with the image switching operation, the CPU 201 specifies a VR image of an image file which differs from the currently-displayed VR image as a next display object. Subsequently, the CPU 201 returns to S301 and performs acquisition and display processing of the VR image that is the next display object.

In S315, the CPU 201 determines whether or not another operation has been performed. When another operation has been performed, the CPU 201 advances to S316, but otherwise the CPU 201 advances to S317. In S316, the CPU 201 executes processing in accordance with the other operation. Examples of the processing in accordance with the other operation include display processing in a binocular VR view of a VR image, deletion of the file of the VR image being displayed, sharing (posting to an SNS, mail transmission, instruction to use with another application, and the like), and editing processing such as tinge adjustment.

In S317, the CPU 201 determines whether or not an end operation with respect to the operating unit 206 has been performed. When there is no end operation, the CPU 201 returns to S305 and repeats the processing. When there is an end operation, the CPU 201 closes the application software that is the application for displaying the VR image and ends the processing shown in FIG. 3.

Figure 4:
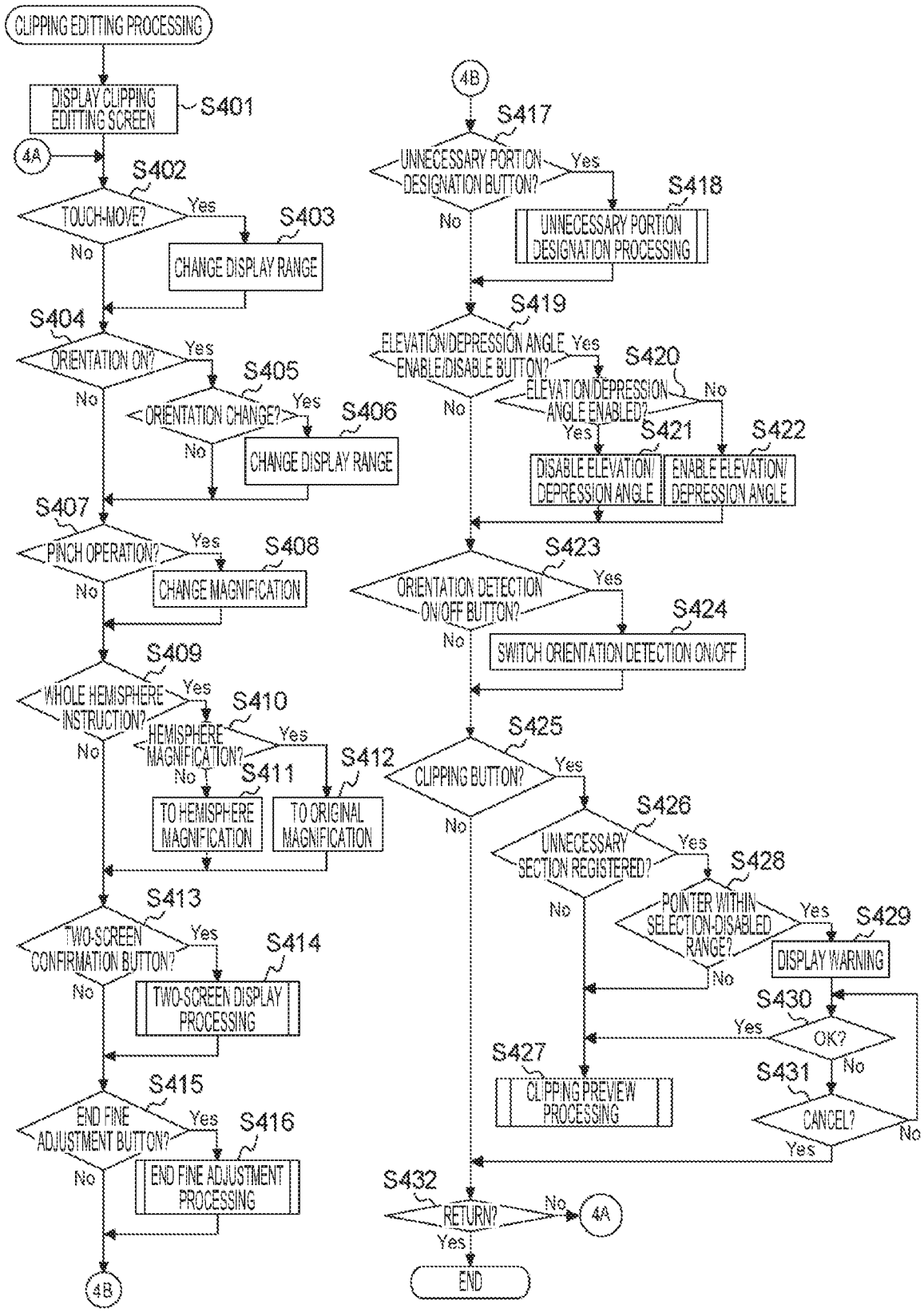
FIG. 4 is a flow chart of a clipping editing processing.

FIG. 4 is a flow chart of the clipping editing processing described earlier with reference to S312 shown in FIG. 3. This processing is realized as the CPU 201 deploys a program recorded in the nonvolatile memory 203 on the memory 202 and executes the program. The editing processing shown in FIG. 4 is, basically, processing of designating a center of a range to be clipped as a 180-degree VR image in the 360-degree VR image displayed in a VR view while maintaining the VR view. Although range designation can be finely adjusted, since a range to be clipped can be determined even by roughly determining a center without having to perform a fine adjustment, the range to be clipped can be designated in a simple manner. In a VR view, an entire VR image is often not displayed and, at the same time, a boundary of the range to be clipped is not a straight boundary as in the case of a planar image. Therefore, hypothetically, a method of determining a clipping range by an operation involving displaying a trimming frame and adjusting the displayed trimming frame is a hassle and difficult to understand for the user. Conversely, the clipping editing processing according to the present embodiment enables a range to be clipped as a 180-degree VR image in the 360-degree VR image to be designated by simply designating the center of the range while maintaining the VR view. Therefore, the user can perform clipping while experiencing an intuitive, easy-to-understand, and simple operation feeling.

Figure 6B:
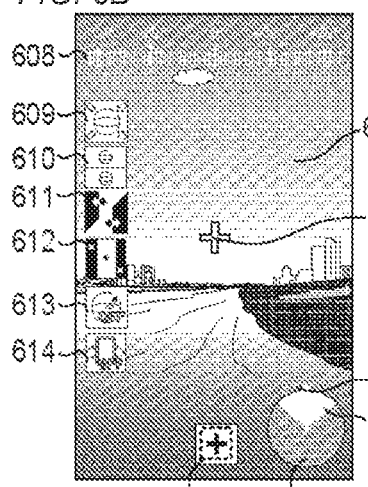
FIGS. 6B to 6D represent an example of a clipping editing screen.

In S401, the CPU 201 displays a clipping editing screen that is a screen for designating a clipping range on the display 205. FIG. 6B shows a display example of the clipping editing screen. The VR image 602 is the same VR image as the image displayed in a VR view display prior to the transition to the clipping editing screen. While the display range can be enlarged or reduced by a pinch operation, for example, the VR image 602 is displayed in a display range that is narrow than a range corresponding to 180 degrees immediately after the clipping editing screen is displayed (a default state). A pointer 603 is an indicator for designating a center of a clipping range (a reference position of a clipping range). A clipping button 604 is an instruction icon for designating a clipping range on the basis of a present display range (reference position). On the clipping editing screen, the pointer 603 is displayed at a position fixed to a central portion of the screen, and even when the display range of the VR image 602 changes, the position of the pointer 603 on the display 205 does not change. The user changes the display range of the VR image 602 displayed in a VR view by an operation that is approximately the same as an operation in an ordinary VR view so that a position of a desired object to be a center of a VR image after clipping assumes the position indicated by the pointer 603. In addition, by touching the clipping button 604, a range on the basis of the present display range (reference position) can be designated (or provisionally designated) as the range after the clipping. More specifically, the range after clipping can be designated so that a position of a VR image corresponding to the position where the pointer 603 is being displayed becomes a center or an orientation of center after clipping.

In a display direction guide indicated by a circle, a fan-shaped display range 605 indicates a range of orientations (an angular range around a zenith axis) of the present display range out of all orientations of the VR image indicated by a circle. A non-display range 606 indicates a range of orientations (an angular range around a zenith axis) which is not the present display range out of all orientations of the VR image indicated by the circle. A reference direction 607 indicates a direction (hereinafter, a display start direction) to be a center of a display range that is displayed first (in other words, prior to an operation of changing the display range and an occurrence of an orientation change) when starting display of the VR image 602.

Angle information 608 (an angle scale) indicates a present angle (an azimuth) of the pointer 603 with respect to the display start direction, and display of the angle information 608 is updated when the display range is changed. A whole hemisphere display button 609 is an instruction icon for switching, with a single touch, a display magnification of the VR image 602 to a magnification that includes a whole range designated as a range after clipping. A dual-screen confirmation button 610 is an instruction icon for switching to a display mode for simultaneously displaying a range designated as a clipping range and a deletion range which is not designated as a clipping range and which is discarded in the VR image after clipping. An end fine adjustment button 611 is an instruction icon for switching to a display mode for displaying an end (a boundary portion) of a clipping range in order to perform fine adjustment of the clipping range. An unnecessary portion designation button 612 is an instruction icon for switching to a mode for designating an unnecessary portion that is an object that is desirably not included in a clipping range. Once an unnecessary portion is designated, when designating a center of a clipping range so that the unnecessary portion is not included in the clipping range, a range that can be designated and a range that cannot be designated are to be identifiably displayed.

An elevation/depression angle enable/disable button 613 is an instruction icon for switching between enabling and disabling an elevation/depression angle corresponding to the present display range (an elevation/depression angle at a position indicated by the pointer 603 in an entire VR image mapped onto a sphere) as a center of a clipping range. In addition, the elevation/depression angle enable/disable button 613 also represents a present setting and is displayed as an icon in a display mode indicating an enabled state when the present setting is the enabled state but displayed as an icon in a display mode indicating a disabled state when the present setting is the disabled state. When enabled, a range of respectively 90 degrees in a periphery for a total of 180 degrees (a hemispheric range) with the elevation/depression angle of the orientation indicated by the pointer 603 as center is adopted as a clipping range. When disabled, a range of respectively 90 degrees in a periphery for a total of 180 degrees (a hemispheric range) with an elevation/depression angle of 0 degrees or, in other words, a position indicated by the pointer 603 on a horizontal surface as center is adopted as a clipping range instead of a range on the basis of the elevation/depression angle indicated by the pointer 603. It is assumed that, in an initial setting prior to the user performing a designation operation, the elevation/depression angle enable/disable setting is set to disabled.

An orientation detection ON/OFF button 614 is an instruction icon for switching between enabling and disabling a change to the display range of the VR image 602 due to an orientation change. In addition, the orientation detection ON/OFF button 614 also represents a present setting and is displayed as an icon in a display mode indicating an enabled state when the present setting is the enabled state but displayed as an icon in a display mode indicating a disabled state when the present setting is the disabled state. Although the enabled setting is simple and intuitive because a center of a clipping range can be determined by merely changing an orientation of the electronic device 200, since the display range frequently changes by an orientation change alone, sometimes it is difficult to make an adjustment to a desired display range. Since the disabled setting can prevent the display range from being changed due to an orientation change, an unintentional change to the display range can be prevented and an adjustment to a display range that more closely conforms to the user's intention can be performed with an operation (a slide operation) by a touch-move. In an initial setting prior to the user performing a designation operation, the orientation detection ON/OFF setting may be set to disabled (OFF).

In S402 and S403, the CPU 201 changes the display range in accordance with a touch-move with respect to the region where the VR image 602 is displayed. Details of the processing is similar to that in S305 and S306 shown in FIG. 3 described earlier. As described earlier, even when the display range changes, the display position of the pointer 603 on the display 205 does not change. When the display range of a VR image changes, a relative positional relationship of the pointer 603 with respect to the VR image changes. In addition, according to the processing, a width (180 degrees) of a clipping range in the clipping processing to be described later in S502 and S503 does not change but a position of the clipping range in the VR image prior to clipping is changed.

Figure 6C:
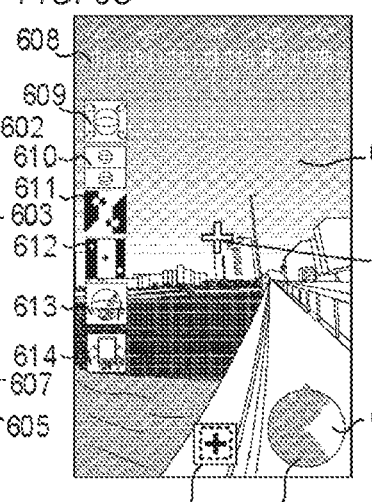

FIG. 6C shows a display example in a case where the display range is changed by a leftward touch-move from the state shown in FIG. 6B. The display range of the VR image 602 has been changed and, in accordance therewith, the angle information 608 as well as the ranges indicated by the display range 605 and the non-display range 606 in the display direction guide have also been changed. The VR image 602 has been scrolled so as to move to the left as compared to FIG. 6B, and a right-side region in the VR image has been newly made a display range as compared to the state shown in FIG. 6B. In other words, the display range has moved to the right. In the example shown in FIG. 6C, as is apparent from the angle information 608 and the display direction guide, the display range has been changed to a direction facing approximately 90 degrees to the right as compared to the display range shown in FIG. 6B. The display range includes, as objects, vehicles passing by in a direction where license plates are readable. For example, the user considers such license plates of passing vehicles are not information that should be disclosed and wishes to omit the license plates from the image after clipping.

Figure 6D:
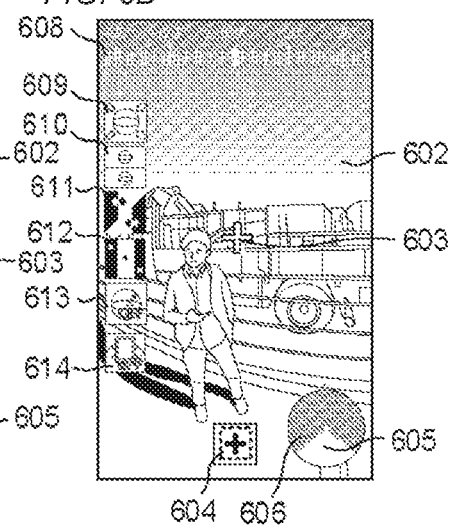

FIG. 6D shows a display example in a case where the display range is changed by a further leftward touch-move from the state shown in FIG. 6C. The display range of the VR image 602 has been changed and, in accordance therewith, the angle information 608 as well as the ranges indicated by the display range 605 and the non-display range 606 in the display direction guide have also been changed. The VR image 602 has been scrolled so as to move to the left as compared to FIG. 6C, and a right-side region in the VR image has been newly made a display range as compared to the state shown in FIG. 6C. In other words, the display range has moved to the right. In the example shown in FIG. 6D, as is apparent from the angle information 608 and the display direction guide, the display range has been changed to a direction facing approximately directly behind (180 degrees rightward) as compared to the display range shown in FIG. 6B. The display range includes the photographer himself as an object. For example, the user does not consider the photographer himself a primary object originally intended to be photographed and wishes to omit the photographer from the image after clipping.

In S404, the CPU 201 refers to the setting information held in the memory 202 and determines whether or not the function for changing a display range in accordance with orientation detection has been enabled (turned on). Enabling (turning on)/disabling (turning off) the function for changing a display range in accordance with orientation detection is a setting item that can be set by a touch operation with respect to the orientation detection ON/OFF button 614 described earlier. When the function for changing a display range in accordance with orientation detection is enabled (turned on), the CPU 201 advances to S405, but otherwise the CPU 201 advances to S407. In S405 and S406, the CPU 201 changes the display range of the VR image 602 in accordance with the orientation change detected by the orientation detecting unit 213. Since this processing is similar to that in S307 and S308 shown in FIG. 3 described earlier, details thereof will be omitted. It should be noted that, according to the processing, a width (180 degrees) of a clipping range in the clipping processing to be described later in S502 and S503 does not change but a position of the clipping range in the VR image prior to clipping is changed. When the CPU 201 determines that the function for changing a display range in accordance with orientation detection is disabled (turned off) in S404, the CPU 201 advances to S407 without advancing to S405 and S406 and does not change the display range in accordance with a change in orientation even when a change in orientation is detected by the orientation detecting unit 213.

In S407 and S408, the CPU 201 changes a display magnification of the VR image 602 in accordance with a pinch operation (a magnification change instruction). Since this processing is similar to that in S309 and S310 shown in FIG. 3 described earlier, details thereof will be omitted.

In S409, on the basis of information notified from the touch panel 206a, the CPU 201 determines whether or not a touch operation (a whole hemisphere instruction; a magnification change instruction) with respect to the whole hemisphere display button 609 has been performed. When a touch operation designating the whole hemisphere display button 609 has been performed, the CPU 201 advances to S410, but otherwise the CPU 201 advances to S413. In S410, the CPU 201 determines whether or not the present display magnification is already a magnification (hemisphere magnification) for whole hemisphere display. The determination may be made by referring to the present display magnification or by referring to the present display mode. When the display magnification is already the hemisphere magnification, the CPU 201 advances to S412 in order to restore an original display magnification. When the display magnification is not the hemisphere magnification, the CPU 201 advances to S411 to switch to display at the hemisphere magnification. In other words, whole hemisphere display (hemisphere magnification display) is switched on and off every time a touch operation with respect to the whole hemisphere display button 609 is performed.

In S411, the CPU 201 performs whole hemisphere display after recording the present display magnification prior to switching to whole hemisphere display in the memory 202. Whole hemisphere display is a display at a magnification at which an entire clipping range having been clipped with a position currently indicated by the pointer 603 as center fits within the display range on the display 205. While a display magnification that includes a range of a hemisphere is adopted as the hemisphere magnification in the present embodiment in order to make a 180-degree range a clipping range, a clipping range that is not 180 degrees is not limited to a hemisphere range and is displayed at a magnification that enables an entire clipping range to be fitted into the display range.

Figure 7A:
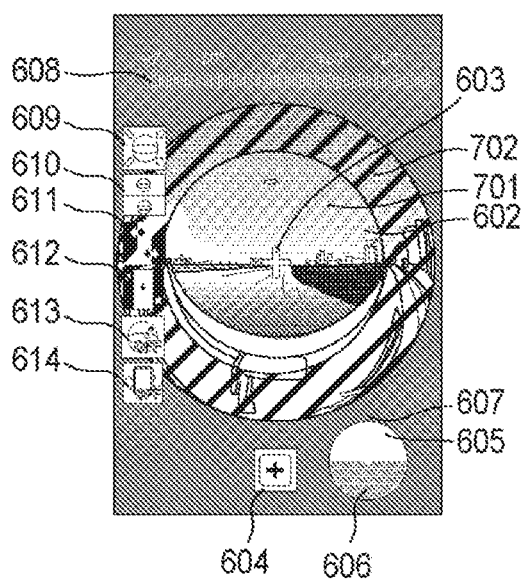
FIGS. 7A and 7B represent an example of whole hemisphere display.

FIG. 7A shows a display example of whole hemisphere display on the clipping editing screen. When an instruction for whole hemisphere display is issued from a normal display magnification in a VR view (an initial magnification that is initially displayed upon starting display in a VR view) as shown in FIG. 6B, the normal display magnification is switched with a single touch (without stopping at another magnification) to the display magnification shown in FIG. 7A (a magnification that is lower than the initial magnification). The VR image 602 shown in FIG. 7A represents displaying a same image as the VR image 602 displayed in FIG. 6B at a magnification for whole hemisphere display. Since a range equal to or wider than 180 degrees originally intended to be mapped onto a sphere is fitted into a planar display range, the VR image 602 of which a periphery is distorted as though photographed by a fish-eye lens is displayed. A hatched portion 702 is superimposed and displayed on the VR image 602. The hatched portion 702 indicates a range to be outside of the clipping range (outside of a 180-degree range from the position indicated by the pointer 603) in the displayed VR image 602 and indicates a range to be deleted (an excluded range) in the image after clipping. The user can confirm a portion included in the clipping range by looking at a portion 701 without hatchings in a central portion in the VR image 602 and can confirm the excluded range by looking at the hatched portion 702 in the VR image 602. Therefore, the clipping range can be designated by confirming how much of the VR image 602 is to be included and how much of the VR image 602 is not to be included in the clipping range. Accordingly, an operation such as setting the clipping range such that vehicles and people passing by are in the excluded range while fitting a river that is a main object into the clipping range can be readily performed.

Since the hatched portion 702 need only be recognized as being an excluded range, a display mode thereof is not limited to hatchings and the excluded range may be indicated by other display modes such as a semitransparent mask, screening, and monochromatic display. Alternatively, a display mode may be adopted in which, instead of indicating the excluded range, only a boundary between the clipping range and the excluded range is indicated by a circular line or the like. In addition, instead of displaying the excluded range, the clipping range may be displayed so that the inside of the clipping range is entirely included in the display range. Processing in accordance with the various operations described in the processing shown in FIG. 4 can be performed even during whole hemisphere display. In other words, an adjustment can be performed so that a desired range becomes the clipping range by changing the display range in accordance with an orientation change or a touch-move. In addition, the clipping range can be determined by processing in accordance with a touch operation with respect to the clipping button 604 to be described later in S425 to S431. The hatched portion 702 indicating the excluded range may be configured to be displayed in the case of whole hemisphere display in accordance with a touch operation with respect to the whole hemisphere display button 609 and not displayed when display magnification is lowered from normal magnification by a pinch-in. Alternatively, the hatched portion 702 indicating the excluded range may be configured to be displayed in the case of whole hemisphere display in accordance with a touch operation with respect to the whole hemisphere display button 609 and also displayed when display magnification is lowered from normal magnification by a pinch-in.

In S412, from a state where whole hemisphere display has been performed, the CPU 201 refers to an original display magnification prior to switching which is held in the memory 202 and restores a display state at the original display magnification. In other words, for example, the CPU 201 switches a display state shown in FIG. 7A to a display state shown in FIG. 6B. Accordingly, a state in which a peripheral portion is distorted and displayed small is switched to a display state in which the central portion included in the clipping range is displayed large with no distortion or with reduced distortion.

In S413, on the basis of information notified from the touch panel 206a, the CPU 201 determines whether or not a touch operation with respect to the dual-screen confirmation button 610 has been performed. When a touch operation designating the dual-screen confirmation button 610 has been performed, the CPU 201 advances to S414, but otherwise the CPU 201 advances to S415. In S414, the CPU 201 performs a dual-screen display processing. The dual-screen display processing will be described later with reference to FIGS. 8, 9A, and 9B.

In S415, on the basis of information notified from the touch panel 206a, the CPU 201 determines whether or not a touch operation with respect to the end fine adjustment button 611 (a fine adjustment instruction for starting a fine adjustment of the display range) has been performed. When a touch operation designating the end fine adjustment button 611 has been performed, the CPU 201 advances to S416, but otherwise the CPU 201 advances to S417. In S416, the CPU 201 performs an end fine adjustment processing. The end fine adjustment processing will be described later with reference to FIGS. 10 and 11A to 11D.

In S417, on the basis of information notified from the touch panel 206a, the CPU 201 determines whether or not a touch operation with respect to the unnecessary portion designation button 612 has been performed. When a touch operation designating the unnecessary portion designation button 612 has been performed, the CPU 201 advances to S418, but otherwise the CPU 201 advances to S419. In S418, the CPU 201 performs unnecessary portion designation processing. The unnecessary portion designation processing will be described later with reference to FIGS. 12, 13A to 13D, and 14A to 14G.

In S419, on the basis of information notified from the touch panel 206a, the CPU 201 determines whether or not a touch operation with respect to the elevation/depression angle enable/disable button 613 (a switching instruction for switching between enabling and disabling the elevation/depression angle) has been performed. When a touch operation designating the elevation/depression angle enable/disable button 613 has been performed, the CPU 201 advances to S420, but otherwise the CPU 201 advances to S423. In S420, the CPU 201 refers to setting information held in the memory 202 and determines whether or not the present setting prior to accepting the touch operation with respect to the elevation/depression angle enable/disable button 613 is elevation/depression angle-enabled. When the CPU 201 determines that the present setting is elevation/depression angle-enabled, the CPU 201 advances to S421, but when the present setting is elevation/depression angle-disabled, the CPU 201 advances to S422. In S421, the CPU 201 sets the setting of elevation/depression angle enable/disable by changing enabled to disabled and records the setting state in the memory 202. In S422, the CPU 201 sets the setting of elevation/depression angle enable/disable by changing disabled to enabled and records the setting state in the memory 202. When the setting of elevation/depression angle enable/disable is changed, a display mode of the elevation/depression angle enable/disable button 613 is also updated so as to indicate the setting state after the change. It should be noted that, when the setting of elevation/depression angle enable/disable is set to disabled in S421, a direction in which the display range of the VR image 602 can be changed in S403 and S406 may be limited to an azimuth direction and the display range may be prevented from being changed in the elevation/depression angle direction. In other words, a restriction may be applied such that, in accordance with a touch-move or an orientation change, a horizontal scroll (a change of the display range in the azimuth direction) is performed but a vertical scroll (a change of the display range in the elevation/depression angle direction) is not performed.

In S423, on the basis of information notified from the touch panel 206*a*, the CPU 201 determines whether or not a touch operation with respect to the orientation detection ON/OFF button 614 has been performed. When a touch operation designating the orientation detection ON/OFF button 614 has been performed, the CPU 201 advances to S424, but otherwise the CPU 201 advances to S425. In S424, the CPU 201 changes a setting state of a change function of the display range in accordance with orientation detection. When the setting prior to the change is enabled (ON), the setting is changed to disabled (OFF) and setting information indicating the setting after the change is recorded in the memory 202. When the setting prior to the change is disabled (OFF), the setting is changed to enabled (ON) and setting information indicating the setting after the change is recorded in the memory 202. When the setting state of the change function of the display range in accordance with orientation detection is changed, a display mode of the orientation detection ON/OFF button 614 is also updated so as to indicate the setting state after the change.

In S425, on the basis of information notified from the touch panel 206*a*, the CPU 201 determines whether or not a touch operation with respect to the clipping button 604 (a clipping instruction, a designation operation of a reference position) has been performed. When a touch operation designating the clipping button 604 has been performed (when a clipping instruction has been accepted), the CPU 201 advances to S426, but otherwise the CPU 201 advances to S432.

In S426, the CPU 201 determines whether or not an unnecessary portion has been registered by unnecessary portion designation processing to be described later. When an unnecessary portion is registered, the CPU 201 advances to S428, but when an unnecessary portion is not registered, the CPU 201 advances to S427. In S427, the CPU 201 performs clipping preview processing. The clipping preview processing will be described later with reference to FIG. 5. Alternatively, the CPU 201 may advance to S427 without performing the processing of S426 when the CPU 201 determines in S425 that a touch operation with respect to the clipping button 604 has been performed. Furthermore, the CPU 201 may advance to S535 in FIG. 5 to be described later and perform clipped VR image saving processing without performing the processing of S426 and S427 when the CPU 201 determines in S425 that a touch operation with respect to the clipping button 604 has been performed. Since the processing of S428 to S431 is processing in a case where an unnecessary portion is registered and are similar to the processing in S1215 to S1218 shown in FIG. 12 to be described later, details thereof will be omitted.

In S432, the CPU 201 determines whether or not the clipping editing processing has ended and an operation to return to the processing of VR view display shown in FIG. 3 has been performed. When a return operation has not been performed, the CPU 201 returns to S402 to repeat the processing, but when a return operation has been performed, the CPU 201 ends the processing shown in FIG. 4, performs original VR view display, and advances to S313 shown in FIG. 3.

Figure 5:
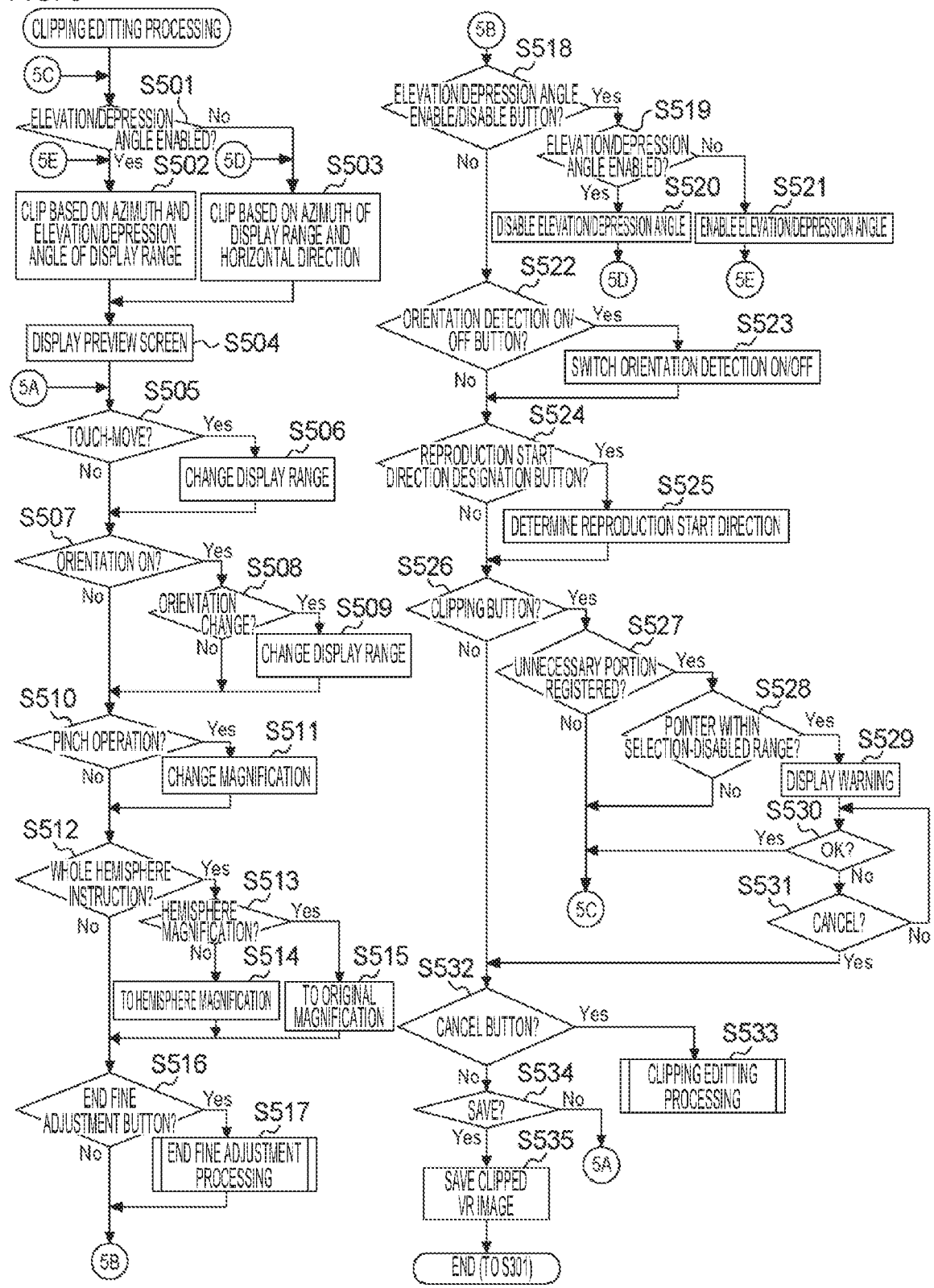
FIG. 5 is a flow chart of a clipping preview processing.

FIG. 5 is a flow chart of the clipping editing processing described earlier with reference to S427 shown in FIG. 4. This processing is realized as the CPU 201 deploys a program recorded in the nonvolatile memory 203 on the memory 202 and executes the program. The clipping preview processing shown in FIG. 5 is processing for confirming whether or not the designation of the clipping range by the user in the clipping editing processing shown in FIG. 4 can be finalized.

In S501, the CPU 201 refers to setting information held in the memory 202 and determines whether or not the present setting is elevation/depression angle-enabled. It should be noted that a setting of the setting item referred to at this point can be changed by a touch operation with respect to the elevation/depression angle enable/disable button 613. When the CPU 201 determines that the present setting is elevation/depression angle-enabled, the CPU 201 advances to S502, but when the present setting is elevation/depression angle-disabled, the CPU 201 advances to S503.

In S502, the CPU 201 determines the clipping range on the basis of an azimuth and an elevation/depression angle of the present display range (the display range immediately prior to the clipping button 604 being touched on the clipping editing screen of the processing described with reference to FIG. 4 or on a preview screen to be described later) and performs clipping processing. More specifically, the CPU 201 clips a 180-degree range (a range of respectively 90 degrees in all directions from center) centered on the center of the display range (the position where the pointer 603 is displayed) from a 360-degree VR image and generates a 180-degree VR image (an edited VR content). This processing will be described later with reference to FIGS. 16A and 16C.

In S503, the CPU 201 determines the clipping range on the basis of an azimuth and the horizontal direction (an elevation/depression angle of 0 degrees) of the present display range (the display range immediately prior to the clipping button 604 being touched on the clipping editing screen of the processing described with reference to FIG. 4 or on a preview screen to be described later) and performs clipping processing. In doing so, the clipping range is determined on the basis of the horizontal direction (a direction perpendicular to the zenith axis) regardless of the elevation/depression angle of the display range prior to clipping. More specifically, the CPU 201 clips a 180-degree range centered on one point determined by an azimuth corresponding to the center of the display range (the position where the pointer 603 is displayed) in the horizontal direction from a 360-degree VR image and generates a 180- degree VR image (an edited VR content). This processing will be described later with reference to FIGS. 16A and 16B.

Figure 6E:
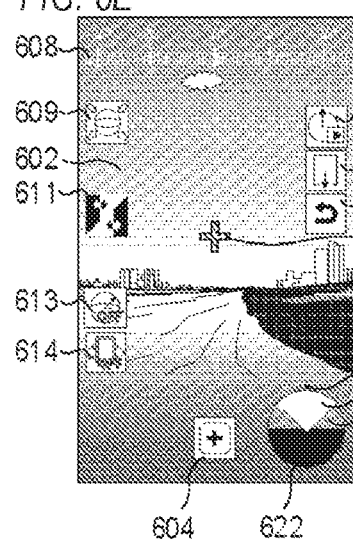
FIGS. 6E to 6G represent an example of a preview screen.
Figure 6F:
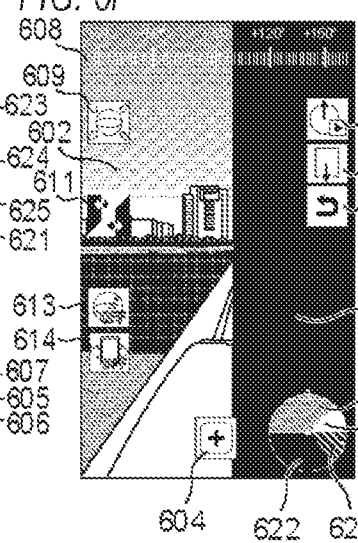
Figure 6G:
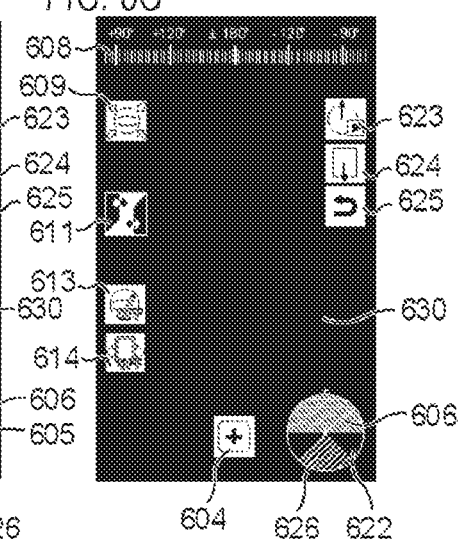

In S504, the CPU 201 displays a preview screen that enables a clipping result in S502 or S503 to be confirmed on the display 205. FIGS. 6E, 6F, and 6G show a display example of the preview screen.

FIG. 6E represents a display example of the preview screen in a case where the clipping button 604 is touched in the state shown in FIG. 6B (a state where the display range in the VR image 602 is the range shown in FIG. 6B) and a transition is made to the clipping preview processing. A circular display direction guide in a lower right part of the screen displays, in addition to the fan-shaped display range 605 and the non-display range 606, an excluded range 622 (a blacked-out portion in FIG. 6E) indicating a range outside of the clipping range (an excluded region). Accordingly, the user can identify that a state now exists where an image is absent in a range corresponding to the excluded range 622 out of all directions of 360 degrees of the VR image 602. In addition, the display mode of the pointer 603 is changed and displayed as a pointer 621. On the preview screen, the pointer 621 is displayed as an indicator indicating a center of the designated clipping range. Therefore, the pointer 621 is displayed at a position indicating a center of the clipping range (a valid video range) of the VR image 602 instead of being fixed to the center of the display 205. For this reason, in accordance with the change to the display range, a display position of the pointer 621 also moves in conjunction with a movement of the display position of the center of the clipping range (the valid video range) of the VR image 602. Other display items denoted by the same reference numerals as FIG. 6B represent display items similar to those of the clipping editing screen. The dual-screen confirmation button 610 and the unnecessary portion designation button 612 are hidden on the preview screen. A reproduction start direction designation button 623, a save button 624, and a cancel button 625 are displayed as display items that are not displayed on the clipping editing screen but are displayed on the preview screen. The reproduction start direction designation button 623 is an instruction icon for designating a portion to become a display range when next displaying the VR image after clipping for the first time. A center of the display range at a time point where a touch operation with respect to the reproduction start direction designation button 623 (a direction designation instruction for designating a reproduction start direction) is adopted as a center of the display range when next displaying the VR image after clipping for the first time or, in other words, the display start direction described earlier in the VR image after clipping. The save button 624 is an instruction icon for issuing an instruction to finalize the clipping range and record an image file of the VR image after clipping. The cancel button 625 is an instruction icon for returning to the clipping editing screen without saving the VR image in the present clipping range.

In S505 and S506, the CPU 201 changes the display range in accordance with a touch-move with respect to the region where the VR image 602 is displayed. Details of the processing are similar to that in S305 and S306 shown in FIG. 3 described earlier. As described earlier, when the display range changes, the display position of the pointer 621 on the display 205 also changes. Even when the display range of a VR image changes, a relative positional relationship of the pointer 621 with respect to the VR image does not change.

FIG. 6F shows a display example in a case where the display range is changed by a leftward touch-move from the state shown in FIG. 6E. The display range of the VR image 602 has been changed and, in accordance therewith, the angle information 608 as well as the ranges indicated by the display range 605 and the non-display range 606 out of the display direction guide have also been changed. Out of the display direction guide, a portion of the excluded range included in the display range is identifiably displayed by a pattern 626. The VR image 602 has been scrolled so as to move to the left as compared to FIG. 6E, and a right-side region in the VR image has been newly made a display range as compared to the state shown in FIG. 6E. In other words, the display range has moved to the right. In the example shown in FIG. 6E as is apparent from the angle information 608 and the display direction guide, the display range has been changed to a direction facing approximately 90 degrees rightward as compared to the display range shown in FIG. 6E. Since clipping is performed in a 180-degree range centered on the position indicated by the pointer 621, an excluded range 630 starts to appear within the display range. The excluded range 630 need only be identifiable as a range in which a valid video is not present and may be displayed in monochrome or in a display mode such as a prescribed pattern or gradation. It can be confirmed that, in FIG. 6F, the vehicle passing in an orientation where the license plate is visible which has been described with reference to FIG. 6C as an example of an object that the user wishes to exclude from the image after clipping has been excluded as the excluded range 630 and is not included in the VR image after clipping.

FIG. 6G shows a display example in a case where the display range is changed by a further leftward touch-move from the state shown in FIG. 6F. The display range of the VR image 602 has been changed and, in accordance therewith, the angle information 608 as well as the ranges indicated by the display direction guide have also been changed. In the example shown in FIG. 6G, as is apparent from the angle information 608 and the display direction guide, the display range has been changed to a direction facing approximately directly behind (180 degrees rightward) as compared to the display range shown in FIG. 6E. The VR image 602 is not included inside the display range and the excluded range 630 occupies the entire display range. It can be confirmed that, in FIG. 6G, the photographer himself/herself which has been described with reference to FIG. 6D as an example of an object that the user wishes to exclude from the image after clipping has been excluded as the excluded range 630 and is not included in the VR image after clipping.

Figure 7B:
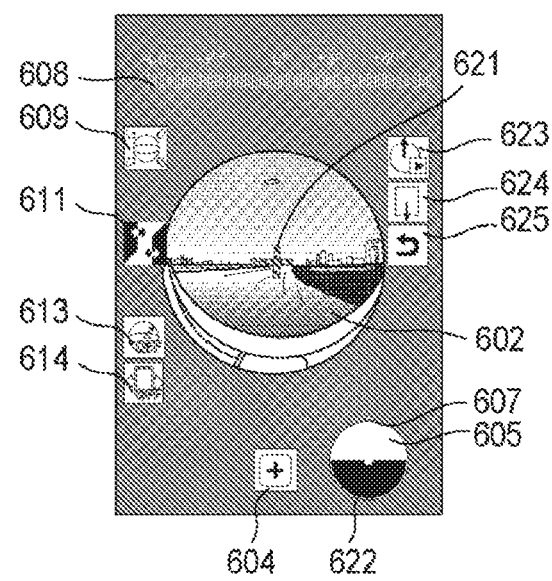

Since the processing of S507 to S515 is change processing of a display range in accordance with an orientation change, change processing of a display magnification in accordance with a pinch operation, and display processing at a hemisphere magnification in accordance with a whole hemisphere instruction and are similar to the processing of S404 to S412 shown in FIG. 4 described earlier, a description thereof will be omitted. It should be noted that, in the whole hemisphere display in S514, unlike the whole hemisphere display in S411, the excluded range (a portion indicated by the hatched portion 702 in FIG. 7A) is not displayed. FIG. 7B shows a display example of whole hemisphere display on the preview screen. In order to display only a valid video range of the VR image after clipping with the exception of the excluded range, the portion indicated by the hatched portion 702 in FIG. 7A is not displayed. In other words, in the VR image prior to clipping, the outside of the valid video range after the clipping is hidden. Due to such display, the user can confirm, within a single screen, what kind of objects are positioned in a central portion of the VR image after clipping and how much of the objects are included in the clipping range. When a touch operation with respect to the clipping button 604 is performed in the display state shown in FIG. 7A, a transition is made to the display state shown in FIG. 7B. A transition to the display state shown in FIG. 7B is also made when a touch operation with respect to the whole hemisphere display button 609 is performed in the display states shown in FIGS. 6E to 6G.

Since S516 and S517 include processing in accordance with a touch operation with respect to the end fine adjustment button 611 and are similar to the processing of S415 and S416 described earlier, a description thereof will be omitted.

Since S518 to S521 include processing in accordance with a touch operation with respect to the elevation/depression angle enable/disable button 613 and are similar to the processing of S419 to S422 described earlier, a description thereof will be omitted. When the setting is switched from elevation/depression angle-enabled to elevation/depression angle-disabled in S520, the CPU 201 advances to S503 and changes the clipping range. When the CPU 201 advances to S503 from S520, instead of setting the clipping range on the basis of the display range at that time point, the clipping range is set on the basis of the display range upon performing an operation of the clipping button 604 which had caused the clipping range at the time point of S520 to be determined. In other words, a 180-degree range (a range of a hemisphere) is clipped from a 360-degree VR image (a range of a sphere) so that an elevation/depression angle at the center of the clipping range becomes a horizontal direction while maintaining an orientation of the center of the clipping range at the time point of S520. In addition, when the setting is switched from elevation/depression angle-disabled to elevation/depression angle-enabled in S521, the CPU 201 advances to S502 and changes the clipping range. When the CPU 201 advances to S502 from S521, instead of setting the clipping range on the basis of the display range at that time point, the clipping range is set on the basis of the display range upon performing an operation of the clipping button 604 which had caused the clipping range at the time point of S521 to be determined. In other words, a 180-degree VR image is clipped from a 360-degree VR image so that an elevation/depression angle at the center of the clipping range becomes the elevation/depression angle of the display range upon operation of the clipping button 604 which had caused the clipping range at the time point of S521 to be determined while maintaining an orientation of the center of the clipping range at the time point of S521.

Since the processing of S522 and S523 is processing in accordance with a touch operation with respect to the orientation detection ON/OFF button 614 and are similar to the processing of S423 and S424 described earlier, a description thereof will be omitted.

In S524, on the basis of information notified from the touch panel 206a, the CPU 201 determines whether or not a touch operation with respect to the reproduction start direction designation button 623 has been performed. When a touch operation with respect to the reproduction start direction designation button 623 has been performed, the CPU 201 advances to S525, but otherwise the CPU 201 advances to S526. In S525, the CPU 201 determines a center of the present display range as a display start direction of the VR image after clipping, and records positional information indicating the center of the present display range in the VR image in the memory 202. The positional information is recorded as information indicating a display start direction in attribute information of an image file of the clipped VR image in S535 to be described later.

In S526, on the basis of information notified from the touch panel 206a, the CPU 201 determines whether or not a touch operation with respect to the clipping button 604 has been performed. When a touch operation designating the clipping button 604 has been performed, the CPU 201 advances to S527, but otherwise the CPU 201 advances to S532.

In S527, the CPU 201 determines whether or not an unnecessary portion has been registered by unnecessary portion designation processing to be described later. When an unnecessary portion is registered, the CPU 201 advances to S528, but when an unnecessary portion is not registered, the CPU 201 advances to S501. Next, the CPU 201 advances to S502 or S503 from S501 and changes a clipping range on the basis of the display range at the time point where a determination is made in S526 that a touch operation has been performed with respect to the clipping button 604. In this manner, in the present embodiment, when desiring to change the clipping range on the preview screen, by performing a touch operation with respect to the clipping button 604, the clipping range can be corrected on the basis of the display range at that time point or, more specifically, a position of the center of the display range at that time point. When clipping is performed once again in S502 or S503, the preview screen is updated in S504 so as to indicate a corrected clipping range. Alternatively, the preview screen may be configured so that the clipping range cannot be corrected on the preview screen. In this case, the clipping button 604 is hidden or displayed in a display mode indicating inoperability such as grayout and the determination of S526 is not performed. Even so, when the user desires to change the clipping range while looking at the preview screen, the user can change the clipping range by performing a touch operation with respect to the cancel button 625 and re-designating the clipping range after returning to the clipping editing screen. Since the processing of S528 to S531 is processing in a case where an unnecessary portion is registered and are similar to the processing in S1215 to S1218 shown in FIG. 12 to be described later, details thereof will be omitted.

In S532, on the basis of information notified from the touch panel 206a, the CPU 201 determines whether or not a touch operation with respect to the cancel button 625 has been performed. When a touch operation with respect to the cancel button 625 has been performed, the CPU 201 advances to S533 and returns to the clipping editing processing (the clipping editing screen) described earlier with reference to FIG. 4. When a touch operation with respect to the cancel button 625 has not been performed, the CPU 201 advances to S534.

In S534, on the basis of information notified from the touch panel 206a, the CPU 201 determines whether or not a touch operation with respect to the save button 624 has been performed. When a touch operation with respect to the save button 624 has been performed, the CPU 201 advances to S535, but otherwise the CPU 201 advances to S505 and repeats the processing.

In S535, the CPU 201 generates an image file that can be displayed in a VR view from the VR image having already been clipped in the clipping range confirmed on the preview screen, and records the generated image file in the recording medium 208. In this case, it is assumed that an image on which the clipping processing has been performed in S502 or S503 from a 360-degree VR image prior to clipping and which is held in the memory 202 or the recording medium 208 is recorded as an image file. Alternatively, a 180-degree VR image may be once again clipped from a 360-degree VR image prior to clipping at the time point of S535 by controlling the image processing unit 204 and the clipped 180-degree VR image may be recorded. In addition, it is assumed that the image file of the clipped VR image is recorded as a newly saved file. Alternatively, the image file of the clipped VR image may be saved by being overwritten on the image file of the 360-degree VR image prior to clipping. The image file of the clipped VR image is recorded in a format that is compliant to VR 180 standards. Once the CPU 201 records the image file of the clipped VR image, the CPU 201 ends the processing shown in FIG. 5, returns to S301 shown in FIG. 3, and performs VR view display of the 360-degree VR image that is the clipping source. Alternatively, VR view display of the newly-saved clipped 180-degree VR image may be performed after ending the processing shown in FIG. 5.

Figure 18A:
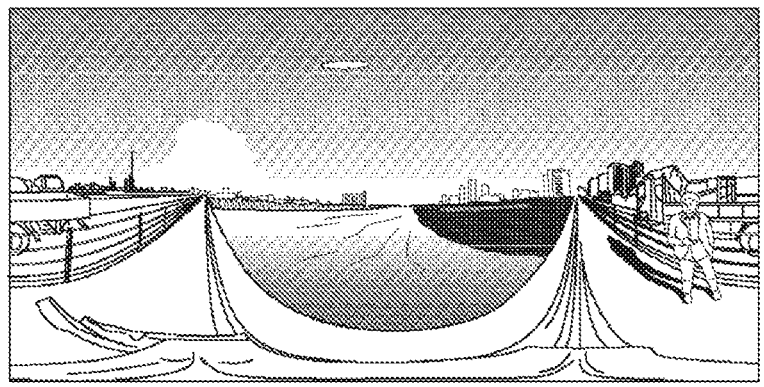
FIGS. 18A to 18D represent examples of various ways to display a VR image.
Figure 18B:
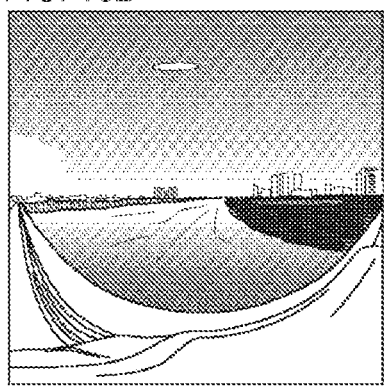
Figure 18C:
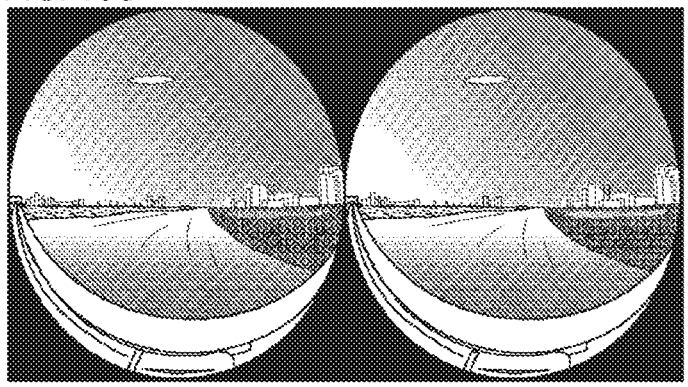
Figure 18D:
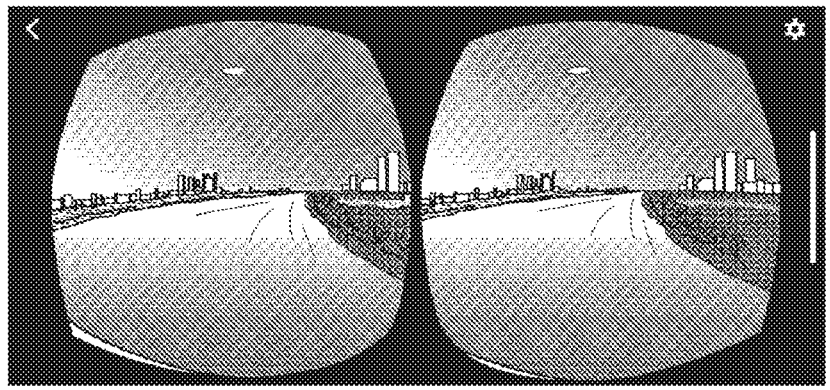

The clipped VR image (an image file that can be displayed in a VR view) to be recorded in S535 will be described. When the clipped VR image is a still image, a single file is generated and recorded, the single file storing, in a multi-picture format, a plurality of images created by deforming an image within a clipping range by equidistant cylindrical projection and fitting the deformed image into a rectangle. When a 360-degree VR image prior to clipping (an original image) is displayed as an ordinary planar image instead of a VR view, an image drawn by equidistant cylindrical projection in a rectangle such as that shown in FIG. 18A is obtained. When a 180-degree range is clipped from the original image by the processing described earlier, an image drawn by equidistant cylindrical projection in an approximate square such as that shown in FIG. 18B is recorded when the clipped 180-degree range is displayed as an ordinary planar image instead of a VR view. In doing so, two of a same image obtained by copying the image within the clipping range are respectively recorded in a same file as a right-eye image and a left-eye image even when there is no parallax. Alternatively, two 180-degree ranges may be clipped and generated from one 360-degree VR image prior to clipping so as to have a pseudo-parallax (in other words, so that ranges of the left-eye image and the right-eye image slightly differ from each other). Even in this case, the clipping range is determined on the basis of the display range upon performance of a touch operation of the clipping button 604. For example, a file name of a VR image of a clipped still image is "123456.vr.jpg" in which a character string made up of three characters ".vr" is described before the extension ".jpg". When an image saved as a still image file in this manner is reproduced and displayed in a VR view, the image shown in FIG. 18B is mapped onto a hemisphere and displayed. FIG. 18D shows an example in which a VR image file of a clipped still image is reproduced and displayed by a binocular VR view (a display example on the display 205 in a state where the display 205 is not mounted on VR goggles).

When the clipped VR image is a moving image, a moving image file is generated and recorded, the moving image file having videos (moving images) obtained by mapping the image within the clipping range to the inside of a circle or an ellipse instead of equidistant cylindrical projection and being arranged horizontally (side by side) inside the video of a single moving image. In doing so, two of a same image obtained by copying the image within the clipping range are respectively arranged horizontally and recorded as a right-eye image and a left-eye image even when there is no parallax. When such a moving image is displayed as an ordinary planar image instead of a VR view, the moving image is displayed as shown in FIG. 18C. Alternatively, two 180-degree ranges may be clipped and generated from one 360-degree VR image prior to clipping so as to have a pseudo-parallax (in other words, so that ranges of the left-eye image and the right-eye image slightly differ from each other). Even in this case, the clipping range is determined on the basis of the display range upon performance of a touch operation of the clipping button 604. For example, a file name of a VR image of a clipped moving image is "123456.vr.mp4" in which a character string made up of three characters ".vr" is described before the extension ".mp4". A display example of a given frame of a VR image file of a clipped moving image when reproduced and displayed in a binocular VR view (a display example on the display 205 in a state where the display 205 is not mounted on VR goggles) is similar to the example shown in FIG. 18D.

Figure 8:
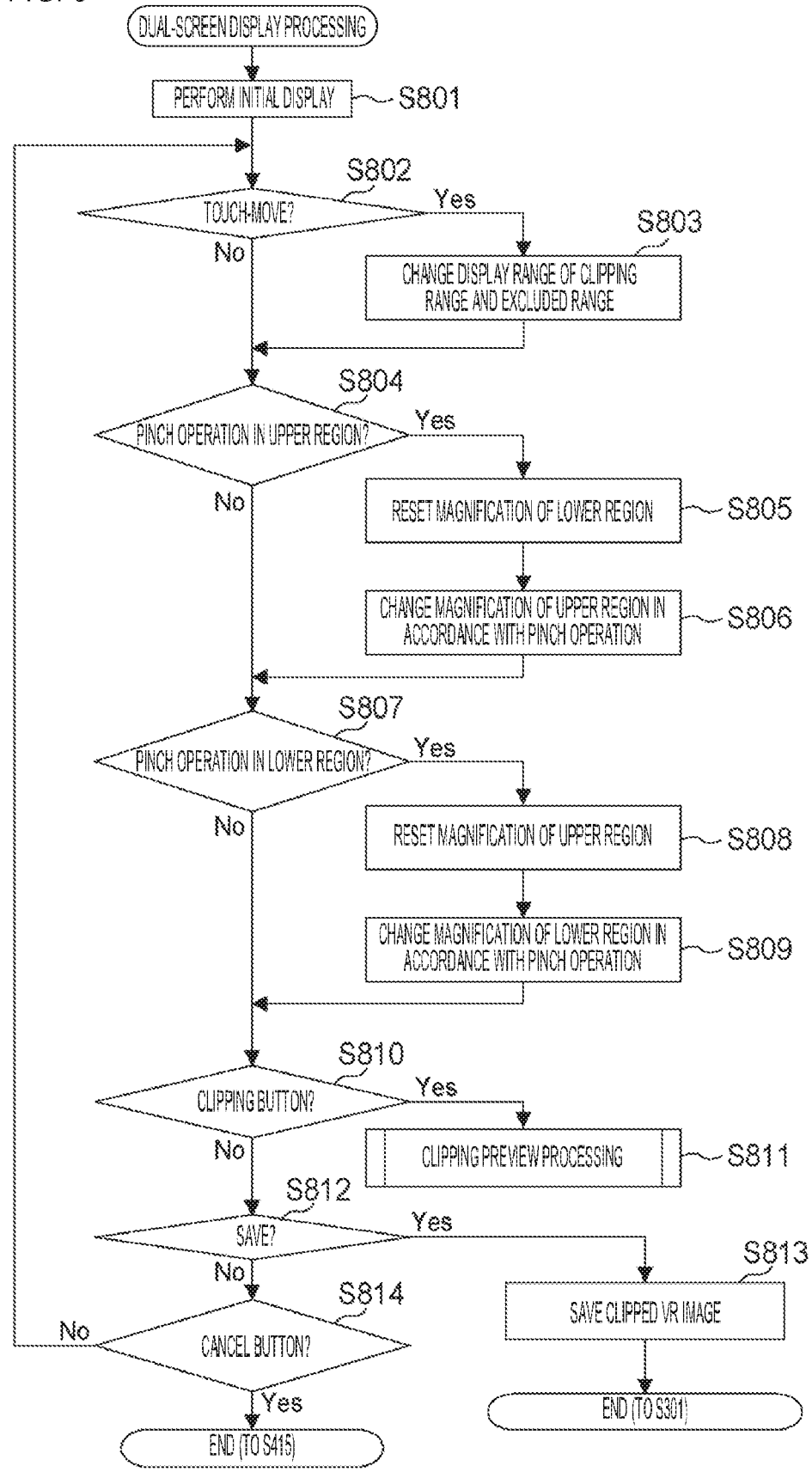
FIG. 8 is a flow chart of a dual-screen display processing.

FIG. 8 shows a flow chart of the dual-screen display processing described earlier with reference to S414 shown in FIG. 4. This processing is realized as the CPU 201 deploys a program recorded in the nonvolatile memory 203 on the memory 202 and executes the program.

Figure 9A:
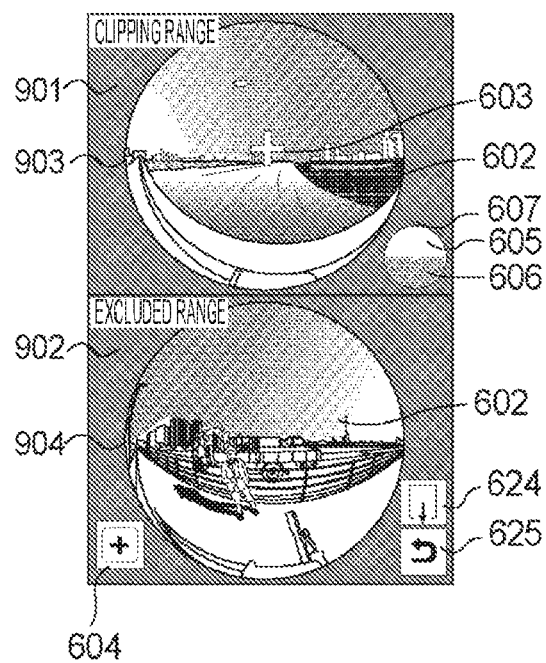
FIGS. 9A and 9B represent an example of dual-screen display.

In S801, the CPU 201 performs initial display of the dual-screen display on the display 205. FIG. 9A shows a display example of the initial display of the dual-screen display on the display 205. A display screen of the dual-screen display is divided into an upper region 901 which displays the inside of a clipping range 903 in the VR image 602 and a lower region 902 which displays the inside of an excluded range 904 in the VR image 602. In the initial display, a distorted circular image is displayed in a circular display region of the upper region 901 so that an entirety of the clipping range fits inside the display range. This display range is a similar display range to the whole hemisphere display described with reference to FIG. 7B. In addition, in the initial display, a distorted circular image is displayed in a circular display region of the lower region 902 so that an entirety of the excluded range fits inside the display range. This display range corresponds to a range of a hemisphere to be discarded after clipping. Other display items with the same reference numerals as the display items described earlier are similar to such display items. By viewing a screen on which the entire clipping range and the entire excluded range are simultaneously displayed in this manner, the user can readily confirm what kind of objects are included in the clipping range after clipping and what kind of objects are included in the excluded range after clipping in the 360-degree VR image prior to the clipping. At a display magnification larger than whole hemisphere display in a VR view of a normal clipping editing screen, since only a part within the clipping range is displayed and the display range is always at the center of the clipping range, a boundary between the clipping range and the excluded range is not displayed. Therefore, the boundary cannot be confirmed. In addition, at a display magnification larger than whole hemisphere display on a preview screen, since only a part within the clipping range is displayed, only a portion of the boundary between the clipping range and the excluded range can be confirmed. When the clipping range is adjusted by only viewing a portion of the boundary, situations may occur where, for example, even if a desired portion is fitted inside the clipping range at the displayed boundary, the object to be fitted ends up overstepping the clipping range near a boundary that is not displayed. In order to confirm whether or not the desired portion is fitted into the clipping range near all boundaries, the display range must be changed a plurality of times or by a large amount. On the other hand, with dual-screen display such as that shown in FIG. 9A, the user can confirm the entire clipping range and the entire excluded range without changing the display range. Furthermore, the user can adjust the clipping range and the excluded range by a touch-move while performing such confirmations. Therefore, mistakes can be prevented such as including, in the excluded range, an object that should be included in the clipping range while being oblivious to the presence of the object or including, in the clipping range, an object that should be excluded from the clipping range while being oblivious to the presence of the object. With respect to the excluded range displayed in the lower region 902, a semi-transparent mask of a prescribed color, color conversion such as displaying in monochrome or sepia, screening, or the like may be applied in order to make it easier to understand that the excluded range is a portion to be discarded after clipping.

In S802, the CPU 201 determines whether or not a touch-move (a video range change operation) has been performed in the upper region 901 or the lower region 902. When the CPU 201 determines that a touch-move has been performed, the CPU 201 advances to S803, but otherwise the CPU 201 advances to S804. In S803, the CPU 201 respectively changes a portion to become the clipping range and a portion to become the excluded range in the VR image 602. Specifically, the CPU 201 changes, in accordance with a movement of a touch position, the display range of the VR image 602 displayed in one region in which the touch-move had been performed out of the upper region 901 and the lower region 902. At this point, when the setting is elevation/depression angle-enabled, the display range is changed in accordance with both a lateral movement component and a vertical movement component of the touch-move. When the setting is elevation/depression angle-disabled, although the display range is moved in accordance with the lateral movement component of the touch-move, the display range is not moved in accordance with the vertical movement component, the pointer 603 always indicates an elevation/depression angle of 0 degrees (the horizontal direction), and the display range does not move upward or downward. In addition, the display range of the VR image 602 displayed in the other region is changed in conjunction with the change to the display range in the region where the touch-move had been performed in the VR image 602 and is adopted as an opposite-side hemisphere portion that is not the display range in the region where the touch-move had been performed. Accordingly, a relative position of the pointer 603 (a center position of the upper region) displayed at a fixed position on the display 205 (a prescribed position on the screen of the display 205) with respect to the VR image 602 changes. The CPU 201 sets the range of the hemisphere centered on the position corresponding to the pointer 603 in the VR image 602 as the clipping range.

In S804, the CPU 201 determines whether or not a pinch operation has been performed in the upper region 901. When the CPU 201 determines that a pinch operation has been performed in the upper region 901, the CPU 201 advances to S805, but otherwise the CPU 201 advances to S807. In S805, when the image of the excluded range in the lower region 902 is enlarged or reduced in S809 to be described later as compared to the initial display in S801, the CPU 201 resets the display magnification of the image of the excluded range to a magnification that enables the entire excluded range to be displayed or, in other words, the magnification of the initial display. In S806, the CPU 201 changes the display magnification of the image of the portion of the clipping range in the VR image 602 which is displayed in the upper region 901 in accordance with the pinch operation performed in the upper region 901 and displays the image by enlarging or reducing the image. Displaying an enlarged image of the clipping range enables the user to confirm details of objects included in the clipping range.

In S807, the CPU 201 determines whether or not a pinch operation has been performed in the lower region 902. When the CPU 201 determines that a pinch operation has been performed in the lower region 902, the CPU 201 advances to S808, but otherwise the CPU 201 advances to S810. In S808, when the image of the clipping range in the upper region 901 is enlarged or reduced in S806 described earlier as compared to the initial display in S801, the CPU 201 resets the display magnification of the image of the clipping range to a magnification that enables the entire clipping range to be displayed or, in other words, the magnification of the initial display. In S809, the CPU 201 changes the display magnification of the image of the portion of the excluded range in the VR image 602 which is displayed in the lower region 902 in accordance with the pinch operation performed in the lower region 902 and displays the image by enlarging or reducing the image. Displaying an enlarged image of the excluded range enables the user to confirm details of objects included in the excluded range.

Figure 9B:
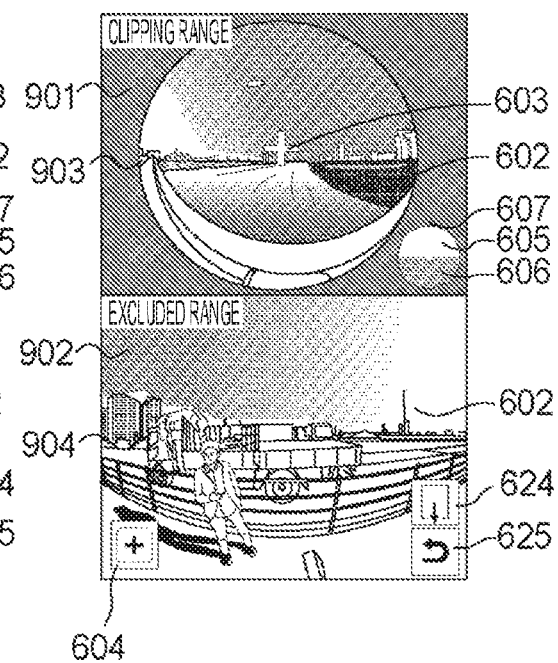

FIG. 9B shows a display example in a case where the image displayed in the lower region 902 is enlarged in accordance with a pinch-out performed in the lower region 902. Although the range displayed in the lower region 902 is only a part of the excluded range and not the entire excluded range, since the range is enlarged as compared to the initial display shown in FIG. 9A, an appearance of the objects can be more readily confirmed. When a pinch operation is performed in the upper region 901 from this state, the display magnification is reset in the processing of S805 and the display magnification in the lower region 902 is restored to the display magnification of the initial display shown in FIG. 9A. In this manner, by performing display at a display magnification that ensures one of the clipping range and the excluded range is included in its entirety, the boundary portion between the clipping range and the excluded range can be inevitably confirmed in one of the distorted circular images.

It should be noted that the change in magnification in accordance with a pinch operation in the dual-screen display processing of S804 to S809 only involves changing the display magnification and does not change the clipping range. In other words, a relative positional relationship of the pointer 603 with respect to the VR image 602 does not change.

In S810, the CPU 201 determines whether or not a touch operation with respect to the clipping button 604 has been performed. When a touch operation designating the clipping button 604 has been performed, the CPU 201 advances to S811 and performs the clipping preview processing shown in FIG. 5 described earlier. In this case, in a first performance of S502 or S503 in the clipping preview processing, the CPU 201 performs clipping so that a center of the display range that is displayed in the upper region 901 (the position indicated by the pointer 603) at a time point where the clipping button 604 is touched becomes the center of the clipping range. It should be noted that, when an unnecessary portion is registered, processing similar to S426 to S431 shown in FIG. 4 described earlier may be performed.

In S812, the CPU 201 determines whether or not a touch operation with respect to the save button 624 has been performed. When a touch operation designating the save button 624 has been performed, the CPU 201 advances to S813, but otherwise the CPU 201 advances to S814. In S813, the CPU 201 performs clipping so that a center of the display range that is displayed in the upper region 901 (the position indicated by the pointer 603) at a time point where the save button 624 is touched becomes the center of the clipping range. More specifically, the CPU 201 clips a 180-degree range (a range of respectively 90 degrees in all directions from center) centered on the center of the display range in the upper region 901 from a 360-degree VR image. In addition, the CPU 201 records the clipped VR image as an image file that can be displayed in a VR view in the recording medium 208. The recording processing after clipping is processing similar to that of S535 described earlier. Once the processing of S813 ends, the CPU 201 ends the dual-screen display processing and returns to S301 shown in FIG. 3.

In S814, the CPU 201 determines whether or not a touch operation with respect to the cancel button 625 has been performed. When a touch operation with respect to the cancel button 625 has been performed, the CPU 201 ends the dual-screen display processing, returns to S415, and displays the clipping editing screen. In doing so, the display range (the relative positional relationship of the pointer 603 with respect to the VR image 602) adjusted in the dual-screen display processing is handed over to the clipping editing screen. When a touch operation with respect to the cancel button 625 has not been performed, the CPU 201 returns to S802 and repeats the processing.

While the dual-screen display processing has been described as processing to be performed when the user performs a touch operation with respect to the dual-screen confirmation button 610 on the clipping editing screen, dual-screen display as a preview display of the clipping range may be performed in accordance with an issuance of a provisional setting instruction of the clipping range. For example, the dual-screen display processing shown in FIG. 8 may be performed instead of the clipping preview processing shown in FIG. 5 in accordance with a performance of a touch operation of the clipping button 604 in S425 shown in FIG. 4.

Figure 10:
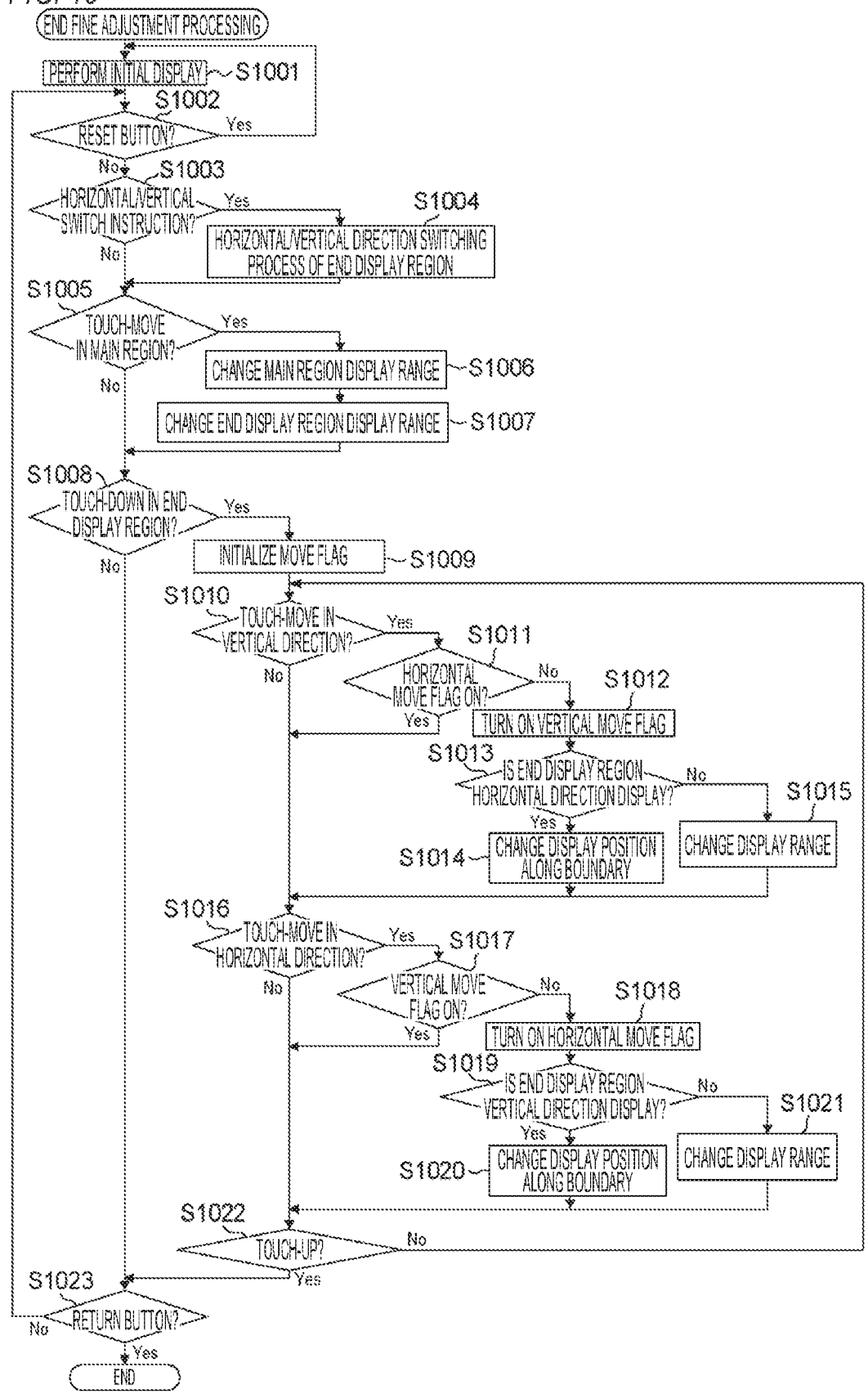
FIG. 10 is a flow chart of an end fine adjustment processing.

FIG. 10 shows a flow chart of the end fine adjustment processing of S416 shown in FIG. 4 and S517 shown in FIG. 5 described earlier. This processing is realized as the CPU 201 deploys a program recorded in the nonvolatile memory 203 on the memory 202 and executes the program. The end fine adjustment processing shown in FIG. 10 is processing performed by the user to finely adjust the clipping range by enlarging and displaying a vicinity of the boundary between the clipping range and the excluded range of a VR image.

In S1001, the CPU 201 performs initial display of an end fine adjustment screen for clipping an image from a VR view.

Figure 11A:
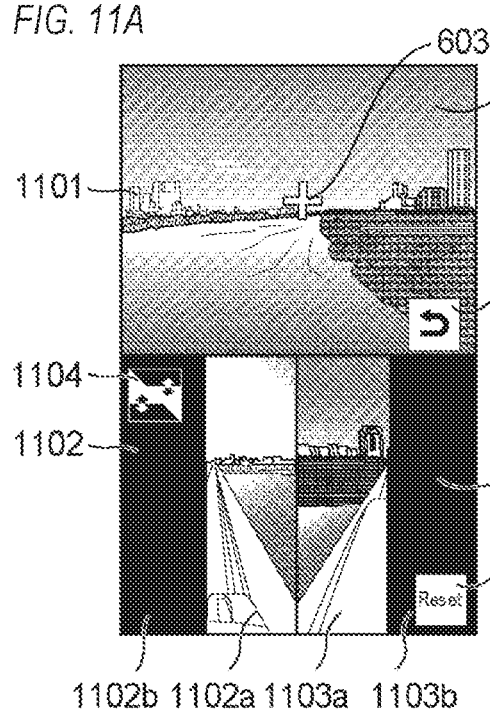
FIGS. 11A to 11D represent an example of an end fine adjustment screen.

FIG. 11A shows a display example of the end fine adjustment screen that is displayed on the display 205 immediately after a transition is made to the end fine adjustment processing. FIG. 11A represents an example of horizontal direction display out of two types of end fine adjustment screens, namely, horizontal direction display and vertical direction display. A main region 1101 displays a central portion of the clipping range which is part of the same VR image 602 having been displayed on the clipping editing screen or the preview screen. In the main region 1101, since the VR image 602 is displayed at a display magnification that does not distort a peripheral portion, an end of the clipping range (the boundary between the clipping range and the excluded range) is not displayed. The pointer 603 is displayed at a fixed position in the main region 1101 (a center of the main region 1101). A display position of a VR image in the background is determined so that the pointer 603 is at a same position with respect to the VR image as the position where the pointer 603 had been displayed on the clipping editing screen. By looking at the main region 1101, the user can confirm what is being portrayed at the center of the clipping range. A left-side region 1102 and a right-side region 1103 which are end display regions are displayed side by side below the main region 1101. The left-side region 1102 and the right-side region 1103 display a portion including the boundary between the clipping range and the excluded range in the clipping range.

The left-side region 1102 displays a partial boundary portion in the clipping range (a range of a part including the end of the clipping range). A left-side boundary portion at a vertical position indicated by the pointer 603 (a position of an elevation/depression angle indicated by the pointer 603) is displayed during initial display and immediately after reset. The left-side region 1102 displays an image region 1102a indicating the inside of the clipping range and an excluded region 1102b indicating the outside of the clipping range (the inside of the excluded range) divided horizontally and adjacent to each other, and enables a state of the boundary between the clipping range and the excluded range to be confirmed. A positional relationship between the image region 1102a and the excluded region 1102b in the left-side region 1102 is fixed and remains unchanged even when a touch-move to be described later is performed.

The right-side region 1103 displays a partial boundary portion 180 degrees opposite to the range displayed in the left-side region 1102 in the clipping range (a boundary portion that is discontinuous to the range displayed in the left-side region 1102). A right-side boundary portion at the vertical position indicated by the pointer 603 (the position of the elevation/depression angle indicated by the pointer 603) is displayed during initial display and immediately after reset. The right-side region 1103 displays an image region 1103a indicating the inside of the clipping range and an excluded region 1103b indicating the outside of the clipping range (the inside of the excluded range) divided horizontally and adjacent to each other, and enables a state of the boundary between the clipping range and the excluded range to be confirmed. A positional relationship between the image region 1103a and the excluded region 1103b in the right-side region 1103 is fixed and remains unchanged even when a touch-move to be described later is performed. In other words, even when the position of the clipping range in the VR image prior to clipping is changed in accordance with a user operation, positions corresponding to ends of the clipping range on the display 205 are not changed. The positions corresponding to ends of the clipping range on the display 205 are a boundary position between the image region 1103a and the excluded region 1103b and a boundary position between the image region 1102a and the excluded region 1102b.

For example, when the user desires to make a roadway portion an excluded range and to fit a sidewalk portion into a clipping range in the VR image 602, by viewing such a display, the user can perform fine adjustment of the clipping range in a preferable manner by readily confirming whether or not the desired portion is fitted inside the clipping range. At a display magnification larger than whole hemisphere display in a VR view of a normal clipping editing screen, since only a part within the clipping range is displayed and the display range is always at the center of the clipping range, a boundary between the clipping range and the excluded range is not displayed. Therefore, the boundary cannot be confirmed. In addition, at a display magnification larger than whole hemisphere display on a preview screen, since only a part within the clipping range is displayed, only one location of the boundary between the clipping range and the excluded range can be confirmed. When the clipping range is adjusted by only viewing one location of the boundary, situations may occur where, for example, even if a desired portion is fitted inside the clipping range at the displayed boundary, the object to be fitted ends up overstepping the clipping range near another boundary. In order to confirm whether or not the desired portion is fitted into the clipping range near both boundaries, the display range must be changed a plurality of times or by a large amount. On the other hand, on an end fine adjustment screen such as that shown in FIG. 11A, the user can confirm whether or not a desired portion is fitted within the clipping range by confirming the boundaries between the clipping range and the excluded range without changing the display range. Furthermore, on an end fine adjustment screen such as that shown in FIG. 11A, the user can simultaneously confirm a plurality of boundary portions (the boundary portions at both ends), and the user can confirm whether or not a desired portion is fitted within the clipping range in a short period of time or by a small number of operations.

A horizontal/vertical switch button 1104 which is a touch icon is displayed in an upper left part of the left-side region 1102 (an upper part of the excluded region 1102b). By displaying the horizontal/vertical switch button 1104 at this position, visibility of a video within the clipping range displayed in the image region 1102a is not impeded. In addition, even when switching between horizontal direction display and vertical direction display, the display position of the horizontal/vertical switch button 1104 is not changed and the horizontal/vertical switch button 1104 is displayed at a position where visibility of a video within the clipping range after the switch is not impeded. Alternatively, the horizontal/vertical switch button 1104 may be displayed in a lower right part of the right-side region 1103 (a lower part of the excluded region 1103b). Even at this position, the horizontal/vertical switch button 1104 can be displayed in both horizontal direction display and vertical direction display without impeding the visibility of the video within the clipping range. Furthermore, a reset button 1105 which is a touch icon is displayed in the lower right part of the right-side region 1103 (the lower part of the excluded region 1103b). At this position, the reset button 1105 can be displayed in both horizontal direction display and vertical direction display without impeding the visibility of the video within the clipping range. Alternatively, the reset button 1105 may be displayed in the upper left part of the left-side region 1102 (the upper part of the excluded region 1102b) by a similar reason to that described above.

Figure 11B:
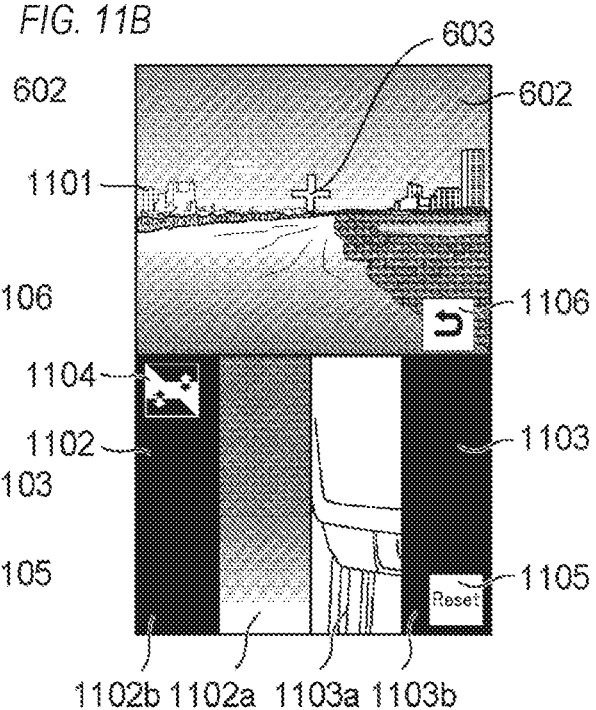
Figure 11C:
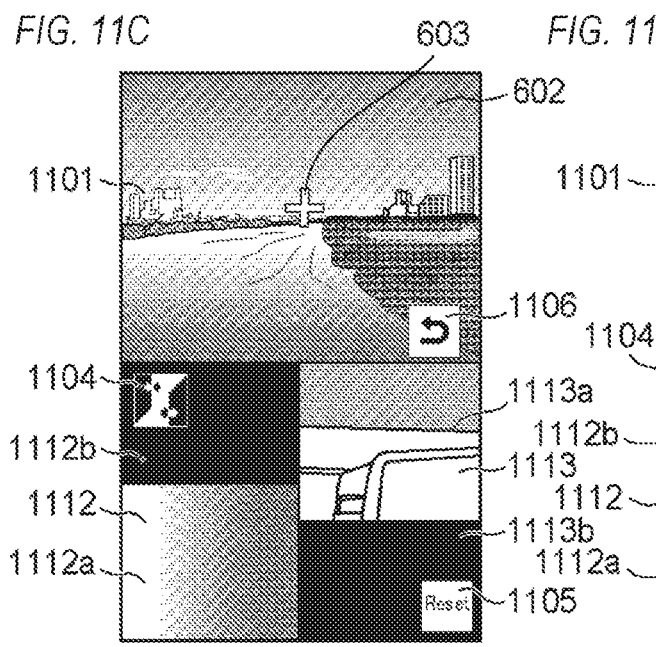

FIG. 11C represents a display example of the vertical direction display out of the two types of end fine adjustment screens, namely, the horizontal direction display and the vertical direction display. A display content of the main region 1101 is similar to that of the horizontal direction display. A left-side region 1112 and a right-side region 1113 which are end display regions are displayed side by side below the main region 1101. The left-side region 1112 and the right-side region 1113 display a portion including the boundary between the clipping range and the excluded range in the clipping range.

The left-side region 1112 displays a partial boundary portion in the clipping range. An upper-side boundary portion at the horizontal position indicated by the pointer 603 (the position of the azimuth indicated by the pointer 603) is displayed during initial display and immediately after reset. The left-side region 1112 displays an image region 1112a indicating the inside of the clipping range and an excluded region 1112b indicating the outside of the clipping range (the inside of the excluded range) divided vertically and adjacent to each other, and enables a state of the boundary between the clipping range and the excluded range to be confirmed. A positional relationship between the image region 1112a and the excluded region 1112b in the left-side region 1112 is fixed and remains unchanged even when a touch-move to be described later is performed.

The right-side region 1113 displays a partial boundary portion 180 degrees opposite to the range displayed in the left-side region 1112 in the clipping range. A lower-side boundary portion at the horizontal position indicated by the pointer 603 (the position of the azimuth indicated by the pointer 603) is displayed during initial display and immediately after reset. The right-side region 1113 displays an image region 1113a indicating the inside of the clipping range and an excluded region 1113b indicating the outside of the clipping range (the inside of the excluded range) divided vertically and adjacent to each other, and enables a state of the boundary between the clipping range and the excluded range to be confirmed. A positional relationship between the image region 1113a and the excluded region 1113b in the right-side region 1113 is fixed and remains unchanged even when a touch-move to be described later is performed.

A horizontal/vertical switch button 1104 which is a touch icon is displayed in an upper left part of the left-side region 1112 (an upper part of the excluded region 1112b). This display position is the same as that shown in FIG. 11A. This display position is a region where the excluded region 1102b shown in FIG. 11A and the excluded region 1112b shown in FIG. 11C overlap with each other. In addition, the reset button 1105 is displayed in a lower right part of the right-side region 1113 (a lower part of the excluded region 1113b). This display position is the same as that shown in FIG. 11A. This display position is a region where the excluded region 1103b shown in FIG. 11A and the excluded region 1113b shown in FIG. 11C overlap with each other.

In S1002, on the basis of information notified from the touch panel 206a, the CPU 201 determines whether or not a touch operation with respect to the reset button 1105 has been performed. When a touch operation designating the reset button 1105 has been performed, the CPU 201 advances to S1001 and restores the display position changed in S1014 or S1020 to be described later to the original display position. Due to the reset, a left boundary and a right boundary between upper and lower central portions of the clipping range are displayed in the case of horizontal direction display and an upper boundary and a lower boundary between left and right central portions of the clipping range are displayed in the case of vertical direction display. When a touch operation with respect to the reset button 1105 has not been performed, the CPU 201 advances to S1103.

In S1003, on the basis of information notified from the touch panel 206a, the CPU 201 determines whether or not a touch operation with respect to the horizontal/vertical switch button 1104 has been performed. When a touch operation designating the horizontal/vertical switch button 1104 has been performed, the CPU 201 advances to S1004, but otherwise the CPU 201 advances to S1005.

In S1004, when the end fine adjustment screen (the end display region) is horizontal direction display, the CPU 201 switches to vertical direction display, and when the end fine adjustment screen (the end display region) is vertical direction display, the CPU 201 switches to horizontal direction display. For example, when a touch operation with respect to the horizontal/vertical switch button 1104 is performed in a display state shown in FIG. 11A, the CPU 201 switches to the display shown in FIG. 11C. In addition, when a touch operation with respect to the horizontal/vertical switch button 1104 is performed in a display state shown in FIG. 11C, the CPU 201 switches to the display shown in FIG. 11A.

In S1005, on the basis of information notified from the touch panel 206a, the CPU 201 determines whether or not a touch-move has been performed in the main region 1101. More specifically, the CPU 201 determines whether or not a touch-down on the main region 1101 and a touch-move have been performed. When a touch-move originating in the main region 1101 has been performed, the CPU 201 advances to S1006, but otherwise the CPU 201 advances to S1008.

In S1006, the CPU 201 changes the display range of the VR image displayed in the main region 1101 in accordance with a slide operation by the touch-move. This processing is the same as the processing of S306 shown in FIG. 3 described earlier.

In S1007, in the case of horizontal direction display, the CPU 201 changes the display range of the VR image in the left-side region 1102 and the right-side region 1103 (in other words, portions to be displayed in the image region 1102a and the image region 1103a) in accordance with a slide operation by the touch-move. In the case of vertical direction display, the CPU 201 changes the display range of the VR image in the left-side region 1112 and the right-side region 1113 (in other words, portions to be displayed in the image region 1112a and the image region 1113a). This is because the clipping range is changed in accordance with the touch-move in the main region 1101 and the positional relationship between the clipping range and the excluded range in the VR image changes.

In S1008, on the basis of information notified from the touch panel 206a, the CPU 201 determines whether or not a touch-down with respect to any of the left-side region 1102, the right-side region 1103, the left-side region 1112, and the right-side region 1113 excluding the display region of the touch buttons has been performed. When a touch-down with respect to any of the left-side region 1102, the right-side region 1103, the left-side region 1112, and the right-side region 1113 excluding the display region of the touch buttons has been performed, the CPU 201 advances to S1009, but otherwise the CPU 201 advances to S1023.

In S1009, the CPU 201 clears (turns off) and initializes a move flag which is held in the memory 202 and which indicates a vertical touch-move or a horizontal touch-move.

In S1010, on the basis of information notified from the touch panel 206a, the CPU 201 determines whether or not a touch-move has been performed in the vertical direction of the display 205. For example, a determination that a touch-move has been performed in the vertical direction is made when, every time a touch-move of a unit movement amount is performed, a movement component in the vertical direction is larger than a movement component in the horizontal direction. When a touch-move has been performed in the vertical direction, the CPU 201 advances to S1011, but otherwise the CPU 201 advances to S1016.

In S1011, the CPU 201 determines whether or not a horizontal move flag which is held in the memory 202 and which indicates that a touch-move in the horizontal direction is under way has been turned on. When the CPU 201 determines that the horizontal move flag is turned on, since the movement component in the vertical direction is to be ignored, the CPU 201 advances to S1016. When the CPU 201 determines that the horizontal move flag is turned off, the CPU 201 advances to S1012.

In S1012, the CPU 201 sets a vertical move flag indicating that a touch-move in the vertical direction is under way to on (recorded in the memory 202 as on), and advances to S1013.

In S1013, the CPU 201 determines whether or not the present display mode is horizontal direction display out of horizontal direction display and vertical direction display of the end fine adjustment screen (the end display region). In the case of the horizontal direction display, the CPU 201 advances to S1014, but in the case of the vertical direction display, the CPU 201 advances to S1015.

In S1014, the CPU 201 updates a display position of the VR image in the left-side region 1102 and the right-side region 1103 along a boundary of the clipping range. This means that, when a hemisphere is designated as a clipping range in a sphere to which a 360-degree VR image has been mapped, the display range moves along a circular clipping boundary of the hemisphere. Therefore, the positional relationship between the clipping range and the excluded region in the VR image does not change but a range of the VR image displayed in the image region 1102a and a range of the VR image displayed in the image region 1103a change. The image region 1102a and the image region 1103a maintain a relationship such that, even when the display range changes, the image region 1102a and the image region 1103a display portions with clipping boundaries that differ from each other by 180 degrees. Therefore, when the user vertically performs a touch-move corresponding to 180 degrees, the user can confirm an entire range of a boundary of a currently set clipping range. Since the clipping range is not changed in the processing of S1014, the display content of the main region 1101 does not change.

FIG. 11B shows a display example of a case where a downward touch-move with respect to the left-side region 1102 is performed from the state shown in FIG. 11A and the left-side region 1102 is scrolled so as to move an image portion displayed in the image region 1102a downward (move the display range upward). The portion displayed in the left-side region 1102 moves along the boundary of the clipping range from the state shown in FIG. 11A where a boundary portion in the horizontal direction (a horizon direction) in a VR image has been displayed, and FIG. 11B shows a boundary portion in a sky direction being displayed in the left-side region 1102. A portion displayed in the right-side region 1103 is an image in a ground direction that is 180 degrees opposite to the sky direction displayed in the left-side region 1102 out of the boundary of the clipping range.

In S1015, the CPU 201 changes the display range of the VR image displayed in the image region 1112a and the image region 1113a in accordance with a vertical touch-move. This means that a position of the boundary of the clipping range with respect to the VR image prior to clipping moves in accordance with the vertical touch-move. Since an angle of the clipping range is maintained at 180 degrees, display ranges of both the image region 1112a and the image region 1113a change regardless of from which position of the left-side region 1112 and the right-side region 1113 the vertical touch-move is performed. For example, when the display range of the image region 1112a changes due to a movement of the boundary in a direction that narrows the clipping range, the display range of the image region 1113a also changes due to a movement of the boundary in a direction that widens the clipping range so as to maintain the angle of the clipping range at 180 degrees. Accordingly, the clipping range changes and a range displayed in the main region 1101 also changes. The user can strictly adjust the clipping range by vertically performing a touch-move while confirming, in the vicinity of the boundary (the image region 1112a and the image region 1113a), how much of the VR image is to be included in the clipping range and how much of the VR image is to be included in the excluded range. In this processing, a width (180 degrees) of the clipping range does not change but a position of the clipping range in the VR image prior to clipping is changed.

In S1016, on the basis of information notified from the touch panel 206a, the CPU 201 determines whether or not a touch-move has been performed in the horizontal direction of the display 205. For example, a determination that a touch-move has been performed in the horizontal direction is made when, every time a touch-move of a unit movement amount is performed, a movement component in the horizontal direction is larger than a movement component in the vertical direction. When a touch-move has been performed in the horizontal direction, the CPU 201 advances to S1017, but otherwise the CPU 201 advances to S1022.

In S1017, the CPU 201 determines whether or not a vertical move flag which is held in the memory 202 and which indicates that a touch-move in the vertical direction is under way has been turned on. When the CPU 201 determines that the vertical move flag is turned on, since the movement component in the horizontal direction is to be ignored, the CPU 201 advances to S1022. When the CPU 201 determines that the vertical move flag is turned off, the CPU 201 advances to S1018.

In S1018, the CPU 201 sets a horizontal move flag indicating that a touch-move in the horizontal direction is under way to on (recorded in the memory 202 as on), and advances to S1019.

In S1019, the CPU 201 determines whether or not the present display mode is vertical direction display out of horizontal direction display and vertical direction display of the end fine adjustment screen (the end display region). In the case of the vertical direction display, the CPU 201 advances to S1020, but in the case of the horizontal direction display, the CPU 201 advances to S1021.

In S1020, the CPU 201 updates a display position of the VR image in the left-side region 1112 and the right-side region 1113 along a boundary of the clipping range. This processing is similar to S1014 described earlier. However, a display orientation of the VR image in the left-side region 1112 and the right-side region 1113 differs by 90 degrees from S1014. Since the clipping range is not changed in the processing of S1020, the display content of the main region 1101 does not change.

Figure 11D:
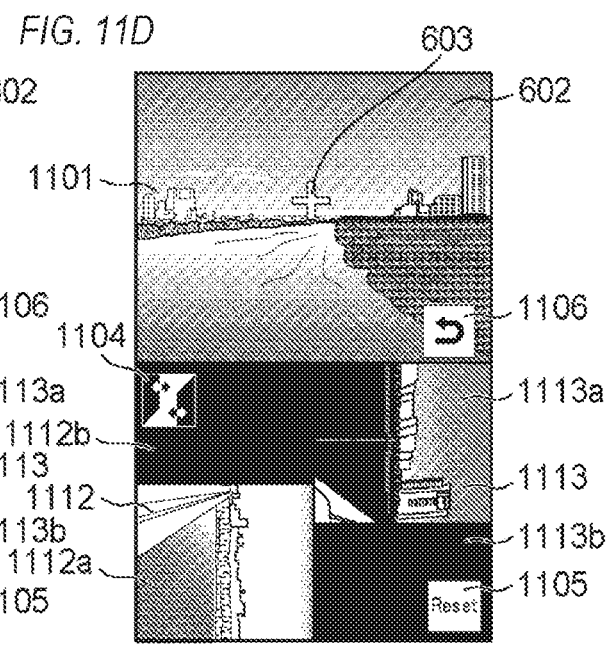

FIG. 11D shows a display example of a case where a leftward touch-move with respect to the right-side region 1113 is performed from the state shown in FIG. 11C and the right-side region 1113 is scrolled so as to move an image portion displayed in the image region 1113a leftward (move the display range rightward in an orientation of the image region 1113a). The portion displayed in the right-side region 1113 moves along the boundary of the clipping range from the state shown in FIG. 11C where a boundary portion on a lower side in the vertical direction (a ground direction) in a VR image has been displayed, and FIG. 11D shows a boundary portion in the horizontal direction (a horizon direction) being displayed in the right-side region 1113. A portion displayed in the left-side region 1112 is an image in the horizontal direction (a horizon direction) that is 180 degrees opposite to the direction displayed in the right-side region 1113 out of the boundary of the clipping range.

In S1021, the CPU 201 changes the display range of the VR image displayed in the image region 1102a and the image region 1103a in accordance with a horizontal touch-move. This means that a position of the boundary of the clipping range with respect to the VR image prior to clipping moves in accordance with the horizontal touch-move. Since the angle of the clipping range is maintained at 180 degrees, display ranges of both the image region 1102a and the image region 1103a change regardless of from which position of the left-side region 1102 and the right-side region 1103 the horizontal touch-move is performed. For example, when the display range of the image region 1102a changes due to a movement of the boundary in a direction that narrows the clipping range, the display range of the image region 1103a also changes due to a movement of the boundary in a direction that widens the clipping range so as to maintain the angle of the clipping range at 180 degrees. Accordingly, the clipping range changes and a range displayed in the main region 1101 also changes. The user can strictly adjust the clipping range by horizontally performing a touch-move while confirming, in the vicinity of the boundary (the image region 1102a and the image region 1103a), how much of the VR image is to be included in the clipping range and how much of the VR image is to be included in the excluded range. In this processing, a width (180 degrees) of the clipping range does not change but a position of the clipping range in the VR image prior to clipping is changed.

In S1022, on the basis of information notified from the touch panel 206a, the CPU 201 determines whether or not a touch-up has been performed. When a touch-up has been performed, the CPU 201 advances to S1023, but otherwise the CPU 201 returns to S1010 and repeats the processing.

In S1023, on the basis of information notified from the touch panel 206a, the CPU 201 determines whether or not a touch operation with respect to a return button 1106 has been performed. When there is no touch operation designating the return button 1106, the CPU 201 returns to S1002 and repeats the processing, but when there is a touch operation with respect to the return button 1106, the CPU 201 ends the end fine adjustment processing.

When the end fine adjustment processing is ended, the clipping range adjusted in the end fine adjustment processing is handed over to processing performed after the end fine adjustment processing ends. Therefore, for example, when a fine adjustment of the clipping range is performed in the end fine adjustment processing and the end fine adjustment processing is ended to return to the clipping editing processing (the clipping editing screen) shown in FIG. 4, by subsequently touching the clipping button 604 without changing the display range, clipping can be performed in the clipping range adjusted in the end fine adjustment processing. Alternatively, the end fine adjustment screen may be configured so as to accept a clipping instruction, in which case the CPU 201 may directly advance to S426 or S427 when accepting a clipping instruction on the end fine adjustment screen. In addition, the end fine adjustment screen may be configured to accept a clipping saving instruction, in which case the CPU 201 may directly advance to S535 when accepting a clipping saving instruction on the end fine adjustment screen.

Figure 12:
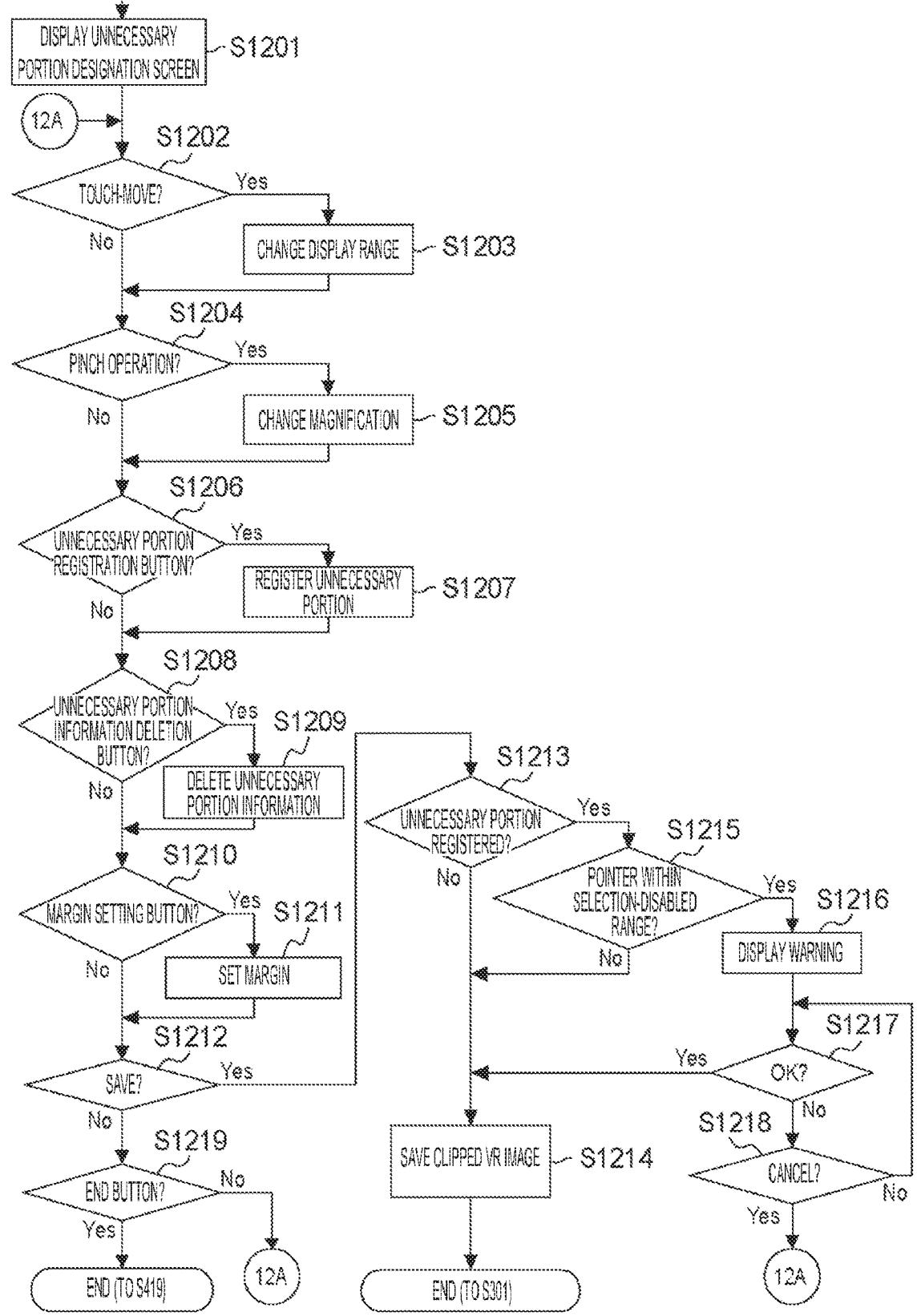
FIG. 12 is a flow chart of an unnecessary portion designation processing.

FIG. 12 shows a flow chart of the unnecessary portion designation processing described earlier with reference to S418 shown in FIG. 4. This processing is realized as the CPU 201 deploys a program recorded in the nonvolatile memory 203 on the memory 202 and executes the program.

Figure 13A:
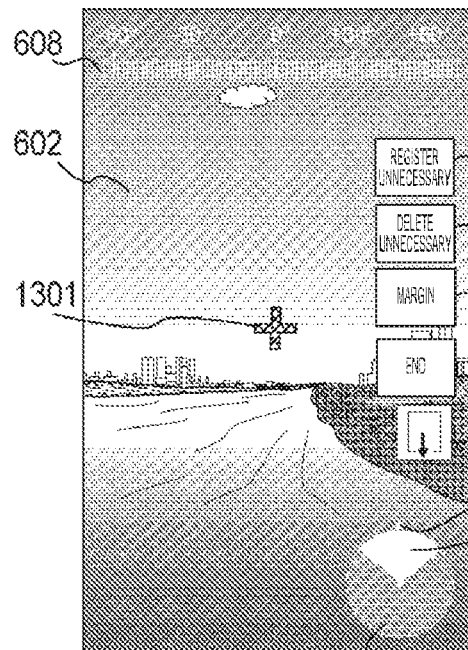
FIGS. 13A to 13D represent an example of an unnecessary portion designation screen.

In S1201, the CPU 201 displays an unnecessary portion designation screen on the display 205. FIG. 13A shows a display example of the unnecessary portion designation screen. Display items with the same reference numerals are similar to the display items described earlier (the display items on the clipping editing screen and the preview screen).

A pointer 1301 is an indicator which is displayed fixed to a center of the unnecessary portion designation screen and which is used in order to designate an unnecessary portion (a position of an unnecessary object, a position of an object that is desirably excluded) in the VR image 602. In order to avoid confusion with the pointer 603 and the pointer 621, the pointer 1301 is displayed in a display mode that differs from those of the pointer 603 and the pointer 621 (a different color, shape, pattern, or the like). However, when there is a touch operation with respect to the save button 624 displayed on the unnecessary portion designation screen to be described later, the pointer 1301 functions as a pointer for indicating a center of the clipping range. An unnecessary portion registration button 1302 is a touch button for designating and registering an unnecessary portion. When a touch operation designating the unnecessary portion registration button 1302 is performed, positional information of a position indicated by the pointer 1301 at that time point in the VR image 602 is registered (recorded in the memory 202) as an unnecessary portion. An unnecessary portion information deletion button 1303 is a touch button for deleting information on an unnecessary portion that has already been registered. When a touch operation designating the unnecessary portion information deletion button 1303 is performed, one piece of information of an unnecessary portion that has already been registered is deleted (cleared) and registration as an unnecessary portion is canceled. A margin setting button 1304 is a touch button for setting a margin of a selection-disabled range originating at an unnecessary portion. An end button 1305 is a touch button for accepting an instruction to end the unnecessary portion designation processing and return to the clipping editing processing.

Since S1202 and S1203 include processing for changing the display range in accordance with a touch-move and are similar to the processing in S305 and S306 shown in FIG. 3, details thereof will be omitted. Even if the display range of the VR image 602 is changed by a touch-move, the display range of the pointer 1301 does not change. In addition, when an unnecessary portion is registered, if a selection-disabled range is included in the display range after the change, the selection-disabled range in the displayed VR image is identifiably displayed (displayed in an enhanced manner). This will be described later with reference to FIG. 13B.

Since S1204 and S1205 include processing for changing the display magnification in accordance with a pinch operation and are similar to the processing in S309 and S310 shown in FIG. 3, details thereof will be omitted. In addition, when an unnecessary portion is registered, if a selection-disabled range is included in the display range after the change to the display magnification, the selection-disabled range in the displayed VR image is identifiably displayed.

In S1206, the CPU 201 determines whether or not a touch operation with respect to the unnecessary portion registration button 1302 has been performed. When a touch operation with respect to the unnecessary portion registration button 1302 has been performed, the CPU 201 advances to S1207, but otherwise the CPU 201 advances to S1208. In S1207, the CPU 201 adopts positional information (angle information of an elevation/depression angle and angle information of an azimuth) of the position indicated by the pointer 1301 in the VR image 602 as an unnecessary portion, and registers corresponding unnecessary portion information. As unnecessary portion information, positional information and a registration number (starting from 1 and incremented by +1 every time an unnecessary portion is registered) are recorded in the memory 202. When the position indicated by the pointer 1301 is already registered as an unnecessary portion, the CPU 201 skips the processing of S1207.

Figure 13B:
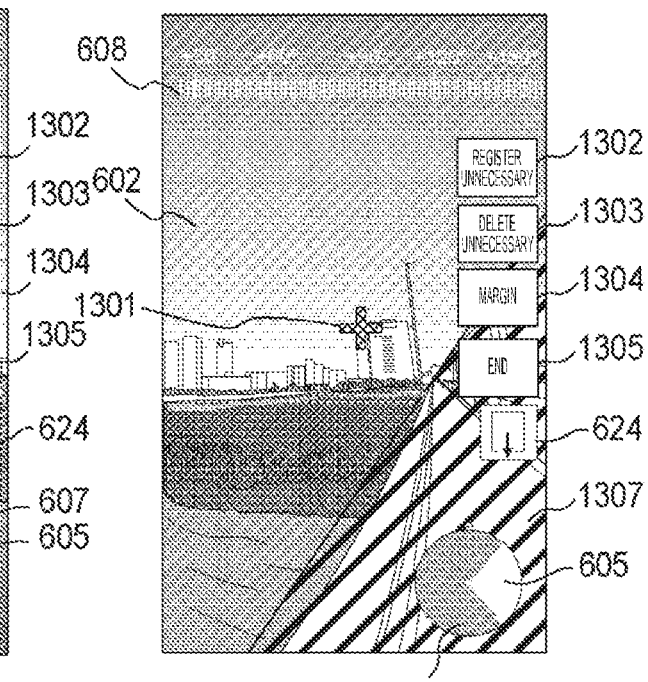

Once an unnecessary portion is newly registered, the CPU 201 sets a region of an angle combining a clipping angle and a margin angle centered on the positional information of the newly-registered unnecessary portion as a selection-disabled range. Since an unnecessary portion that has already been registered ends up being included in the clipping range when a reference position of the clipping range is set within the selection-disabled range, the selection-disabled range may be considered an inappropriate range that is not appropriate to be set as a reference position of the clipping range. Since an unnecessary portion that has already been registered is not included when the reference position of the clipping range is set in a range (a selection-enabled range) other than the selection-disabled range, the range other than the selection-disabled range may be considered an appropriate range that is appropriate for setting a reference position of the clipping range. In the present embodiment, the clipping angle is 180 degrees. While the margin angle can be arbitrarily changed by the user in S1210 and S1211 to be described later, an initial value thereof is 10 degrees. When the clipping angle is 180 degrees and the margin angle is 10 degrees, a range of 100 degrees in a periphery (90 degrees being half of a clipping range 180+10 degrees) centered on the newly registered unnecessary portion or, in other words, a range of a total angle of 200 degrees becomes the selection-disabled range. When there is another unnecessary portion that has already been registered and the selection-disabled range has already been set, a range created by merging a selection-disabled range that is set on the basis of the newly registered unnecessary portion with the set selection-disabled range is set as the selection-disabled range. When any position within the selection-disabled range is set as a center of the clipping range, there is a possibility that an object (a video) at the position designated as an unnecessary portion ends up being included in the clipping range. In other words, each position within the selection-disabled range is a position that is preferably not set as a center of the clipping range. In addition, the CPU 201 performs identifiable display with respect to the VR image 602 displayed on the display 205 so that the set selection-disabled range is identifiable. FIG. 13B shows a display example of identifiable display of a selection-disabled range. In the displayed VR image 602, a selection-disabled range 1307 is identifiably displayed by hatchings. It should be noted that a display mode of the identifiable display is not limited thereto and display by a semi-transparent mask, display by a color change to monochrome or sepia, or the like may be performed instead. In addition, while an example where a selection-disabled range is enhanced and displayed will be described in the present embodiment, since the selection-disabled range need only be identifiable from a range that is not selection-disabled, the range that is not selection-disabled may be enhanced and displayed instead. Alternatively, in the VR image 602, a video in the selection-disabled range may be hidden and a video in a range other than the selection-disabled range may be displayed.

In a case where an entire range of the VR image prior to clipping becomes a selection-disabled range due to an unnecessary portion newly registered in the unnecessary portion registration processing in S1207, instead of registering a new unnecessary portion, an error display is performed which indicates that additional registrations cannot be accepted. Similarly, when a width of a range (a selection-enabled range) other than the selection-disabled range in the VR image prior to clipping falls below a threshold, instead of registering a new unnecessary portion, an error display is performed which indicates that additional registrations cannot be accepted.

A flow up to setting a selection-disabled range will be described using conceptual diagrams in FIGS. 14A to 14G A range 1450 shown in FIG. 14A indicates a region (a display range) being displayed on the display 205 in the VR image, and a pointer direction 1451 indicates a direction of a center of the display range as viewed from a center of a virtual sphere and corresponds to a position indicated by the pointer 1301. An unnecessary portion candidate 1452 is a portion considered a portion unnecessary for clipping (a portion to be excluded) in the VR image by the user. When there is a portion unnecessary for clipping, the user aligns the pointer direction 1451 corresponding to the center of the display region of the display 205 with the portion unnecessary for clipping 1452 (an object considered unnecessary for clipping). Subsequently, the user touches the unnecessary portion registration button 1302.

FIG. 14B represents a conceptual diagram immediately after one unnecessary portion is touched and registered. A selection-disabled range 1453 indicated by screening represents a region corresponding to a clipping angle 1454 (180 degrees) from the pointer direction 1451 and indicates a selection-disabled range in a case where a margin is 0 degrees. As shown in FIG. 14C, when a position 1455 within the selection-disabled range is designated as a center of clipping, the clipping range becomes a range of an outlined part 1456 shown in FIG. 14D and includes the unnecessary portion 1452. It should be noted that, in FIG. 14D, a blacked-out portion represents an excluded range.

When a margin angle is set, the selection-disabled range is set to a wider range than 180 degrees (a hemisphere) centered on an unnecessary portion such as a selection-disabled range 1457 shown in FIG. 14E. In addition, when an unnecessary portion is registered in plurality as shown in FIG. 14F (an example in which two locations, namely, the unnecessary portion 1452 and an unnecessary portion 1458 are registered), a selection-disabled range is calculated with each unnecessary portion as center, and a region obtained by adding up all of the selection-disabled ranges is the selection-disabled range.

In the selection-disabled range set (determined) as described above, a region displayed on the display 205 is identifiably displayed in a similar manner to the selection-disabled range 1307 shown in FIG. 13B. Identifiable display such as the selection-disabled range 1307 is not limited to the unnecessary portion designation screen and is also performed on the clipping editing screen of the clipping editing processing described with reference to FIG. 4. Alternatively, a configuration may be adopted in which the identifiable display of the selection-disabled range can be switched between on/off states (displayed state/hidden state) by a user operation. In addition, a boundary line between the selection-disabled range and a range that is not selection-disabled may be displayed. Furthermore, when the pointer 603 is in the selection-disabled range on the clipping editing screen, the user may be notified of the fact that the position of the pointer 603 is inappropriate as a center-designating location of the clipping range by changing a display mode of the pointer 603, displaying a warning icon or a warning message, or the like.

In S1208, on the basis of information notified from the touch panel 206a, the CPU 201 determines whether or not a touch operation with respect to the unnecessary portion information deletion button 1303 has been performed. When a touch operation designating the unnecessary portion information deletion button 1303 has been performed, the CPU 201 advances to S1209, but otherwise the CPU 201 advances to S1210. In S1209, the CPU 201 acquires unnecessary portion information from the memory 202. When no unnecessary portion information is registered, the CPU 201 suspends the processing and advances to S1210. When pieces of unnecessary portion information are registered, the CPU 201 moves the display range of the VR image 602 so that an angle of the piece of positional information with a largest registration number (an unnecessary portion most recently registered) is at a center of display, and deletes the piece of unnecessary portion information from the memory 202. In addition, a selection-disabled range on the basis of the deleted unnecessary portion is cleared (canceled) In other words, a selection-disabled range solely based on the deleted unnecessary portion is removed from the merged selection-disabled range and identifiable display with respect to the removed portion is hidden (displayed as a selection-enabled range). When unnecessary portion information is deleted in a case where only one piece of unnecessary portion information is registered, a hatched portion such as the selection-disabled range 1307 shown in FIG. 13B is eliminated.

Figure 13C:
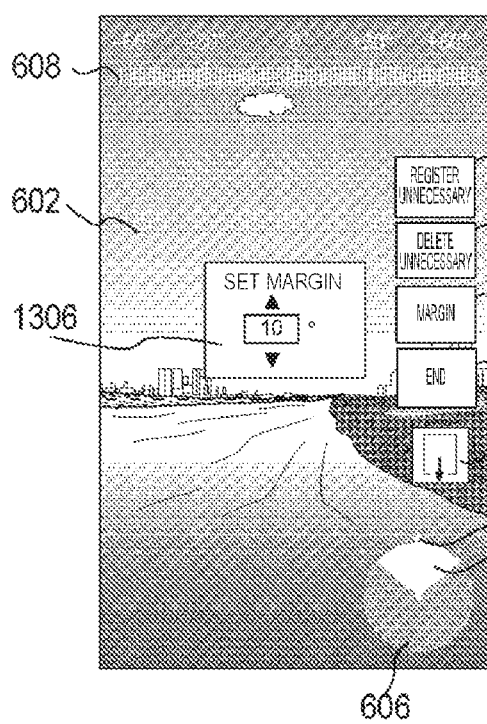

In S1210, on the basis of information notified from the touch panel 206a, the CPU 201 determines whether or not a touch operation with respect to the margin setting button 1304 has been performed. When a touch operation designating the margin setting button 1304 has been performed, the CPU 201 advances to S1211, but otherwise the CPU 201 advances to S1212. In S1211, the CPU 201 reads margin setting information from the memory 202, displays a margin setting dialog, and accepts a margin setting operation. FIG. 13C shows a display example of a margin setting dialog 1306. A background region other than the margin setting dialog 1306 may be displayed darkly. The CPU 201 changes a setting numerical value of a margin in accordance with a touch operation with respect to up and down arrow marks of the margin setting dialog 1306, a touch-move operation in the vertical direction, and a numerical value input operation performed by displaying a numeric keypad. The changed numerical value is stored in the memory 202. Once the setting numerical value of the margin is changed, a width of a selection-disabled range on the basis of the registered unnecessary portion information is changed accordingly by an amount corresponding to the change in the margin. The setting of the margin is a setting regarding how much a size of a selection-disabled range set on the basis of one unnecessary portion is to be expanded as compared to a size of the clipping range (in the present embodiment, 180 degrees). A range of the numerical value of margin setting information is set to 0 to (360—clipping angle), and when the range is exceeded, no change is made to the numerical value. When a portion other than the margin setting dialog 1306 is touched, the CPU 201 closes (hides) the margin setting dialog 1306.

In S1212, on the basis of information notified from the touch panel 206a, the CPU 201 determines whether or not a touch operation with respect to the save button 624 has been performed. When a touch operation designating the save button 624 has been performed, the CPU 201 advances to S1213, but otherwise the CPU 201 advances to S1219.

In S1213, the CPU 201 determines whether or not an unnecessary portion is registered in the memory 202. When at least one unnecessary portions is registered, the CPU 201 advances to S1215, but when no unnecessary portions are registered, the CPU 201 advances to S1214.

In S1214, the CPU 201 determines the clipping range on the basis of an azimuth and an elevation/depression angle at a center of the present display range or, in other words, a position adopted as a center of the clipping range (in the case of the unnecessary portion designation screen, a position indicated by the pointer 1301) and performs a clipping processing. More specifically, the CPU 201 clips a 180-degree range (a range of respectively 90 degrees in all directions from center) centered on the center of the display range from a 360-degree VR image. In addition, the CPU 201 records the clipped VR image as an image file that can be displayed in a VR view in the recording medium 208. The recording processing after clipping is processing similar to that of S535 described earlier. Once the processing of S1214 ends, the CPU 201 ends the unnecessary portion designation processing and returns to S301 shown in FIG. 3.

In S1215, the CPU 201 determines whether or not the center of the present display range or, in other words, the position adopted as a center of the clipping range (in the case of the unnecessary portion designation screen, the position indicated by the pointer 1301) is within a selection-disabled range. When the center of the present display range is within the selection-disabled range, the CPU 201 advances to S1216, but otherwise the CPU 201 advances to S1214.

Figure 13D:
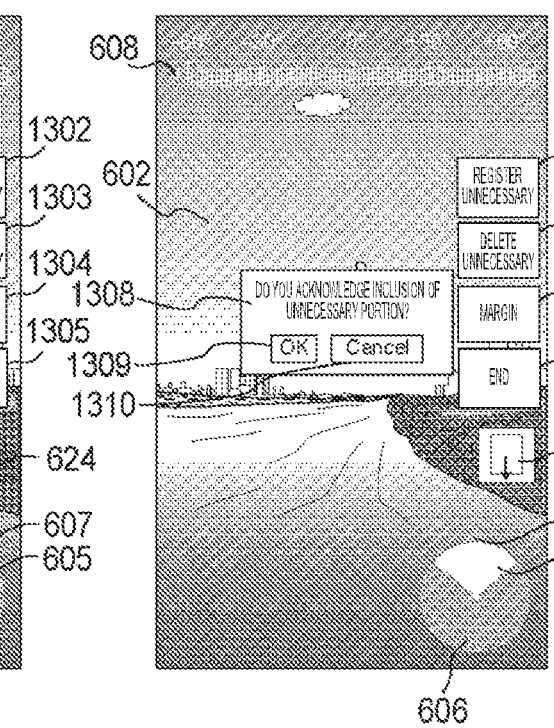

In S1216, the CPU 201 displays, on the display 205, a warning notifying that a registered unnecessary portion is to be included in the clipping range on the basis of the display range at a time point where the save button 624 had been touched. FIG. 13D shows a display example of the warning displayed in S1216. A dialog 1308 displays an OK button 1309 and a cancel button 1310 together with a message reading "Do you acknowledge inclusion of unnecessary portion?". By looking at the display, the user can recognize that a registered unnecessary portion is to be included in the clipping range on the basis of the display range at a time point where a touch operation with respect to the save button 624 had been performed.

In S1217, the CPU 201 determines whether or not a touch operation with respect to the OK button 1309 has been performed. When a touch operation with respect to the OK button 1309 has been performed, the CPU 201 advances to S1214. In other words, since the user has acknowledged that the unnecessary portion is to be included in the clipping range, clipping is performed in a clipping range including the unnecessary portion and a clipped VR image is saved. When a touch operation with respect to the OK button 1309 has not been performed, the CPU 201 advances to S1218.

In S1218, the CPU 201 determines whether or not a touch operation with respect to the cancel button 1310 has been performed. When a touch operation with respect to the cancel button 1310 has not been performed, the CPU 201 returns to S1217. When a touch operation with respect to the cancel button 1310 has been performed, the CPU 201 hides the dialog 1308 and returns to S1202 to repeat the processing without performing clipping and saving in the clipping range on the basis of the display range at a time point where the save button 624 had been touched.

According to processing of S1215 to S1218, the user can be prevented from inadvertently designating a center of the clipping range within a selection-disabled range. It should be noted that, when the pointer is within a selection-disabled range, a clipping and saving instruction may be ignored (disabled) without displaying a warning (in other words, without performing the processing of S1216 to S1218). Alternatively, only a warning may be displayed without accepting a selection of either OK or cancel and without performing clipping and saving.

It should be noted that a jump button may be displayed in addition to the various display items described with reference to FIG. 13A. In addition, when the pointer 1301 is within a selection-disabled range, the display range of the VR image 602 may be changed so that the pointer 1301 is positioned outside of the selection-disabled range in accordance with a touch operation with respect to the jump button (a touch operation that is not accompanied by a movement of a touch position).

In addition, a necessary portion registration button may be displayed in place of, or in addition to, the unnecessary portion registration button 1302 described with reference to FIG. 13A. In accordance with a touch operation with respect to the necessary portion registration button, a position of the VR image 602 indicated by the pointer 1301 at that time point is recorded (registered) in the memory 202 as positional information of the necessary location. Furthermore, the CPU 201 calculates a region other than a region of an angle obtained by subtracting a margin angle from a clipping angle centered on the positional information of the necessary portion as a selection-disabled range. In terms of a conceptual diagram, when a necessary portion 1459 is designated as shown in FIG. 14G, a region other than a region of the clipping angle (for example, 180 degrees)—the margin angle (for example, 10 degrees) is set as a selection-disabled range such as a selection-disabled range 1460. When there are a plurality of unnecessary portions and necessary portions, a region combining all selection-disabled ranges respectively calculated on the basis of all designated positions (registered positions) is set as a selection-disabled range.

In S1219, the CPU 201 determines whether or not a touch operation with respect to the end button 1305 has been performed. When there is no touch operation designating the end button 1305, the CPU 201 returns to S1202 and repeats the processing, but when there is a touch operation with respect to the end button 1305, the CPU 201 ends the unnecessary portion designation processing and advances to S419 in FIG. 4.

A clipping processing in a case of elevation/depression angle-enabled described with reference to S502 and a clipping processing in a case of elevation/depression angle-disabled described with reference to S503 will be described with reference to FIGS. 15A to 15D and FIG. 16A to 16C.

Figure 15A:
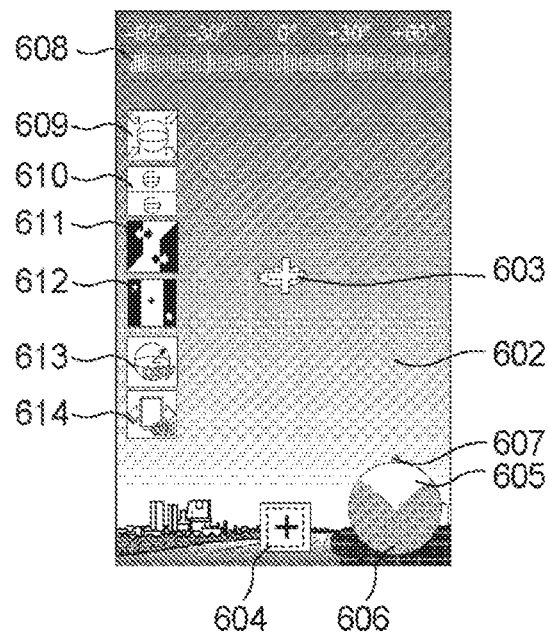
FIGS. 15A and 15C represent an example of a clipping editing screen and FIGS. 15B and 15D represent an example of a preview screen.

FIG. 15A shows a display example of the clipping editing screen (in other words, a display example prior to clipping range designation) on the display 205. It is assumed that a reference direction (a display start direction) is an azimuth of 0 degrees (for example, north) and an elevation/depression angle of 0 degrees (a direction perpendicular to a zenith axis or a gravitational direction axis, the horizontal direction). FIG. 15A represents a display example of the VR image 602 when the azimuth is set to 0 degrees and the elevation/depression angle is set to an elevation of around 60 degrees on the clipping editing screen. In other words, the pointer 603 indicating a center of a display range is displayed in a direction that is more upward (on a sky side) than the horizontal direction. It should be noted that FIG. 15A represents a display example of a case where the enable/ disable setting of the elevation/depression angle described earlier is disabled, and the elevation/depression angle enable/disable button 613 is in a display mode indicating that the setting of the elevation/depression angle is disabled.

Figure 15B:
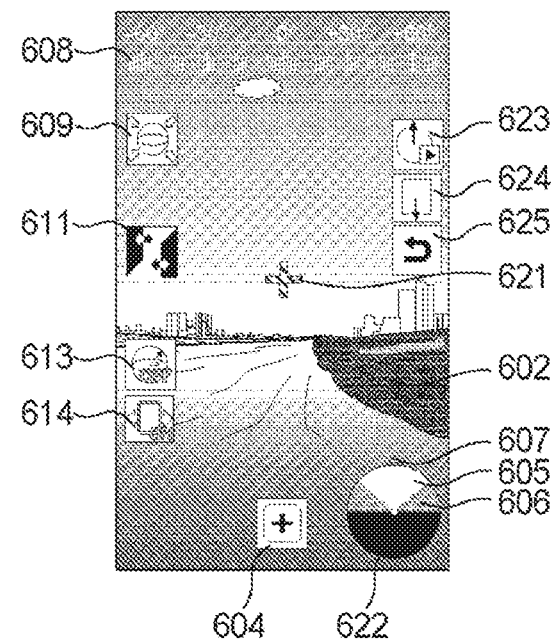
Figure 15C:
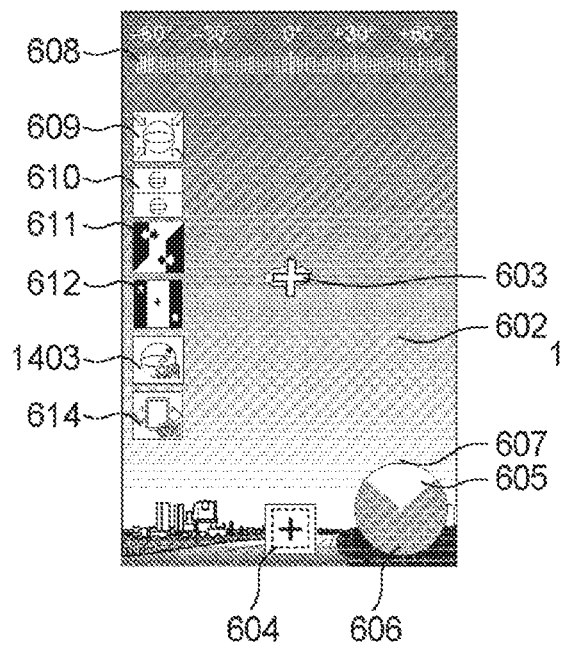
Figure 15D:
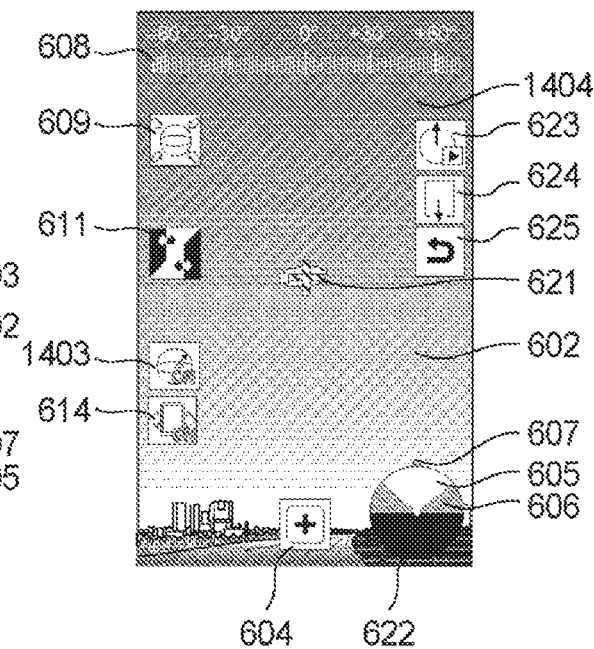
Figure 16A:
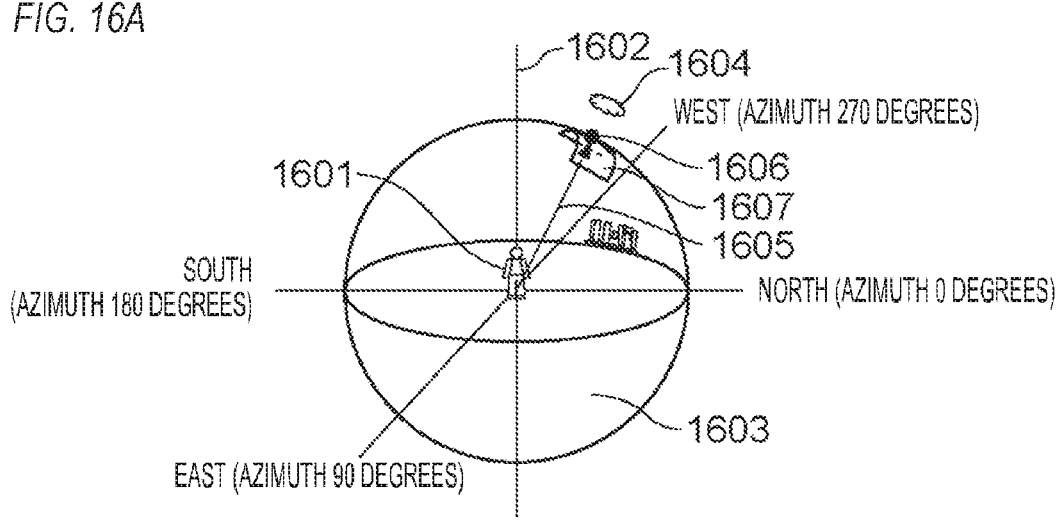
FIGS. 16A to 16C are schematic views showing an example of a difference in clipping between enabling and disabling an elevation/depression angle.
Figure 16B:
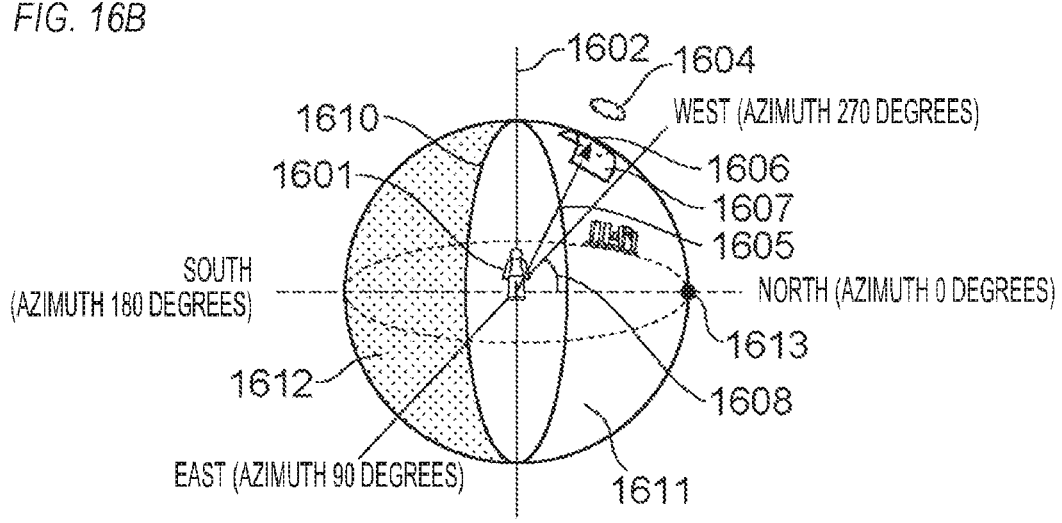
Figure 16C:
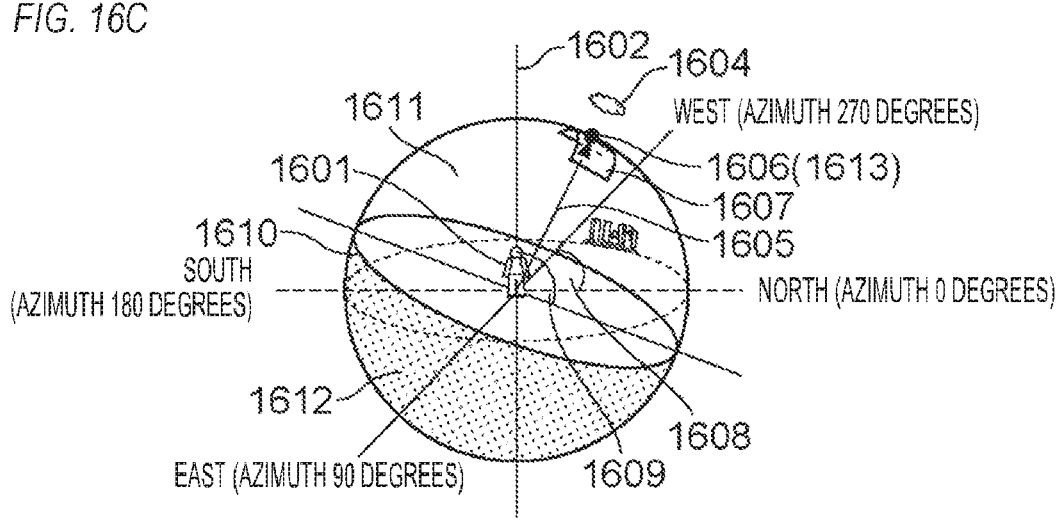

FIG. 16A is a diagram schematically representing the display range in FIG. 15A on a virtual sphere to which a 360-degree VR image is mapped. A position on the sphere can be identified by an azimuth of 360 degrees around a zenith axis 1602 and an elevation/depression angle of 360 degrees around a horizontal axis that is perpendicular to the zenith axis 1602 with a viewing position 1601 of a viewer as center. A 360-degree VR image prior to clipping is mapped onto the entire sphere, and the entire sphere becomes a valid video range 1603. FIG. 16A represents an example where a line-of-sight direction 1605 is pointed toward an object 1604 in the sky to the north (in other words, an azimuth of 0 degrees) as seen from the viewer. In other words, a display range 1607 is set at a position such that a center of the display range 1607 intersects the line-of-sight direction 1605. It should be noted that the display ranges in FIG. 16A to 16C are illustrated in a deformed manner and are narrower than the display ranges in FIG. 15A to 15D. However, centers of the display ranges in FIG. 16A to 16C are illustrated using a same reference as centers of the display ranges illustrated in FIG. 15A to 15D. Therefore, the center of the display range 1607 is a position indicated by the pointer 603 shown in FIG. 15A and becomes a clipping designation position 1606.

When an operation for designating a clipping range is performed using the clipping button 604 in a case where the elevation/depression angle is disabled and the display range is set to the range shown in FIGS. 15A and 16A, a clipping processing is performed by the processing of S503, resulting in the display range shown in FIG. 15B. FIG. 15B represents a display example of a preview screen immediately after a touch operation of the clipping button 604 is performed and a clipping range is set from the state shown in FIG. 15A. The elevation/depression angle of the display range is the horizontal direction (an elevation/depression angle of 0 degrees) which differs from the elevation/depression angle of 60 degrees prior to clipping, and the pointer 621 is also displayed at the position of the elevation/depression angle of 0 degrees. An azimuth of the display range shown in FIG. 15B is 0 degrees (north) which is the same as in FIG. 15A prior to clipping. Since the azimuth is the same as prior to clipping, supposing that an azimuth of 90 degrees (east) has been set as the display range prior to clipping, an immediately-subsequent display range of the preview screen and the center of the clipping range are also an azimuth of 90 degrees (east).

FIG. 16B is a diagram schematically representing a clipping range in the state shown in FIG. 15B on a virtual sphere to which a 360-degree VR image is mapped. An outlined hemisphere on a right side of the sphere represents a clipping range 1611 (a valid video range) which is a 180-degree VR image after the clipping. A hemisphere on an opposite side is an excluded range 1612 (an invalid video range) to be excluded from the VR image after the clipping and discarded. The clipping range 1611 is a hemispherical range centered on a center position 1613. The center position 1613 is a position with an azimuth of 0 degrees indicated by the clipping designation position 1606 and an elevation/depression angle of 0 degrees (horizontal) regardless of the clipping designation position 1606. While the center position 1613 of the clipping range 1611 and the clipping designation position 1606 on the basis of the line-of-sight direction 1605 or the display range 1607 immediately preceding the performance of an operation for designating the clipping range do not coincide with each other and have different elevation/depression angles as illustrated, this is because the elevation/depression angle is set to disabled. A clipping surface 1610 of the clipping range 1611 is parallel to the zenith axis 1602.

When an operation for designating a clipping range is performed using the clipping button 604 in a case where the elevation/depression angle is enabled and the display range is set to the range shown in FIGS. 15C and 16A, a clipping processing is performed by the processing of S502, resulting in the display range shown in FIG. 15D. It is assumed that the display range in FIG. 15C is the same as the display range in FIG. 15A. FIG. 15C only differs from FIG. 15A in the setting of elevation/depression angle enable/disable and, in FIG. 15C, the display mode of the elevation/depression angle enable/disable button 613 is a display mode indicating that the setting is elevation/depression angle-enabled. FIG. 15D represents a display example of a preview screen immediately after a touch operation of the clipping button 604 is performed and a clipping range is set from the state shown in FIG. 15C. The elevation/depression angle of the display range is the same 60 degrees as prior to the clipping, and the pointer 621 is also displayed at the position of the elevation/depression angle of 60 degrees. An azimuth of the display range shown in FIG. 15D is 0 degrees (north) which is the same as in FIG. 15C prior to the clipping.

FIG. 16C is a diagram schematically representing a display range and a clipping range in the state shown in FIG. 15D on a virtual sphere to which a 360-degree VR image is mapped. An outlined hemisphere on an upper right side of the sphere represents the clipping range 1611 (a valid video range) that becomes a 180-degree VR image after the clipping. A hemisphere on an opposite side is the excluded range 1612 (an invalid video range) to be excluded from the VR image after the clipping and discarded. The center position 1613 of the clipping range 1611 coincides with the clipping designation position 1606 in terms of both the azimuth and the elevation/depression angle. This is because the elevation/depression angle is set to enabled.

In clipping of a VR image according to the present embodiment, an initial setting of elevation/depression angle enable/disable is disabled and the clipping is performed in a clipping range such as that shown in FIG. 16B. With this clipping range, since the valid video range extends from directly above (an elevation of 90 degrees) to directly below (a depression angle of 90 degrees), a viewer viewing with an HMD can readily panoramically view the entire VR image after clipping by simply changing an orientation of the face (by rotating his or her head). Supposing that the valid video range exceeds directly above and extends to a rear side as shown in FIG. 16C, the viewer must orient his or her head toward the rear side exceeding directly above in order to view the rear side exceeding directly above or the like. In order to do so, the viewer must perform a body movement with a relatively large physical burden such as arching his or her torso, twisting his or her upper body, changing his or her standing direction and looking backward, or the like instead of simply rotating his or her head. In other words, panoramically viewing a VR image after clipping by a change in the display range in accordance with an orientation change is relatively physically demanding. In comparison, by clipping a range centered on the horizontal direction such as that shown in FIG. 16B regardless of an elevation/depression angle of the display range when designating the clipping range, a VR image which reduces such physical burden and which is comfortably panoramically viewed can be generated. In addition, since the eyes of a human are positioned such that forward in the horizontal direction is viewable when facing the front, adopting an elevation/depression angle of a center of a field of view (in other words, a clipping range) as the horizontal direction reduces a sense of discomfort even in terms of the structure of the human body.

Furthermore, in clipping of a VR image according to the present embodiment, when the elevation/depression angle enable/disable setting is set to enabled, clipping is performed in a clipping range such as that shown in FIG. 16C. Depending on contents of an object, this clipping range is preferable in that an entire starry sky can be panoramically viewed while excluding an unnecessary ground portion or a wide range inside a room as viewed from the ceiling can be panoramically viewed in the VR image after clipping.

To the user, it is difficult to conceive and understand whether clipping is to be performed in the clipping range 1611 shown in FIG. 16B or the clipping range 1611 shown in FIG. 16C in accordance with a change in the elevation/depression angle enable/disable setting. Therefore, guidance display showing how different elevation/depression angle enable/disable settings result in different clipping ranges is favorably provided using a schematic view in order to facilitate the user's understanding.

Figure 17A:
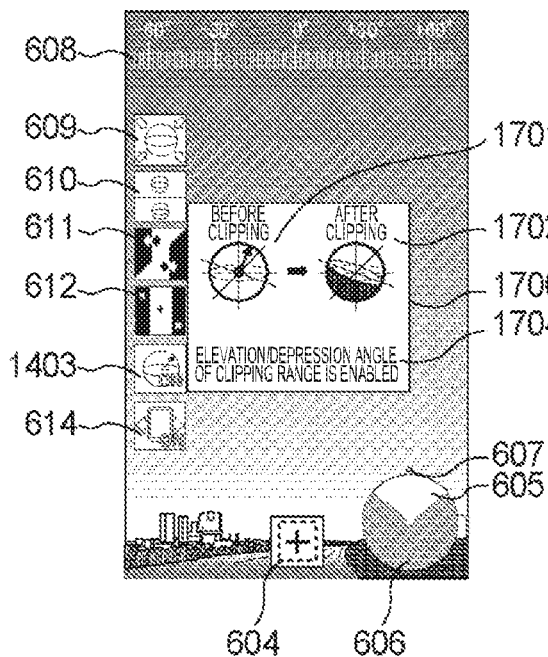
FIGS. 17A and 17B represent an example of guidance display of a clipping range.

FIG. 17A shows a display example of guidance display of a clipping range on the display 205. A guidance dialog 1700 shown in FIG. 17A is displayed for a prescribed time (for example, 5 seconds) when, for example, the elevation/depression angle enable/disable button 613 is touched and the elevation/depression angle setting is switched from disabled to enabled (S422 in FIG. 4, S521 in FIG. 5). A graphic 1701 indicating a schematic view prior to clipping, a graphic 1702 indicating a schematic view after the clipping, and a message 1704 are displayed on the dialog 1700. The graphic 1701 is a guide using a schematic view of a sphere and, prior to the clipping, represents a schematic view in a case where a position above an elevation/depression angle of 0 degrees is designated as a clipping designation position (a position indicated by an arrow) on the sphere. The graphic 1702 is a guide using a schematic view of a sphere indicating the clipping range when the elevation/depression angle setting is enabled and, after the clipping, indicates that a hemisphere on the basis of the elevation/depression angle of the clipping designation position is to be clipped. The message 1704 indicates that the elevation/depression angle setting of the clipping range has been set to enabled. It should be noted that a graphic 1703 shown in FIG. 17B which indicates a clipping range when the elevation/depression angle setting is set to enabled may be displayed instead of the graphic 1701.

Figure 17B:
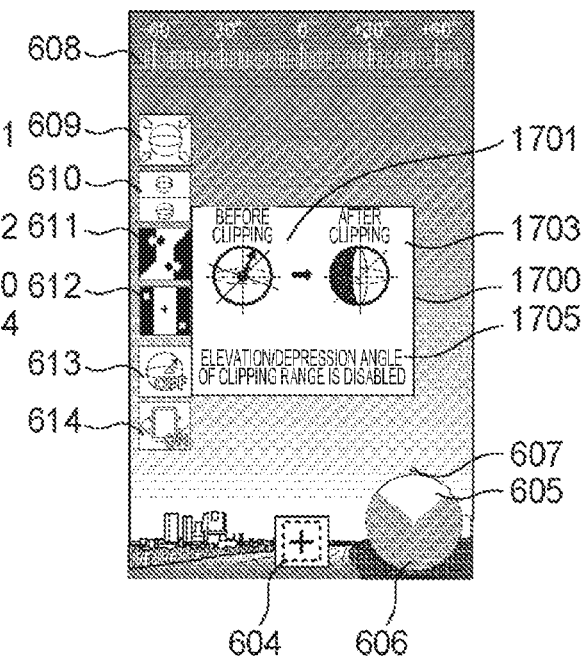

FIG. 17B shows a display example of guidance display of a clipping range on the display 205. The guidance dialog 1700 shown in FIG. 17B is displayed for a prescribed time (for example, 5 seconds) when, for example, the elevation/depression angle enable/disable button 613 is touched and the elevation/depression angle setting is switched from enabled to disabled (S421 in FIG. 4, S520 in FIG. 5). The graphic 1701 indicating a schematic view prior to clipping, the graphic 1703 indicating a schematic view after the clipping, and a message 1705 are displayed on the dialog 1700. The graphic 1701 is a guide using a schematic view of a sphere and, prior to the clipping, represents a schematic view in a case where a position above an elevation/depression angle of 0 degrees is designated as a clipping designation position (a position indicated by an arrow), and is the same as the graphic 1701 shown in FIG. 17A. The graphic 1703 is a guide using a schematic view of a sphere indicating the clipping range when the elevation/depression angle setting is disabled and indicates that, after the clipping, a hemisphere obtained by vertically dividing the sphere (a hemisphere of which a center is the horizontal direction) is to be clipped regardless of the elevation/depression angle of the clipping designation position. The message 1705 indicates that the elevation/depression angle setting of the clipping range has been set to disabled. It should be noted that the graphic 1702 shown in FIG. 17A which indicates a clipping range when the elevation/depression angle setting is set to disabled may be displayed instead of the graphic 1701.

A guide such as those shown in FIGS. 17A and 17B is not limited to cases where the elevation/depression angle setting is switched and may be displayed when displaying a description related to the elevation/depression angle setting in an electronic manual or the like. In addition, as information representing a setting state such as the elevation/depression angle enable/disable button 613, a guide such as those shown in FIGS. 17A and 17B may be displayed. Furthermore, instead of displaying the graphic 1701 indicating prior to clipping, a graphic indicating after the clipping (the graphic 1702 when elevation/depression angle-disabled and the graphic 1703 when elevation/depression angle-enabled).

While an example of generating, from a VR image picked up by an imaging apparatus, a VR image with a narrower range has been described in the embodiment presented above, the original VR image is not limited to a VR image picked up by an imaging apparatus. The present invention is also applicable when clipping and generating, from a VR content created by computer graphics (CG) or the like, a narrower VR content.

In addition, the processing of the various flow charts described above need not necessarily be performed in combination and each processing can be separately performed, and parts of the flow charts described above may be adopted in combination with other embodiments. For example, each of the whole hemisphere display, the dual-screen display processing, the end fine adjustment processing, and the like described above may be performed as processing for individually designating a clipping range without being combined with the clipping editing processing shown in FIG. 4 for designating a clipping range by a method of designating a center of the clipping range. In other words, for example, when the CPU 201 determines in S311 shown in FIG. 3 that a touch operation with respect to the clipping editing button has been performed, a direct transition can be made to the whole hemisphere display described with reference to FIGS. 7A and 7B to enable a clipping range to be designated. A configuration may be adopted in which the clipping range can be designated by making a direct transition to the dual-screen display processing described with reference to FIGS. 8, 9A, and 9B or to the end fine adjustment processing described with reference to FIGS. 10 and 11A to 11D.

According to the present invention described above, from a VR content, a VR content with a narrower range on the basis of an operation for designating a clipping range by the user can be generated with good operability.

It should be noted that the various controls described above as controls to be performed by the CPU 201 may be carried out by one piece of hardware, or a plurality of pieces of hardware (for example, a plurality of processors or circuits) may control an entire apparatus by sharing processing.

In addition, while the present invention has been described in detail on the basis of a preferred embodiment thereof, it is to be understood that the present invention is not limited to the specific embodiment and various modes that do not constitute departures from the scope of the invention are also included in the present invention. Furthermore, the embodiment described above simply represents an example of the present invention and the embodiment can also be combined with other embodiments.

Moreover, while an example in which the present invention is applied to the electronic device 200 (a smartphone or the like) has been described in the embodiment presented above, the present invention is not limited to this example. The present invention can be applied to any electronic device capable of performing control so as to display an operation screen for clipping, from a VR content, a VR content with a narrower range. For example, the present invention can be applied to a personal computer, a PDA, a mobile phone terminal, a mobile image viewer, a printer apparatus, a digital photo frame, a music player, a game device, an electronic book reader, a video player, and the like. The present invention can also be applied to a digital camera, a television apparatus, a projection apparatus, a tablet terminal, an AI speaker, a domestic electrical appliance, a vehicle-mounted apparatus, medical equipment, and the like.

According to the present disclosure, from a VR content, a VR content with a narrower range can be generated with good operability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248329, filed on Dec. 28, 2018, Japanese Patent Application No. 2018-247843, filed on Dec. 28, 2018, Japanese Patent Application No. 2018-247844, filed on Dec. 28, 2018, Japanese Patent Application No. 2018-248311, filed on Dec. 28, 2018, Japanese Patent Application No. 2018-247845, filed on Dec. 28, 2018, and Japanese Patent Application No. 2018-247842, filed on Dec. 28, 2018, which are hereby incorporated by reference herein in their entirety.

What is claimed is:

1. An electronic device comprising at least one memory and at least one processor which function as:
a display controlling unit configured to perform control so that, on a first screen, a part of a VR content having a first video range is displayed on a display as a display range and a position of the display range is changed in accordance with an orientation change of the electronic device or a display range change operation by a user, a second video range that is narrower than the first video range in the VR content is determined based on the changed display range, and on a second screen, a first image corresponding to whole of the second video range and a second image corresponding to whole of a third video range that is outside of the second video range in the first video range are displayed separately side by side in same display mode;
a changing unit configured to change the second video range in accordance with a video range change operation by the user in a state where the first image and the second image are being displayed on the second screen, wherein the third video range is also automatically changed with the change of the second video range; and
a generating unit configured to generate an edited VR content corresponding to the second video range in the VR content.

2. The electronic device according to claim 1, wherein the first image is an image into which the second video range is entirely fitted, and
the second image is an image into which the range outside of the second video range is entirely fitted.

3. The electronic device according to claim 1, wherein the first image and the second image are distorted circular images.

4. The electronic device according to claim 1, wherein the display controlling unit performs control so that, on the second screen, in a case of displaying one of the first image and the second image by enlarging or reducing the one image, other of the first image and the second image is displayed without enlarging and reducing the other image.

5. The electronic device according to claim 1, wherein the display controlling unit performs control so that, on the second screen, the second image is displayed in such a manner that the second image be identifiable as an image of the range outside of the second video range in the VR content.

6. The electronic device according to claim 1, wherein the at least one memory and at least one processor further function as a recording unit configured to generate and record a file storing the edited VR content generated by the generating unit.

7. The electronic device according to claim 5, wherein the second image is displayed and applied a semi-transparent mask of a prescribed color or a color conversion.

8. The electronic device according to claim 6, wherein the recording unit generates one still image file storing a plurality of images on based on the second video range.

9. The electronic device according to claim 8, wherein a character string ".vr" is described before an extension in a file name of the still image file.

10. The electronic device according to claim 9, wherein the recording unit generates one moving image file in which a plurality of moving images based on the second video range are arranged.

11. The electronic device according to claim 10, wherein a character string ".vr" is described before an extension in a file name of the moving image file.

12. The electronic device according to claim 8, wherein the recording unit generates one moving image file in which a plurality of moving images based on the second video range are arranged.

13. The electronic device according to claim 12, wherein a character string ".vr" is described before an extension in a file name of the moving image file.

14. The electronic device according to claim 6, wherein the recording unit generates one moving image file in which a plurality of moving images based on the second video range are arranged.

15. The electronic device according to claim 14, wherein a character string ".vr" is described before an extension in a file name of the moving image file.

16. The electronic device according to claim 1, wherein the first and second displayed images are not continuous with one another.

17. The electronic device according to claim 1, wherein the first and second displayed images are displayed offset from one another.

18. The electronic device according to claim 1, wherein the VR content includes a user-specified clipping range, an excluded region corresponding to the clipping range, and a boundary between the clipping range and the excluded region, and wherein the first and second displayed images include clipping boundaries of the clipping range which are 180 degrees apart from one another in the VR content.

19. A control method of an electronic device, comprising:
performing control so that, on a first screen, a part of a VR content having a first video range is displayed on a display as a display range and a position of the display range is changed in accordance with an orientation change of the electronic device or a display range change operation by a user, a second video range that is narrower than the first video range in the VR content is determined based on the changed display range, and on a second screen, a first image corresponding to whole of the second video range and a second image corresponding to whole of a third video range that is outside of the second video range in the first video range are displayed separately side by side in same display mode;
changing the second video range in accordance with a video range change operation by the user in a state where the first image and the second image are being displayed on the second screen, wherein the third video range is also automatically changed with the change of the second video range; and
a generating unit configured to generate an edited VR content corresponding to the second video range in the VR content.

20. A non-transitory computer readable medium that stores a program, wherein
the program causes a computer to execute a control method of an electronic device, comprising:
performing control so that, on a first screen, a part of a VR content having a first video range is displayed on a display as a display range and a position of the display range is changed in accordance with an orientation change of the electronic device or a display range change operation by a user, a second video range that is narrower than the first video range in the VR content is determined based on the changed display range, and on a second screen, a first image corresponding to whole of the second video range and a second image corresponding to whole of a third video range that is outside of the second video range in the first video range are displayed separately side by side in same display mode;
changing the second video range in accordance with a video range change operation by the user in a state where the first image and the second image are being displayed on the second screen, wherein the third video range is also automatically changed with the change of the second video range; and
a generating unit configured to generate an edited VR content corresponding to the second video range in the VR content.

* * * * *